United States Patent
He et al.

(10) Patent No.: US 9,455,811 B2
(45) Date of Patent: Sep. 27, 2016

(54) CHANNEL STATE INFORMATION-REFERENCE SIGNAL PATTERNS FOR TIME DIVISION DUPLEX SYSTEMS IN LONG TERM EVOLUTION WIRELESS NETWORKS

(71) Applicant: Intel IP Corporation, Santa Clara, CA (US)

(72) Inventors: Hong He, Beijing (CN); Alexei Davydov, Nizhny Novgorod (RU); Seunghee Han, Kyoungkido (KR); Jong-Kae Fwu, Sunnyvale, CA (US); Shafi Bashar, Santa Clara, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 234 days.

(21) Appl. No.: 14/126,599

(22) PCT Filed: Sep. 27, 2013

(86) PCT No.: PCT/US2013/062428
§ 371 (c)(1),
(2) Date: Dec. 16, 2013

(87) PCT Pub. No.: WO2014/113087
PCT Pub. Date: Jul. 24, 2014

(65) Prior Publication Data
US 2014/0198675 A1    Jul. 17, 2014

Related U.S. Application Data

(60) Provisional application No. 61/753,914, filed on Jan. 17, 2013.

(51) Int. Cl.
*H04L 27/26* (2006.01)
*H04L 5/00* (2006.01)
(Continued)

(52) U.S. Cl.
CPC .............. *H04L 5/0048* (2013.01); *H04L 5/14* (2013.01); *H04L 27/2613* (2013.01); *H04L 5/1469* (2013.01); *H04W 28/06* (2013.01)

(58) Field of Classification Search
None
See application file for complete search history.

(56) References Cited

U.S. PATENT DOCUMENTS

2011/0170435 A1* 7/2011 Kim .................... H04L 5/0023
370/252
2011/0228735 A1    9/2011 Lee et al.
(Continued)

FOREIGN PATENT DOCUMENTS

WO    WO2011115421    *  9/2011
WO    WO2012138097    * 10/2012

OTHER PUBLICATIONS

Park, Hanjun, "DM RS Pattern with Extended CP for Massive MIMO", U.S. Appl. No. 61/704,569.*

(Continued)

*Primary Examiner* — Mohammad Adhami
(74) *Attorney, Agent, or Firm* — Stoel Rives LLP

(57) ABSTRACT

A user equipment (UE) for time division duplex (TDD) communication through a wireless communication channel has a receiver to receive a channel state information reference signal (CSI-RS) subframe configuration value, a CSI-RS configuration value, and a CSI-RS; and circuitry to determine a subframe index corresponding to a temporal position of a special subframe including the CSI-RS; determine a CSI-RS pattern of one or more orthogonal frequency division modulation (OFDM) resource elements carrying the CSI-RS, the pattern being from among a group of CSI-RS patterns that include OFDM resource elements in OFDM symbols corresponding to a physical downlink control channel (PDCCH) region of a legacy LTE wireless communication channel; control the receiver to receive the special subframe carrying the CSI-RS during the temporal position and at the one or more OFDM resource elements of the CSI-RS pattern; and measure the wireless communication channel based on the CSI-RS.

20 Claims, 34 Drawing Sheets

(51) Int. Cl.
    *H04L 5/14*         (2006.01)
    *H04W 28/06*     (2009.01)

(56) References Cited

U.S. PATENT DOCUMENTS

| | | |
|---|---|---|
| 2012/0093065 A1 | 4/2012 | Elbwart et al. |
| 2012/0155414 A1 | 6/2012 | Noh et al. |
| 2012/0182974 A1 | 7/2012 | Dai et al. |
| 2012/0287875 A1* | 11/2012 | Kim ............ H04L 5/0048 370/329 |
| 2013/0107704 A1 | 5/2013 | Dinan |
| 2013/0128860 A1 | 5/2013 | Zhang |
| 2013/0163461 A1 | 6/2013 | Kim et al. |
| 2014/0016596 A1* | 1/2014 | Kim ............ H04L 5/001 370/329 |
| 2014/0153526 A1* | 6/2014 | Mazzarese ...... H04B 7/024 370/329 |
| 2015/0271814 A1* | 9/2015 | Park ............ H04B 7/04 370/329 |

OTHER PUBLICATIONS

Ericsson, "Discussion on CSI-RS collision avoidance", R1-106404, GPP TSG-RAN WG1 #63, Nov. 15-19, 2010, 7 pages, Jacksonville, Florida.
Huawei, "CSI-RS pattern design", R1-101954, 3GPP TSG RAN WG1 meeting #60bis, Apr. 12-16, 2010, 6 pages, Beijing, China.
LG Electronics, "Tracking performance for un-synchronized new carrier", R1-121421, 3GPP TSG RAN WG1 Meeting #68bis, Mar. 26-30, 2012, 6 pages, Jeju, Korea.
Samsung, "CSI Collision Handling for CoMP", R1-123468, 3GPP TSG RAN WG1 #70, Aug. 13-17, 2012, 4 pages, Qingdao, China.
International Searching Authority, International Search Report and Written Opinion received for PCT Patent Application No. PCT/US2013/062428, mailed on Jan. 28, 2014, 11 pages.

* cited by examiner

Option 1

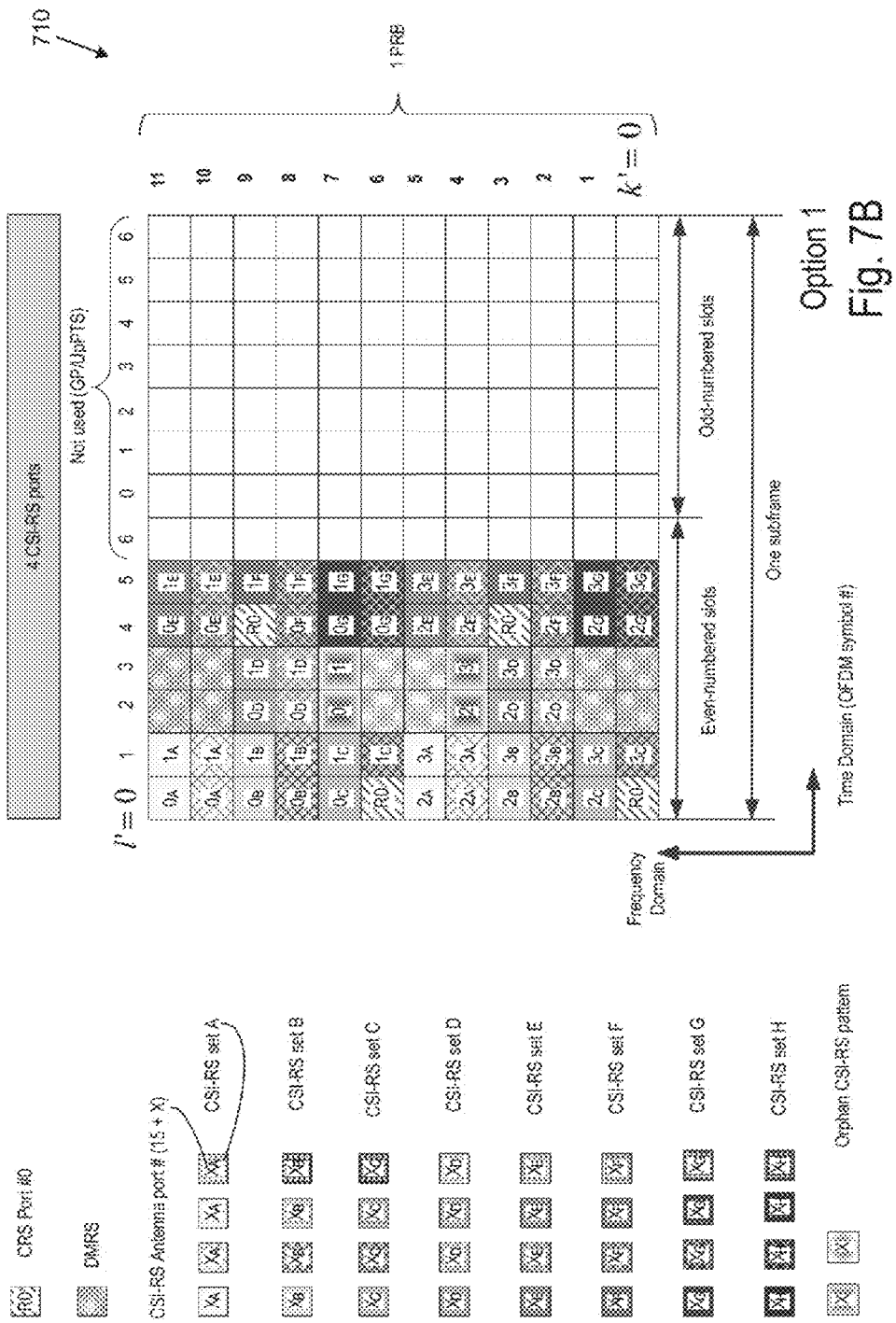
Fig. 7B Option 1

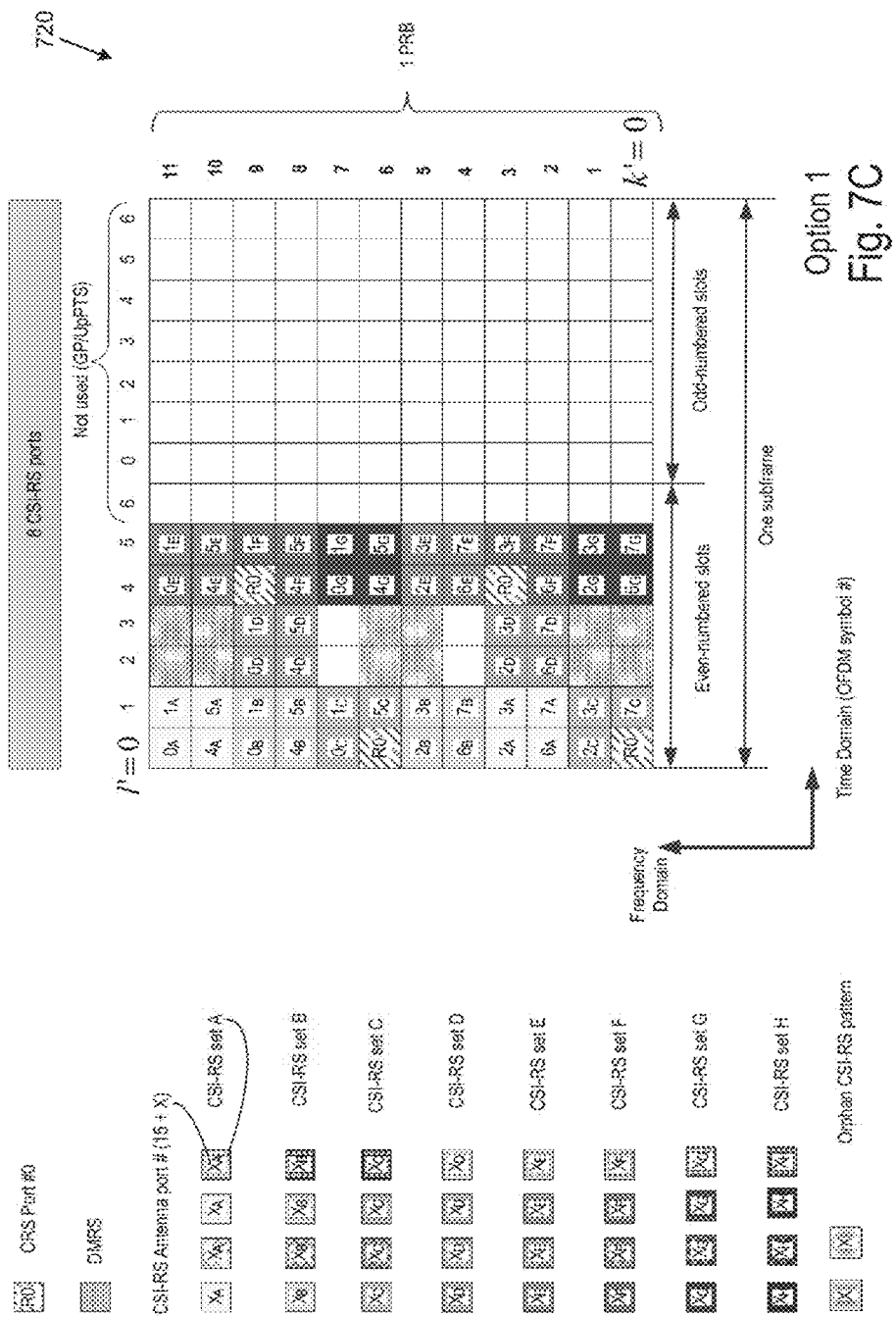

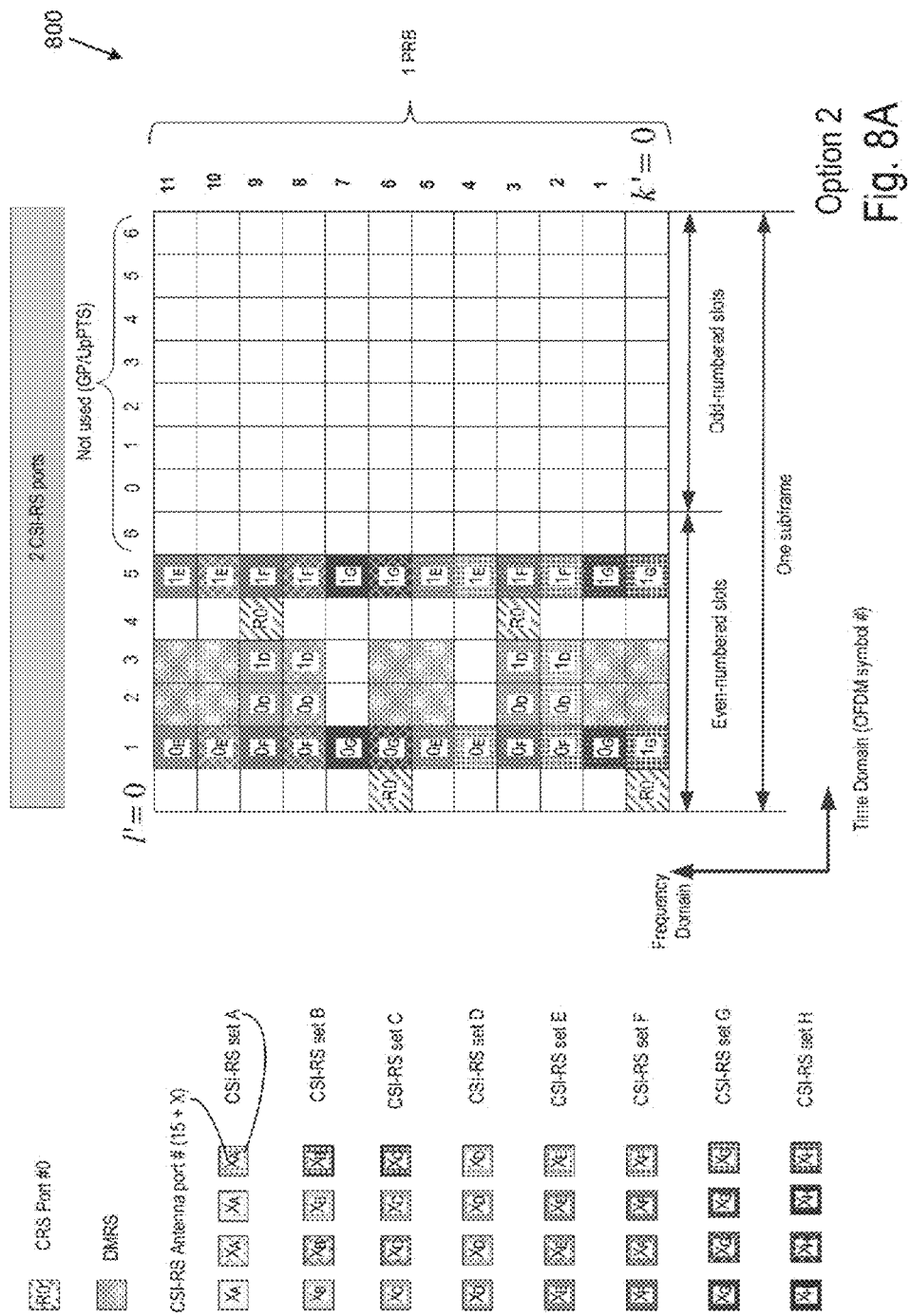

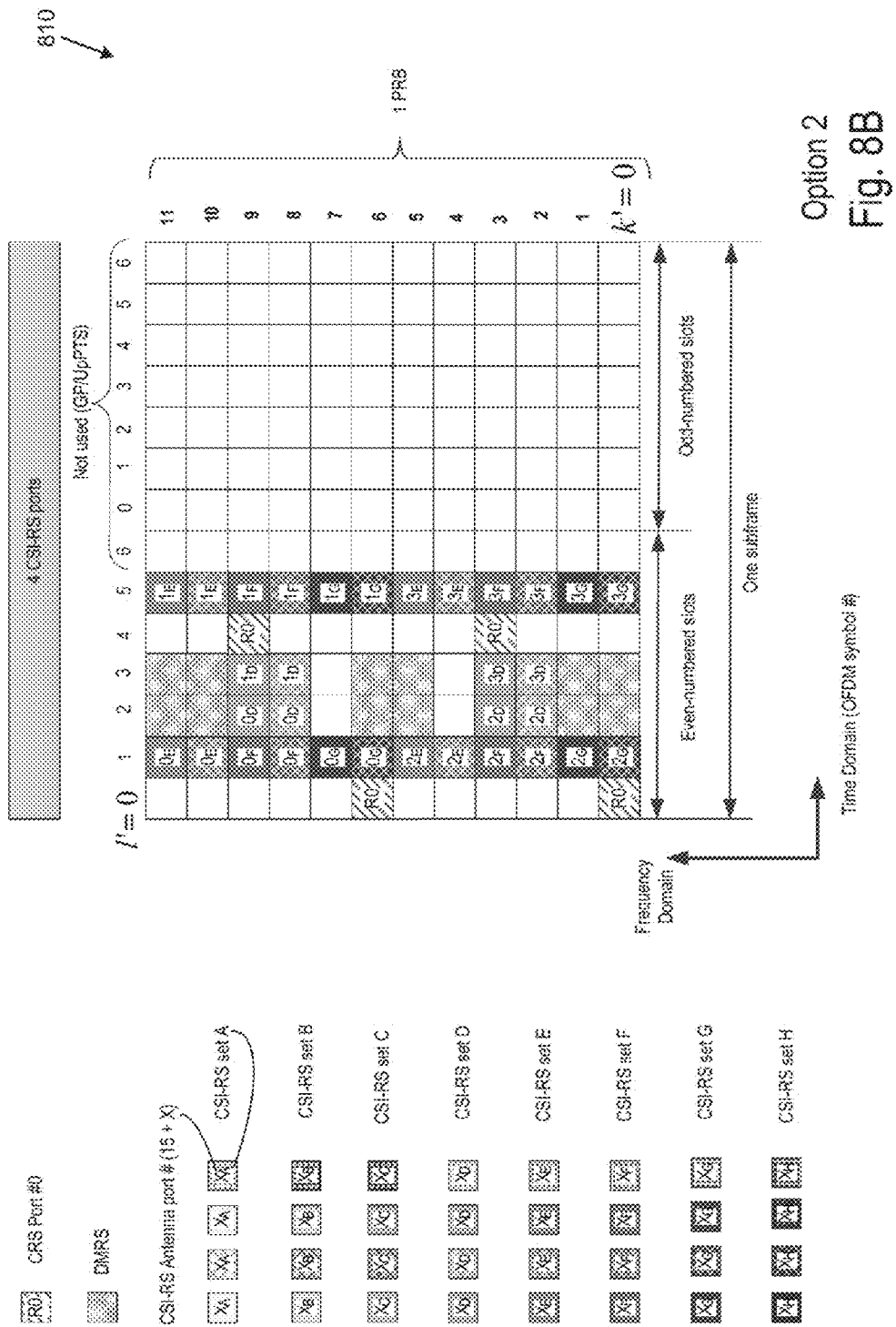

Option 2

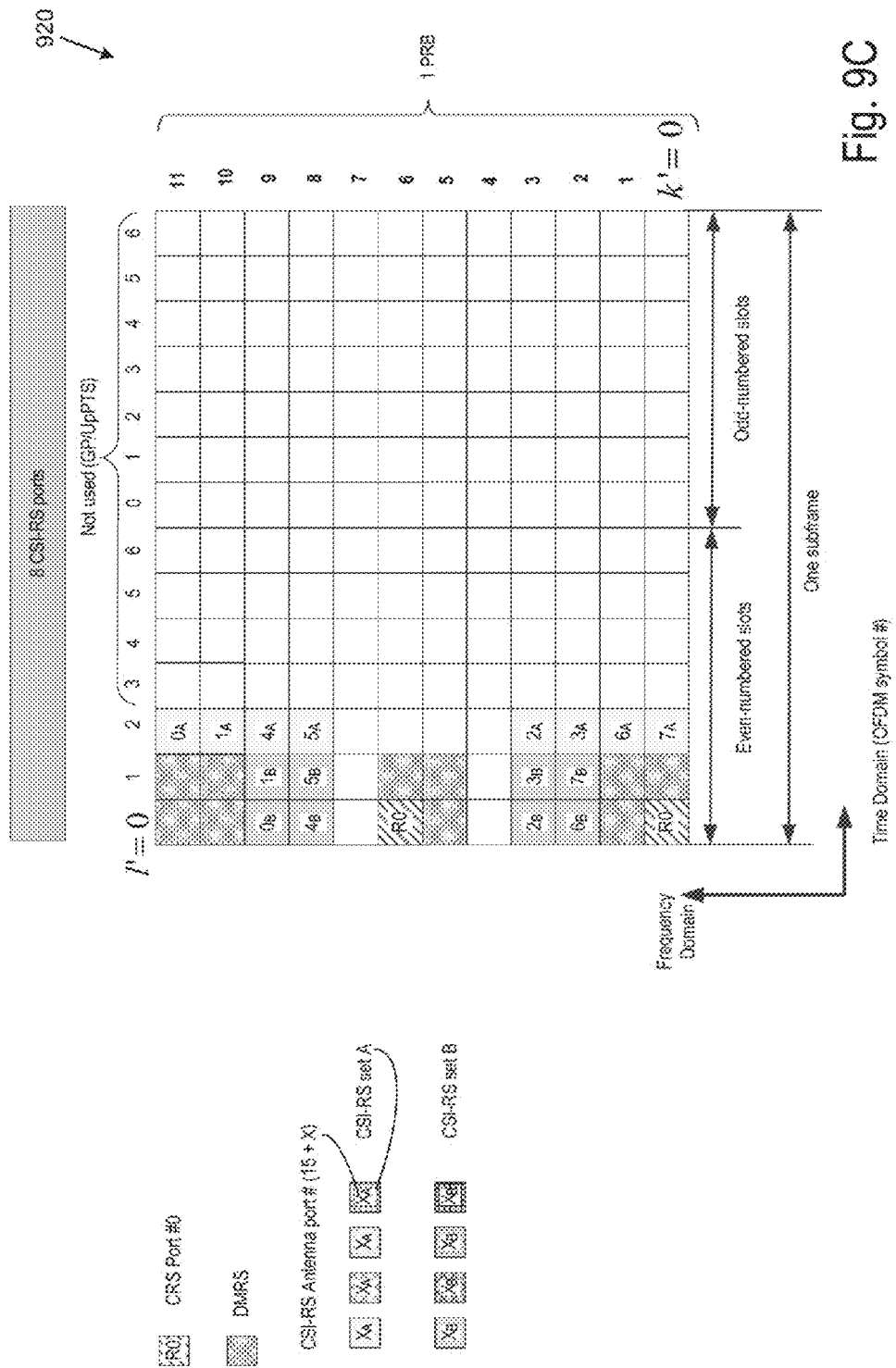

Group 1 in Option 1

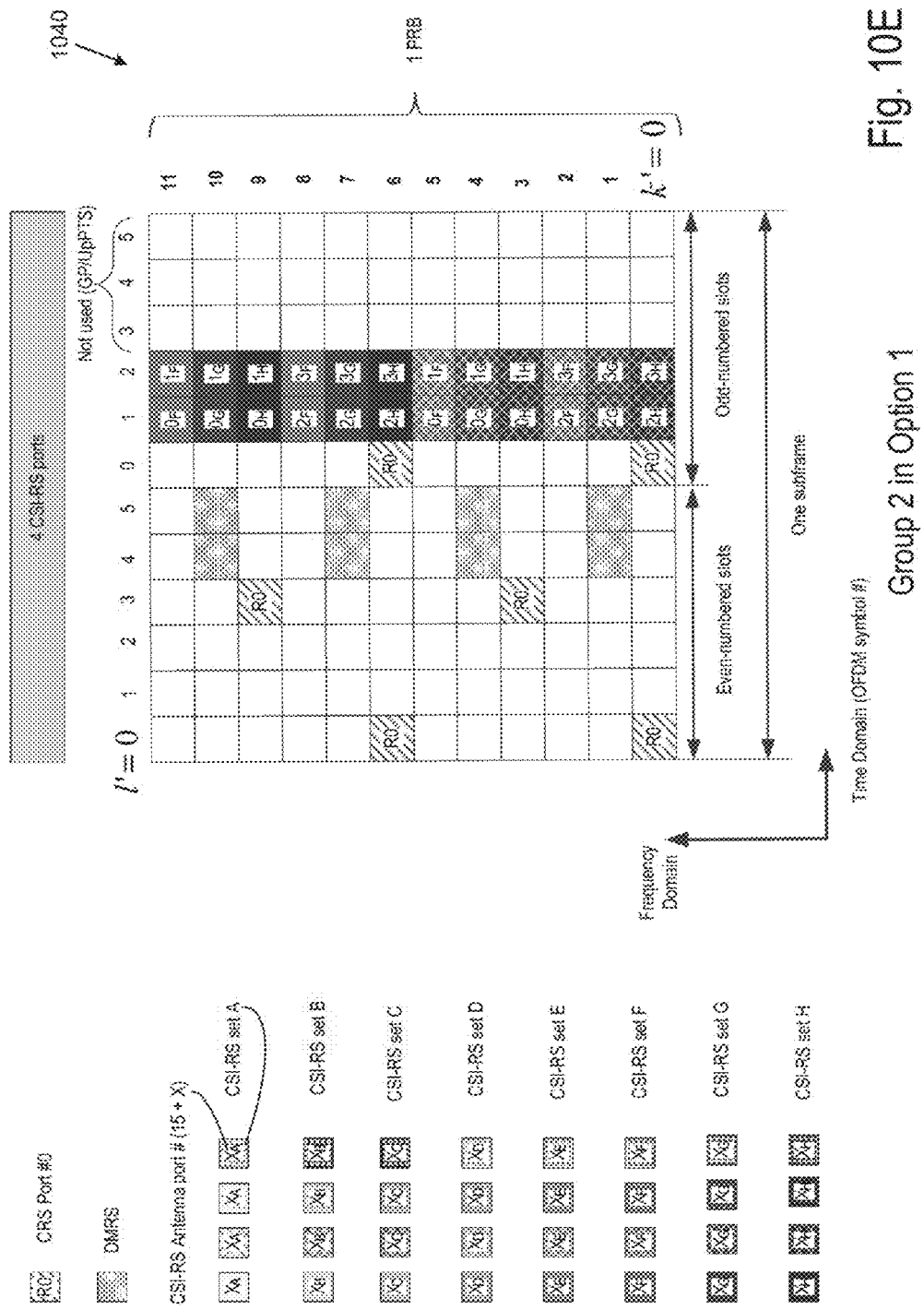

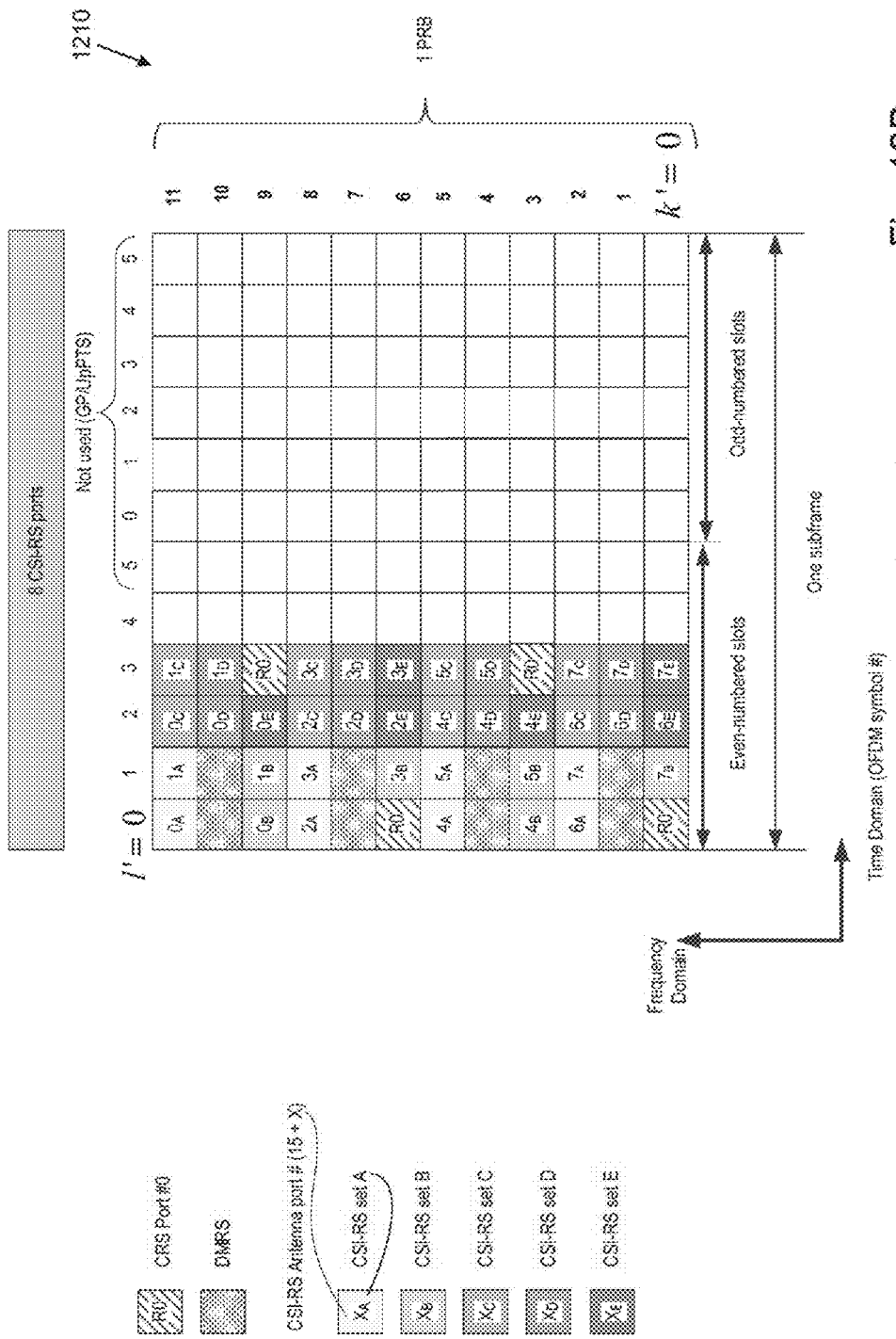

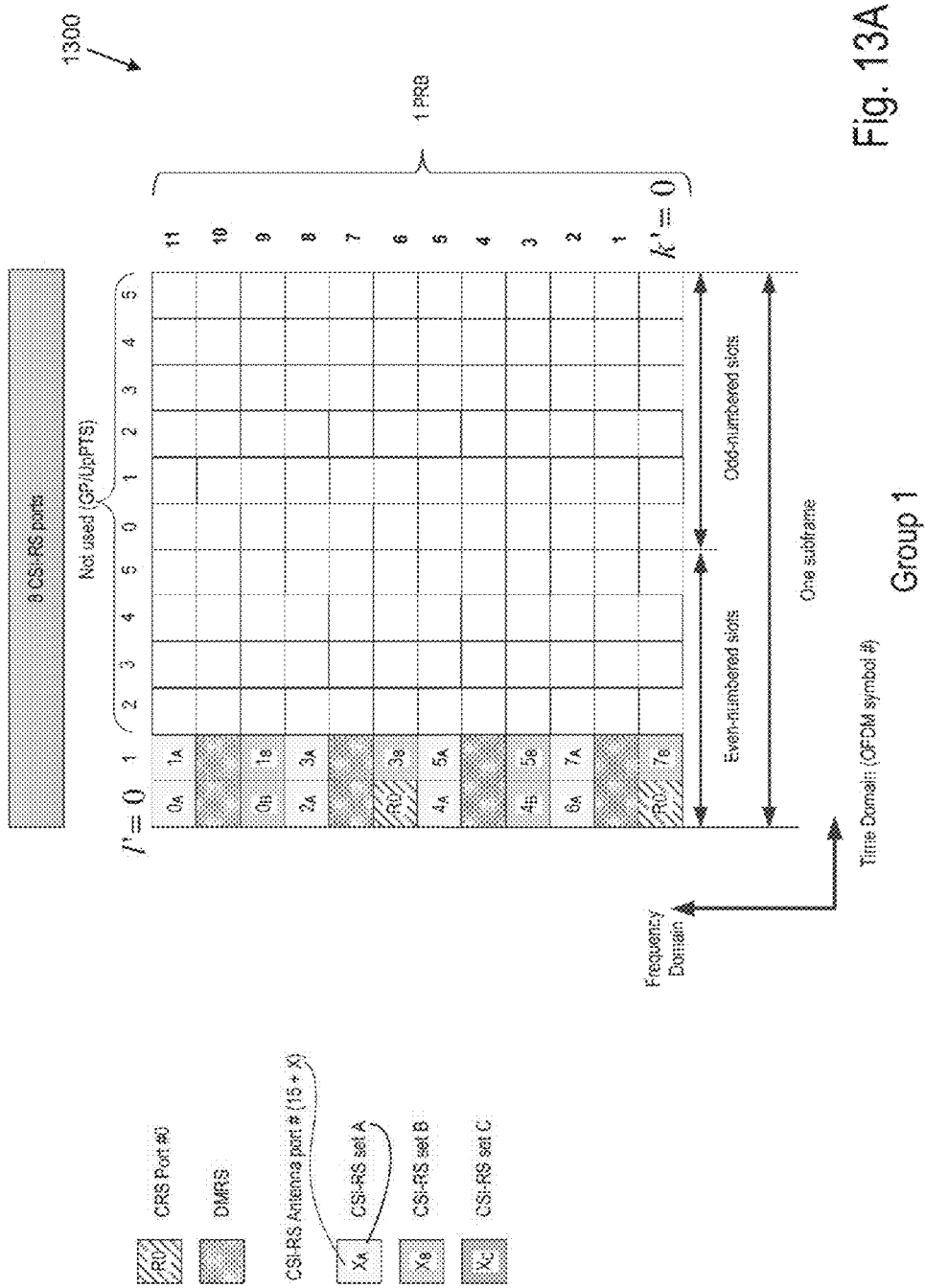

US 9,455,811 B2

CHANNEL STATE INFORMATION-REFERENCE SIGNAL PATTERNS FOR TIME DIVISION DUPLEX SYSTEMS IN LONG TERM EVOLUTION WIRELESS NETWORKS

RELATED APPLICATIONS

This application claims priority benefit of U.S. Provisional Patent Application No. 61/753,914, filed Jan. 17, 2013 which is hereby incorporated by reference herein in its entirety.

TECHNICAL FIELD

Embodiments of the present disclosure relate generally to user equipment (UE) for wireless communications and, more particularly, to UE for wireless communications in wireless networks such as evolved universal terrestrial radio access (E-UTRA) networks (EUTRANs) operating in accordance with third-generation partnership project (3GPP) long term evolution (LTE) network standards.

BACKGROUND INFORMATION

LTE systems provide reference signals (RSs) for measuring wireless channel characteristics. In LTE Release Version No. 8 (Rel-8), many wireless communications facilities employ cell-specific reference signals (CRSs). For example, physical downlink shared channel (PDSCH) demodulation, reference signal received power (RSRP) and reference signal received quality (RSRQ) (RSRP/RSRQ) measurements to rank candidate cells for handover and cell reselection decision, channel quality indicator (CQI) feedback, precoding matrix indicator (PMI) feedback, rank indication (RI) feedback, and other parameters all use CRSs.

In Rel-10, a transition was made from a fundamentally CRS-centric system to a system using UE-specific RSs. The UE-specific RSs now include demodulation reference signals (DMRSs) and cell-specific channel-state information (CSI) reference signals (CSI-RSs) the UE uses to acquire channel-state information. These UE-specific RSs fulfill a number of design goals including reducing the RS overhead, providing interference measurability, reducing RS interference for Coordinated Multi-Point (CoMP) transmission/reception (e.g. CoMP scenario 4 characterized by one common cell-ID shared among multiple cells), and other goals.

BRIEF DESCRIPTION OF THE DRAWINGS

FIGS. 7A, 7B, and 7C are block diagrams of CSI-RS patterns for one (or two), four, and eight antenna ports represented in a PRB of a special subframe having special subframe configuration number nine with a normal CP length, according to a first embodiment (option one).

FIGS. 8A, 8B, and 8C are block diagrams of CSI-RS patterns for one (or two), four, and eight antenna ports represented in a PRB of a special subframe having special subframe configuration number nine with a normal CP length, according to a second embodiment (option two).

FIGS. 9A, 9B, and 9C are block diagrams of CSI-RS patterns for one (or two), four, and eight antenna ports represented in a PRB of a special subframe having special subframe configuration numbers zero or five with a normal CP length.

FIGS. 10D, 10E, and 10F are block diagrams of CSI-RS patterns for one (or two), four, and eight antenna ports represented in a PRB of a special subframe having special subframe configuration numbers one, two, three, five, or six with an extended CP length, according to a second embodiment (group two of option one).

FIGS. 12A, 12B, and 12C are block diagrams of CSI-RS patterns for an eight-antenna port configuration represented in a PRB of a special subframe having special subframe configuration number seven with an extended CP length, according to three embodiments (options one, two, and three).

FIGS. 13A and 13B are block diagrams of CSI-RS patterns for an eight-antenna port configuration represented in a PRB of a special subframe having special subframe configuration numbers zero or four with an extended CP length, according to two embodiments (groups one and two).

DETAILED DESCRIPTION OF EMBODIMENTS

Rel-11 initiated development of a new carrier type (NCT) intended to enhance spectrum efficiency and improve heterogonous network support. The NCT will be a backward-compatible component carrier (CC). For timing/frequency tracking purposes, the NCT features Rel-8 CRSs, but for only resource elements (REs) allocated to antenna port number zero (AP0) in a PRB (or simply, resource block, RB) within one subframe, and according to a 5 ms periodicity. Furthermore, the CRS-based transmission mode one in Rel-8 is not supported on the NCT. This indicates that CSI-RSs and DMRSs go hand in hand in the streamlined NCT design, and that feedback is to be primarily based on CSI-RSs. In summary, it can be observed that CSI-RSs have become increasingly appointed for implementing NCT goals and for meeting the NCT performance requirement for Rel-12 LTE-Advanced (LTE-A) systems.

A CSI-RS pattern means resource elements (REs) allocated for carrying two, four, or eight CSI-RSs in a downlink transmission. For example, a CSI-RS pattern may be expressed in the form of an equation that maps a predetermined resource element in a PRB to corresponding resource elements in each resource block across the entire downlink frequency bandwidth. Additionally, such an equation may map a single resource element to a group of resource elements, according to an antenna port number, e.g., a number of CSI-RSs to configure: one (or two), four, or eight.

Previous CSI-RS configurations have constraints developed to accommodate legacy LTE systems' specifications. For example, in Rel-10, multiple CSI-RS patterns are orthogonal to provide orthogonal separation for different cells. To maximize the number of CSI-RS patterns for inter-cell and intra-cell multiplexing while accounting for the impact on Rel-8 UEs physical downlink shared channel (PDSCH) performance in the face of CSI-RS puncturing, a nested RE-level time/frequency domain shifting structure was adopted with a limited set of configured CSI-RS duty cycle, e.g., CSI-RS transmission intervals (periodicities) in the set including {5, 10, 20, 40, 80} ms. Additionally, to address the potential collision between CSI-RSs and synchronization signal (SS)/master information block (MIB)/system information block one (SIB-1)/paging, the actual CSI-RS subframe is further constrained by the Rel-11 specification that specifies a UE assumes CSI-RSs are not transmitted in the following three cases: in the special subframe(s) in case of frame structure type two; in subframes where transmission of a CSI-RS may collide with transmission of synchronization signals, physical broadcast channel (PBCH), or SIB-1 messages; and in the primary cell in subframes configured for transmission of paging messages in the primary cell for any UE with the cell-specific paging configuration.

Figure 1:
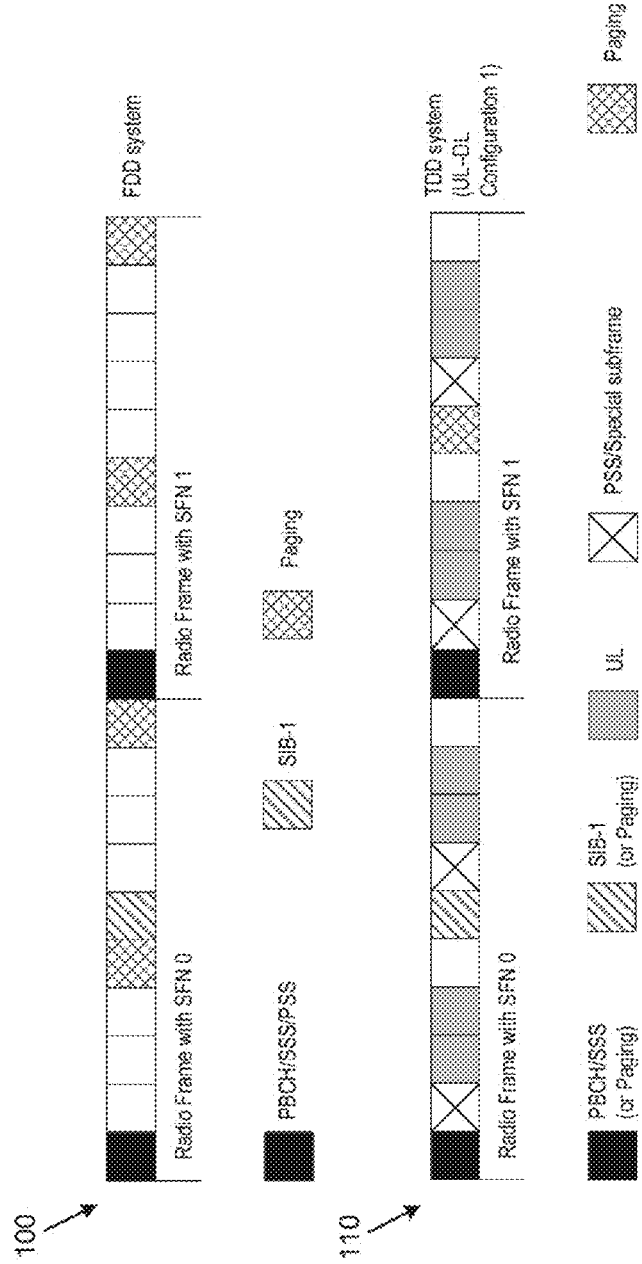
FIG. 1 shows timing diagrams for a pair of radio frames in a frequency-division duplexing (FDD) system and a pair of radio frames in a time-division duplexing (TBD) system.

FIG. 1 is a pair of timing diagrams showing, respectively, frame structure type one (FS1) for two FDD radio frames 100, and frame structure type two (FS2) for two TDD radio frames 110. Each timing diagram shows subframe allocation during its pair of radio frames that are denoted with a system frame number (SFN). For comparison purposes, the radio frames 110 have a balanced TDD UL-DL configuration, TDD configuration one, as specified in 3GPP Technical Specification (TS) No. 36.211, ver. 11.3.0 (3GPP TS 36.211). The number of subframes available for carrying CSI-RSs (so-called CSI-RS subframes) is constrained by the aforementioned legacy LTE systems' specifications. Furthermore, the number of CSI-RS subframes also determines a number of available CSI-RS patterns, as explained in the following example.

FIG. 1 shows the numbers of available subframes for CSI-RSs are different between FDD and TDD systems, and TDD systems have additional CSI-RS subframe constraints. For instance, TDD systems use some subframes as uplink (UL) subframes in each 10 ms radio frame. Although both TDD and FDD systems have two subframes in each radio frame available for paging, which are consequently not available for CSI-RSs, the number of CSI-RS patterns per 5 ms (half radio frame) are reduced from 16/20 in FDD to 5/6 in TDD—an approximately 70% reduction, assuming that there are two paging channels in every radio frame and that the CSI-RS has a 5 ms (half radio frame) duty cycle. In other words, for FDD, a minimum CSI-RS subframes per half radio frame (i.e., in the first half radio frame) is three, and a maximum number of CSI-RS subframes per half radio frame is five. Because each CSI-RS subframe has five possible CSI-RS patterns in an eight-antenna port configuration, and one additional CSI-RS pattern exists in the PBCH subframe zero, which includes primary synchronization signal (PSS) or secondary synchronization signal (SSS), the total number of CSI-RS patterns in FDD for eight antenna ports equals 16 (3 CSI-RS subframes*5 patterns+1 pattern) total CSI-RS patterns per half radio frame; or 20 (4 CSI-RS patterns*5 patterns+1 pattern). Similarly, for TDD systems, within 5 ms the minimum CSI-RS subframe is one CSI-subframe and there are five CSI-RS patterns for the 8-antenna case, so the total number is (5*1)=5; or (5*1)+1=6. Table 1 gives a comparison of the actual number of CSI-RS subframes available based on different CSI-RS duty cycles.

TABLE 1

Comparison of CSI-RS patterns in FDD and TDD systems

| | CSI-RS Duty Cycle | | | | |
|---|---|---|---|---|---|
| | 5 ms | 10 ms | 20 ms | 40 ms | 80 ms |
| FDD | 16/20 | 30/35 | 65 | 130 | 260 |
| TDD (configuration one) | 5/6 | 10 | 20 | 40 | 80 |

Table 1 shows that there is a relative shortage of downlink (DL) subframes available for carrying CSI-RSs in TDD configuration one. Moreover, no CSI-RS subframe is available for TDD UL-DL configuration zero. Thus, there may be a CSI-RS resource shortage for the NCT.

For example, with LTE Rel-12, network operators expressed interest in optimizing radio resource utilization for small-cell deployment scenario because they observed the traffic data is highly bursty—sometimes it is UL-heavy and sometimes becomes DL-heavy. To satisfy traffic loads and thereby improve the radio efficiency, the network operators have sought to enable a so-called traffic adaption mechanism to allow some of subframes within one radio frame to be dynamically changed between DL and UL, rather than be static and fixed transmission direction as in previous LTE versions. Because the NCT provides for control of overhead reduction, and the small-cell deployment is contemplated for Rel-12, an operator may deploy the NCT including the traffic adaption feature on small cell scenario as opposed to deploying a legacy carrier type. Thus, it is noted that the aforementioned CSI-RS resource-shortage may be problematic for denser small-cell deployments in Rel-12 in which the traffic adaptation mechanism is deployed on the NCT to meet traffic conditions, because of the following two factors.

First, an increased number of CSI-RS patterns benefits other proposed enhancements. In 3GPP work item document (WID) no. RP-121415, titled "New Carrier Type for LTE" (core), it was described that enhancements for the NCT may also consider the findings of the small-cell related Rel-12 studies. To facilitate the CoMP cooperation, a Rel-11 UE can be configured to make one or more CSI reports per CC, and each CSI report is configured by the association of a Channel Part (e.g., one non-zero power (NZP) CSI-RS pattern in CoMP measurement set) and an Interference Part (e.g., configured as a zero power (ZP) CSI-RS pattern) for measurement. Such an enhancement would use more orthogonal CSI-RS patterns to enable the CoMP features in the denser small-cell enhancement in Rel-12 because each small cell is allocated with an orthogonal NZP CSI-RS and multiple ZP CSI-RS patterns that facilitate the CoMP operation. The increased allocation of CSI-RSs may result in a shortage of CSI-RS patterns in denser small-cell deployment scenarios.

Second, there is a decreased availability of CSI-RS subframes available for shifting. A recent 3GPP Technical Specifications Groups (TSG) Radio Access Network (RAN) meeting no. 58 developed a WID no. RP-121772, titled "Further Enhancements to LTE TDD for DL-UL Interference Management and Traffic Adaptation," that was approved to provide an additional mechanism such as the foregoing dynamic allocation of subframes to UL or DL. In the WID, it was observed that the fast traffic adaptation on the order of a 10 ms timescale provides maximum packet throughput performance gains for low and medium system loads. The performance gains get smaller for slower adaptation timescales and are diminished for 640 ms timescale. Assuming a 10 ms reconfiguration timescale is supported on the NCT would translated into just the first two subframes in every radio frame being suitable for CSI-RS transmission (due to fixed transmission direction property of those subframes).

Based on the previous discussions and observations, the available CSI-RS resources (i.e., CSI-RS subframes and available CSI-RS patterns) may not enable Rel-12 targeted functionality. This disclosure discusses embodiments to increase the resources available for CSI-RSs.

A. CSI-RS Special Subframe Configuration

In some embodiments, a UE receives CSI-RSs that are transmitted from an eNB in a special subframe. A special subframe is a subframe in TDD systems that provide time for transitioning from a downlink subframe to an uplink subframe. A special subframe, therefore, has its duration divided into three sections: a downlink pilot time slot (DwPTS), a guard period (GP), and an uplink pilot time slot (UpPTS). The relative durations of the sections are established by a predefined subframe configuration value that is provided by an eNB to the UE. The DwPTS is used to carry different types of downlink, including user data, whereas the UpPTS carries uplink information.

As an aside, durations in LTE systems are sometimes expressed in units of orthogonal frequency division modulation (OFDM) symbols (so-called symbol duration $T_s$). Additional information concerning special subframes (SSFs) and SSF configurations is available in the aforementioned 3GPP TS 36.211.

The CSI-RS (special) subframe configuration periodicity $T_{CSI-RS}$ and the subframe offset $\Delta_{CIS-RS}$ for the occurrence of CSI-RS are listed in Table 2 and are used for defining a temporal location of CSI-RS subframes in a radio frame.

TABLE 2

CSI-RS subframe configuration.

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

The parameter $I_{CSI-RS}$ can be configured separately for CSI-RSs for which the UE shall assume non-zero and zero transmission power. Subframes containing CSI-RSs satisfy the following equation:

$$(10n_f+\lfloor n_s/2 \rfloor-\Delta_{CSI-RS}) \bmod T_{CSI-RS}=0. \quad (1)$$

where $n_f$ is a SFN, and $n_s$ is a slot number.

Figure 2:
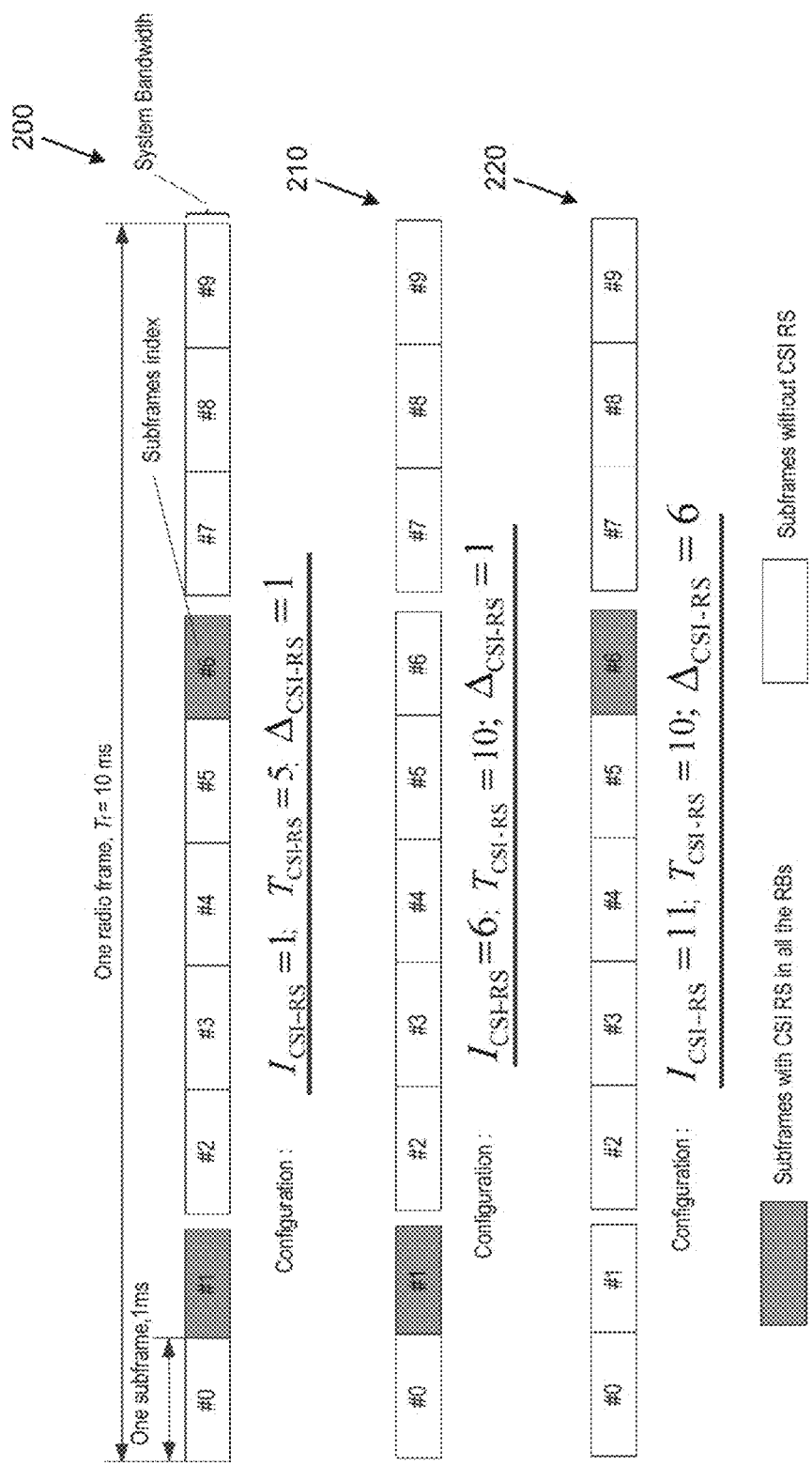
FIG. 2 are three timing diagrams of a CSI-RS transmission during special subframes of frame structure type two.

In one embodiment, a configured $I_{CSI-RS}$ value is conveyed to the Rel-12 UE through higher-layer radio resource control (RRC) signaling to achieve different CSI-RS subframe configurations. For example, FIG. 2 shows three example configurations 200, 210, and 220:

$I_{CSI-RS}$=1 to indicate the CSI-RS transmission on special subframe 1 and 6 every radio frame $I_{CSI-RS}$=6 to indicate CSI-RS transmission on special subframe 1 every radio frame $I_{CSI-RS}$=11 to indicate CSI-RS transmission on subframe 6 every radio frame.

As can be seen from the sequence 1, 6, 11, and so on, the CSI-RS subframe configuration value $I_{CSI-RS}$ has a value that may be determined according to the expression 1+(x*5), where x satisfies the relationship 0≤x≤30.

B. CSI-RS Patterns

In subframes configured for CSI-RS transmission, one embodiment provides for a high re-use factor in CSI-RS patterns that are designed so as to minimize CSI-RS to CSI-RS interference as much as possible. Such interference typically degrades performance, particularly for low-load and denser deployed small-cell scenarios.

Different CSI-RS patterns for transmission in the special subframe are designed depending on the downlink Cyclic Prefix (CP) length, DMRS patterns, and OFDM symbols ($T_s$) available in a DwPTS in frame structure type 2 (i.e., TDD). Thus, a first group of embodiments in this section include CSI-RS patterns suitable for use with a subset of possible special subframe configurations. For instance, CSI-RS patterns are provided for all special subframe configurations with the exception of configuration 0 and 5 in a normal CP case, or configuration 0 and 4 in an extended CP case. A second group of embodiments include CSI-RS patterns suitable for all possible subframe configurations.

B.1: Truncating a Predefined Set of CSI-RS Patterns According to OFDM Symbols Available in DwPTS One embodiment for increasing the number of available CSI-RS patterns includes selecting those patterns used for normal downlink subframes that are also suitable for use in the OFDM symbols available in a DwPTS of a special subframe. The DwPTS has been used previously to accommodate user data, and the inventors recognized is also suitable for CSI-RSs. Thus, this section describes an existing set of CSI-RS patterns defined in Rel-10 that are truncated according to the available OFDM symbols in DwPTS.

In special subframes configured for CSI-RS transmission, the reference signal sequence are be mapped to complex-valued modulation symbols $a_{k,l}^{(p)}$ used as reference symbols on antenna port p according to $a_{k,l}^{(p)}=w_{l''}\cdot r_{l,n_s}(m')$ where $$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases} \quad (2)$$

$$l = l'' + \begin{cases} l'' & \text{CSI reference signal configurations } 0 - X, \\ & \text{normal cyclic prefix} \\ 2l'' & \text{CSI reference signal configurations } (X+1) - Y, \\ & \text{normal cyclic prefix} \\ l'' & \text{CSI reference signal configurations } 0 - Z, \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

where m is used to map the CSI-RS pattern from one PRB to onto each other PRB throughout the frequency bandwidth of the carrier, where k' and l' are defined in tables of following subsections, and where X, Y, and Z values represent CSI-RS configurations of 3GPP TS 36.211, Table 6.10.5.2-1. For example, 0-X means CSI-RS configuration 0 through X. Values for X, Y, and Z are provided in Table 3:

TABLE 3

Parameter values for CSI-RS mapping in special subframe

| Parameter | SSF configuration with Normal CP | | SSF configuration with Extended CP (Configuration 1, 2, 3, 5 and 6) |
|---|---|---|---|
| | SSF Configuration 3, 4 and 8 | SSF Configuration 1, 2, 6, and 7 | |
| X | 9 | 3 | — |
| Y | 15 | — | — |
| Z | — | — | 19 |

Resource elements (k,l) are used for transmission of CSI-RSs on any of the antenna ports in the set s, where s={15}, S={15,16}, S={17,18}, S={19,20} or S={21,22}. As noted previously, (k',l') are provided in the following paragraphs for various SSF configurations with normal CP (subsection B.1.1) and with extended CP (subsection B.1.2).

B.1.1: Normal CP

The quantity (k',l') and a condition on $n_s$ for special subframe configuration three, four and eight are provided in Table 4; special subframe configuration one, two, six, and seven are provided in Table 5. When employing this embodiment in a TDD system, no CSI-RS resources are configurable by the eNB for special subframe configuration zero, five, and nine because those configurations have fewer than four OFDM symbols available for the DwPTS. Four or more symbols are needed to accommodate the CSI-RS of this section. Therefore, other embodiments described in latter sections are provided to accommodate those subframe configurations.

In the tables, (k',l') generally correspond to a resource element in a slot of a PRB. For example, (9,5) corresponds to subcarrier index value k' equal to 9, and a symbol index value l' equal to 5. The symbol index value has an even numbered slot when $n_s$ mod 2 is zero, or an odd number slot when $n_s$ mod 2 is one. As shown in Table 4, (9,5) is available for one (or two), four, or eight antenna port configurations so that an eNB may select from the appropriate column based in its number of physical or virtual antenna port resources.

TABLE 4

Mapping from CSI-RS configuration to (k', l') for normal CP (Special subframe configuration 3, 4 and 8).

| CSI reference signal configuration | Number of CSI-RSs configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 0 | (9, 5) | 0 | (9, 5) | 0 | (9, 5) | 0 |
| 1 | (9, 2) | 1 | (9, 2) | 1 | (9, 2) | 1 |
| 2 | (8, 5) | 0 | (8, 5) | 0 | | |
| 3 | (8, 2) | 1 | (8, 2) | 1 | | |
| 4 | (3, 5) | 0 | | | | |
| 5 | (2, 5) | 0 | | | | |
| 6 | (7, 2) | 1 | | | | |
| 7 | (4, 2) | 1 | | | | |
| 8 | (3, 2) | 1 | | | | |
| 9 | (2, 2) | 1 | | | | |
| 10 | (9, 1) | 1 | (9, 1) | 1 | (9, 1) | 1 |
| 11 | (8, 1) | 1 | (8, 1) | 1 | | |
| 12 | (7, 1) | 1 | | | | |
| 13 | (4, 1) | 1 | | | | |
| 14 | (3, 1) | 1 | | | | |
| 15 | (2, 1) | 1 | | | | |

TABLE 5

Mapping from CSI-RS configuration to (k', l') for normal CP (Special subframe configuration 1, 2, 6, and 7).

| CSI reference signal configuration | Number of CSI-RSs configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 0 | (9, 5) | 0 | (9, 5) | 0 | (9, 5) | 0 |
| 1 | (8, 5) | 0 | (8, 5) | 0 | | |
| 2 | (3, 5) | 0 | | | | |
| 3 | (2, 5) | 0 | | | | |

B.1.2: Extended CP

The quantity (k',l') and a condition on $n_s$ for special subframe configuration one, two, three, five, and six are provided in Table 6. When employing this embodiment in a TDD system, no CSI-RS resources are configurable by the eNB for special subframe configuration zero, four, and seven for previously mentioned reasons.

TABLE 6

Mapping from CSI-RS configuration to (k', l') for extended CP (Special subframe configuration 1, 2, 3, 5 and 6)

| CSI reference signal configuration | Number of CSI-RS configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 0 | (11, 4) | 0 | (11, 4) | 0 | (11, 4) | 0 |
| 1 | (9, 4) | 0 | (9, 4) | 0 | (9, 4) | 0 |
| 2 | (5, 4) | 0 | (5, 4) | 0 | | |
| 3 | (3, 4) | 0 | (3, 4) | 0 | | |
| 4 | (8, 4) | 0 | | | | |
| 5 | (6, 4) | 0 | | | | |
| 6 | (2, 4) | 0 | | | | |
| 7 | (0, 4) | 0 | | | | |
| 8 | (11, 1) | 1 | (11, 1) | 1 | (11, 1) | 1 |
| 9 | (10, 1) | 1 | (10, 1) | 1 | (10, 1) | 1 |
| 10 | (9, 1) | 1 | (9, 1) | 1 | (9, 1) | 1 |

TABLE 6-continued

Mapping from CSI-RS configuration to (k', l') for extended CP
(Special subframe configuration 1, 2, 3, 5 and 6)

| CSI reference signal configuration | Number of CSI-RS configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 11 | (5, 1) | 1 | (5, 1) | 1 | | |
| 12 | (4, 1) | 1 | (4, 1) | 1 | | |
| 13 | (3, 1) | 1 | (3, 1) | 1 | | |
| 14 | (8, 1) | 1 | | | | |
| 15 | (7, 1) | 1 | | | | |
| 16 | (6, 1) | 1 | | | | |
| 17 | (2, 1) | 1 | | | | |
| 18 | (1, 1) | 1 | | | | |
| 19 | (0, 1) | 1 | | | | |

B.2: Rel-12 CSI-RS Patterns

Although embodiments of section B.1 are available with less standardized/implementation/test efforts, additional CSI-RS pattern embodiments for Rel-12 special subframe configurations are described in this section for the following reasons.

First, there are a reduced number of patterns available for special subframe configurations one, two, three, five, and six because fewer OFDM symbols are available in a special subframe compared to those of a typical downlink subframe. This constrains where CSI-RS REs may be located. For instance, with subframe configurations one and five, there are just two sets of CSI-RSs configurable for the eight-antenna port cases. Such a constraint leads to smaller CSI-RS reuse factors and consequently inhibits flexibility in providing orthogonal intra-cell CSI-RS coordination, particularly with denser small-cell deployment scenarios in Rel-12 and CoMP scenario 4 (i.e., a typical scenario characterized by many eNBs sharing with one cell-ID within one macro-eNB's coverage range).

Second, no CSI-RS pattern is available to be configured for some typical scenarios: special subframe configurations zero, five, and nine in a normal CP case, and special subframe configurations zero, four, and seven in an extended CP case.

Third, the NCT has properties that differentiate it from a legacy carrier type (LCT). For example, REs allocated to CRS AP0 are used in only one subframe per five subframes. Also, there is no legacy control region is present in the NCT, which permits use of CSI-RSs within the first several OFDM symbols of a subframe.

With these considerations in mind, the CSI-RS patterns provided in this section are designed to provide as many CSI-RS patterns in special subframes as the Rel-10 normal downlink subframe. For the new CSI-RS patterns, a nested structure of CSI-RS antenna ports two/four/eight simplifies the implementation. A nested structure means resource elements of a pattern with fewer CSI-RS ports is a subset of resource elements of the pattern with more CSI-RS ports.

B.2.1: Normal CP

In the case of a normal CP, the following equation (3) identifies resource elements (k,l) used for transmission of CSI-RSs on any of the antenna ports in the set s, where S={15}, S={15,16}, S={17,18}, S={19,20} or S={21,22}. In special subframes configured for CSI-RS transmission, the reference signal sequence is mapped to complex-valued modulation symbols $a_{k,l}^{(p)}$ used as reference symbols on antenna port p where $$k = k' + 12m + \begin{cases} -0 & \text{for } p \in \{15, 16\}, \text{normal cyclic prefix} \\ -6 & \text{for } p \in \{17, 18\}, \text{normal cyclic prefix} \\ -1 & \text{for } p \in \{19, 20\}, \text{normal cyclic prefix} \\ -7 & \text{for } p \in \{21, 22\}, \text{normal cyclic prefix} \end{cases}$$

$$l = l' + l''$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

If no additional description appears in following paragraphs, the equation (3) is also to be used for CSI-RS resource elements (k,l) within this subsections of this section B.2.1, according to the values (k',l') expressed in corresponding tables and indicated by an eNB to a UE through higher-layer signalling.

B.2.1.1: Special Subframe Configurations Three, Four, and Eight

The quantity (k',l') and a condition on $n_s$ are provided in Table 7.

TABLE 7

Mapping from CSI-RS configuration to (k', l') for normal CP
(Special subframe configuration 3, 4 and 8).

| CSI reference signal configuration | Number of CSI-RS configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 0* | (11, 0) | 0 | (11, 0) | 0 | (11, 0) | 0 |
| 1* | (9, 0) | 0 | (9, 0) | 0 | (9, 0) | 0 |
| 2* | (7, 0) | 0 | (7, 0) | 0 | (7, 0) | 0 |
| 3 | (9, 2) | 0 | (9, 2) | 0 | (9, 2) | 0 |
| 4 | (11, 5) | 0 | (11, 5) | 0 | (11, 5) | 0 |
| 5 | (9, 5) | 0 | (9, 5) | 0 | (9, 5) | 0 |
| 6 | (7, 5) | 0 | (7, 5) | 0 | (7, 5) | 0 |
| 7* | (11, 0) | 1 | (11, 0) | 1 | (11, 0) | 1 |
| 8* | (9, 0) | 1 | (9, 0) | 1 | (9, 0) | 1 |
| 9* | (7, 0) | 1 | (7, 0) | 1 | (7, 0) | 1 |
| 10 | (9, 2) | 1 | (9, 2) | 1 | (9, 2) | 1 |
| 11* | (10, 0) | 0 | (10, 0) | 0 | | |
| 12* | (8, 0) | 0 | (8, 0) | 0 | | |
| 13* | (6, 0) | 0 | (6, 0) | 0 | | |
| 14 | (8, 2) | 0 | (8, 2) | 0 | | |
| 15 | (10, 5) | 0 | (10, 5) | 0 | | |
| 16 | (8, 5) | 0 | (8, 5) | 0 | | |
| 17 | (6, 5) | 0 | (6, 5) | 0 | | |
| 18* | (10, 0) | 1 | (10, 0) | 1 | | |
| 19* | (8, 0) | 1 | (8, 0) | 1 | | |
| 20* | (6, 0) | 1 | (6, 0) | 1 | | |
| 21 | (8, 2) | 1 | (8, 2) | 1 | | |
| 22* | (5, 0) | 0 | | | | |
| 23* | (4, 0) | 0 | | | | |
| 24* | (3, 0) | 0 | | | | |
| 25* | (2, 0) | 0 | | | | |
| 26* | (1, 0) | 0 | | | | |
| 27* | (0, 0) | 0 | | | | |
| 28 | (3, 2) | 0 | | | | |
| 29 | (2, 2) | 0 | | | | |
| 30 | (5, 5) | 0 | | | | |
| 31 | (4, 5) | 0 | | | | |
| 32 | (3, 5) | 0 | | | | |
| 33 | (2, 5) | 0 | | | | |
| 34 | (1, 5) | 0 | | | | |
| 35 | (0, 5) | 0 | | | | |
| 36* | (5, 0) | 1 | | | | |
| 37* | (4, 0) | 1 | | | | |
| 38* | (3, 0) | 1 | | | | |

TABLE 7-continued

Mapping from CSI-RS configuration to (k', l') for normal CP
(Special subframe configuration 3, 4 and 8).

| CSI reference signal configuration | 1 or 2 | | 4 | | 8 | |
|---|---|---|---|---|---|---|
| | (k', l') | $n_s$ mod 2 | (k', l') | $n_s$ mod 2 | (k', l') | $n_s$ mod 2 |
| 39* | (2, 0) | 1 | | | | |
| 40* | (1, 0) | 1 | | | | |
| 41* | (0, 0) | 1 | | | | |
| 42 | (3, 2) | 1 | | | | |
| 43 | (2, 2) | 1 | | | | |

In Table 7, it is assumed that Rel-10 a code-division multiplexing TDD (CDM-T) structure is used for CSI-RS port multiplexing. In other words, the expression l"=0,1 maps a single value of l' to a pair of symbols used in a pair of CSI-RS patterns. Therefore, a one-port CSI-RS pattern is typically allocated for one or two antenna ports. Further, the CSI-RS patterns derived from quantities (k',l') denoted with asterisks (*) allow partial use of CSI-RS REs on the same OFDM symbols allocated for carrying CRS AP0. This dual-allocation provides additional orthogonal intra-cell CSI-RS patterns for eNB configuration, which is not permitted with Rel-10. In some embodiments, CSI-RS patterns are also allocated in the first two OFDM symbols in a special subframe because the NCT does not include a legacy PDCCH region.

The CSI-RS patterns represented in Table 7 are feasible due to the following two reasons. First, CRS AP0 transmission may not be allowed or configured on a special subframe of the NCT due to the limited number of available OFDM symbols in a DwPTS. If transmission of CRS AP0 were allowed in a special subframe, timing/frequency tracking performance relying on CRS AP0 may be degraded because some special subframes have few OFDM symbols available for providing CRSs and the timing/frequency tracking typically performs some correlation operation and interpolation across multiple CRS in different OFDM symbols. Second, frequency (subcarrier) shifting of CRS locations is associated with physical cell-ID, as defined in Rel-8. For example, CRS frequency domain locations are tied to cell-ID, and a cell-specific frequency shift is applied according to an expression equal to the cell-ID mod six. This shift can avoid time-frequency collisions between CRSs from up to six adjacent cells. Moreover, for a given particular eNB, there is freedom for the eNB scheduler to select one of the usable CSI-RS patterns according to its cell-ID. For example, for the eNB with cell-ID, $N_{ID}^{Cell}=1$, all but one of the CSI-RS patterns of Table 7 may be properly configured, except for CSI-RS set 3 (configuration 2*) when eight CSI-RS ports are configured at UE side.

On the other hand, it is possible to avoid a collision between CSI-RS patterns and CRS AP0 by partially or fully removing the asterisk-labelled items in Table 7 to develop another CSI-RS configuration table, while still providing similar orthogonal CSI-RS patterns as provided by normal DL subframes. Thus, any table constructed by a partial combinations of items in Table 7 is not departing from the spirit and scope of the disclosure, and therefore falls within its scope. For example, according to one embodiment, Table 8 provides an example of a CSI-RS pattern designed to avoid collision between CSI-RS and CRS AP0.

TABLE 8

Mapping from CSI-RS configuration to (k', l') for normal CP
(Special subframe configuration 3, 4 and 8).

| CSI reference signal configuration | 1 or 2 | | 4 | | 8 | |
|---|---|---|---|---|---|---|
| | (k', l') | $n_s$ mod 2 | (k', l') | $n_s$ mod 2 | (k', l') | $n_s$ mod 2 |
| 0 | (9, 2) | 0 | (9, 2) | 0 | (9, 2) | 0 |
| 1 | (11, 5) | 0 | (11, 5) | 0 | (11, 5) | 0 |
| 2 | (9, 5) | 0 | (9, 5) | 0 | (9, 5) | 0 |
| 3 | (7, 5) | 0 | (7, 5) | 0 | (7, 5) | 0 |
| 4 | (9, 2) | 1 | (9, 2) | 1 | (9, 2) | 1 |
| 5 | (8, 2) | 0 | (8, 2) | 0 | | |
| 6 | (10, 5) | 0 | (10, 5) | 0 | | |
| 7 | (8, 5) | 0 | (8, 5) | 0 | | |
| 8 | (6, 5) | 0 | (6, 5) | 0 | | |
| 9 | (8, 2) | 1 | (8, 2) | 1 | | |
| 10 | (3, 2) | 0 | | | | |
| 11 | (2, 2) | 0 | | | | |
| 12 | (5, 5) | 0 | | | | |
| 13 | (4, 5) | 0 | | | | |
| 14 | (3, 5) | 0 | | | | |
| 15 | (2, 5) | 0 | | | | |
| 16 | (1, 5) | 0 | | | | |
| 17 | (0, 5) | 0 | | | | |
| 18 | (3, 2) | 1 | | | | |
| 19 | (2, 2) | 1 | | | | |

Figure 3A:
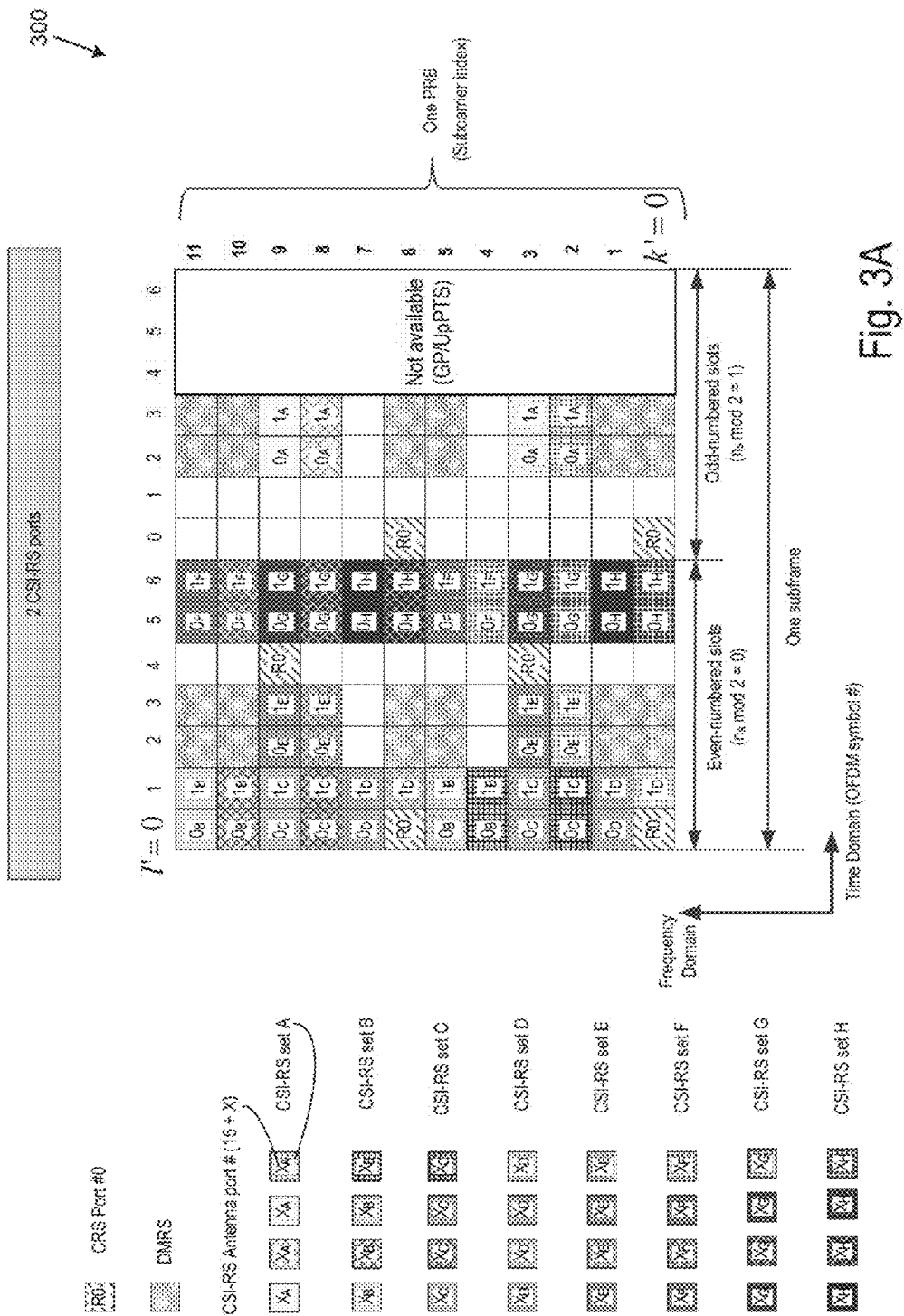
FIGS. 3A, 3B, and 3C are block diagrams of CSI-RS patterns for one (or two), four, and eight antenna ports represented in a physical resource block (PRB) of a special subframe having special subframe configuration numbers three, four, or eight with a normal cyclic prefix (CP) length.
Figure 3B:
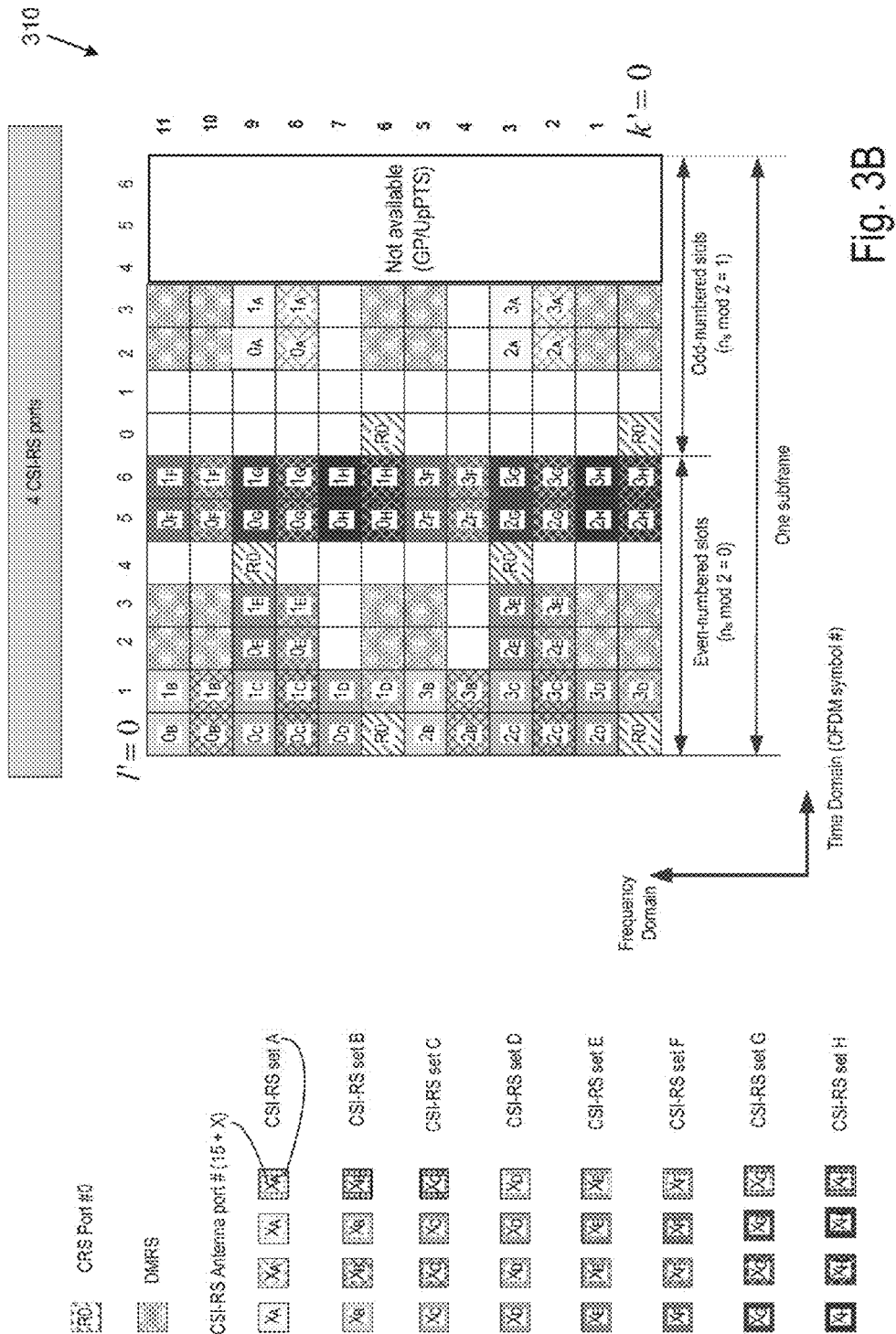
Figure 3C:
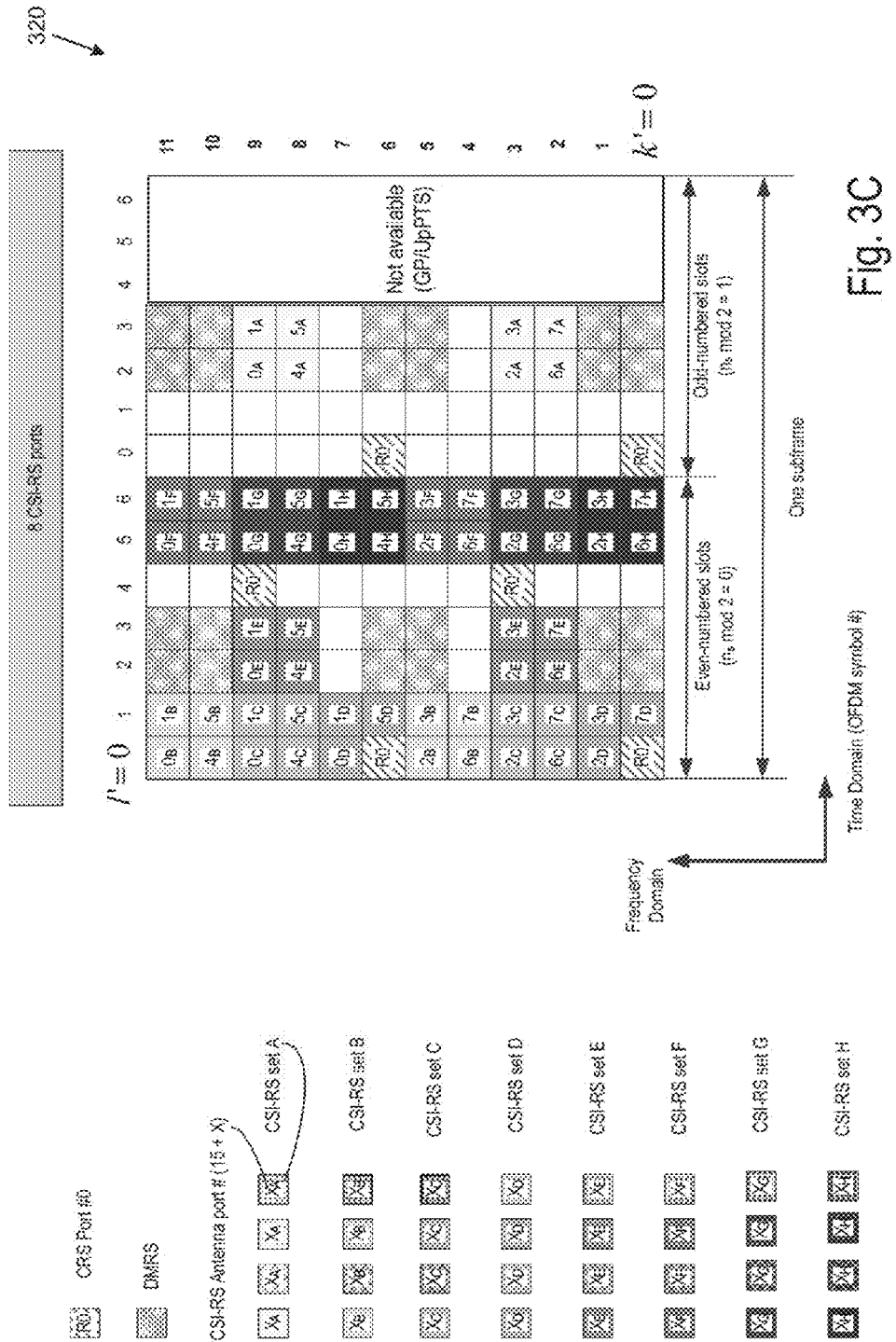

A CSI-RS pattern set (or simply, a CSI-RS set) is generated by mapping a given resource element (k', l') to up to eight CSI-RS patterns (k, l). For example, CSI-RS set A in FIGS. 3A-C corresponds to CSI-RS configuration 4 of Table 8—or (k', l') equal to (9, 2) in an odd number slot—that has been mapped to eight values according to equation (3). FIGS. 3A-C show CSI-RS sets A-F.

In general, for drawing figures showing CSI-RS sets, resource elements of a CSI-RS set share a similar subscript letter (i.e., "A", "B", and so on). Furthermore, as explained in the following paragraphs, different background textures of resource elements within the sets indicate those resource elements that are available for different cell-IDs. Resource elements are numbered in the drawing figures. The numbers are added to 15 to indicate the antenna port number.

FIG. 3A shows resource elements 300 used for CSI-RS sets in a two-port configuration. Similarly, FIG. 3B shows resource elements 310 for a four-port configuration, and FIG. 3C shows resource elements 320 for an eight-port configuration.

FIGS. 3A-C also show that the CSI-RS sets may be used for different cells. For example, CSI-RS sets of FIG. 3A include four different background textures: solid, checked, stippled, and crosshatched. Each background texture represents a CSI-RS pattern that may be allocated for a cell. In contrast, FIG. 3C shows one (solid) texture per CSI-RS set because all eight resource elements in each of the FIG. 3C CSI-RS sets are used for a single cell having eight antenna ports. That leaves no resource elements remaining for accommodating multiple cells in a single CSI-RS set, as in FIG. 3A with four cells per CSI-RS set and in FIG. 3B with two cells per CSI-RS set.

As shown FIGS. 3A-C, in the case where an eNB has $N_{ID}^{Cell}=0$, a collision between CSI-RS REs and CRS AP0 REs is fully avoided on OFDM symbols 0 and 1 of an odd numbered slot, but conditionally avoided on OFDM symbol 0 and 1 of an even numbered slot. Conditionally avoided means that an eNB transmits a CRS in a resource element that may also be allocated for a CSI-RS. Thus, an eNB may need to select a non-conflicting CSI-RS set based on its allocated CRS AP0 location that typically depends on the eNB's cell identification number. For example, CSI-RS set D includes resource elements that conditionally avoid CRS AP0.

B.2.1.2: Special Subframe Configurations One, Two, Six, and Seven

The quantity (k',l') and a condition on $n_s$ are provided in Table 9.

With respect to group one of Table 9, another embodiment increases the number of available CSI-RS patterns, but still avoids possible collision with CRS AP0. For example, groups three and/or four of Table 10 may be used in addition or as an alternative to group two of Table 9. For CSI-RS patterns of group three, resource elements (k,l) used for transmission of CSI-RS on any of the antenna ports are calculated with equation (3) with l''=0,7, whereas, for group four, the parameters (k,l) are calculated as follows:

TABLE 9

Mapping from CSI-RS configuration to (k', l') for normal CP
(Special subframe configuration 1, 2, 6, and 7).

| | CSI reference signal configuration | Number of CSI-RS configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Group 1 | 0 | (9, 2) | 0 | (9, 2) | 0 | (9, 2) | 0 |
| | 1 | (9, 5) | 0 | (9, 5) | 0 | (9, 5) | 0 |
| | 2 | (8, 2) | 0 | (8, 2) | 0 | | |
| | 3 | (8, 5) | 0 | (8, 5) | 0 | | |
| | 4 | (3, 2) | 0 | | | | |
| | 5 | (2, 2) | 0 | | | | |
| | 6 | (3, 5) | 0 | | | | |
| | 7 | (2, 5) | 0 | | | | |
| Group 2 | 0 | (11, 0) | 0 | (11, 0) | 0 | (11, 0) | 0 |
| | 1 | (9, 0) | 0 | (9, 0) | 0 | (9, 0) | 0 |
| | 2 | (7, 0) | 0 | (7, 0) | 0 | (7, 0) | 0 |
| | 3 | (11, 0) | 1 | (11, 0) | 1 | (11, 0) | 1 |
| | 4 | (9, 0) | 1 | (9, 0) | 1 | (9, 0) | 1 |
| | 5 | (7, 0) | 1 | (7, 0) | 1 | (7, 0) | 1 |
| | 6 | (10, 0) | 0 | (10, 0) | 0 | | |
| | 7 | (8, 0) | 0 | (8, 0) | 0 | | |
| | 8 | (6, 0) | 0 | (6, 0) | 0 | | |
| | 9 | (10, 0) | 1 | (10, 0) | 1 | | |
| | 10 | (8, 0) | 1 | (8, 0) | 1 | | |
| | 11 | (6, 0) | 1 | (6, 0) | 1 | | |
| | 12 | (5, 0) | 0 | | | | |
| | 13 | (4, 0) | 0 | | | | |
| | 14 | (3, 0) | 0 | | | | |
| | 15 | (2, 0) | 0 | | | | |
| | 16 | (1, 0) | 0 | | | | |
| | 17 | (0, 0) | 0 | | | | |
| | 18 | (5, 0) | 1 | | | | |
| | 19 | (4, 0) | 1 | | | | |
| | 20 | (3, 0) | 1 | | | | |
| | 21 | (2, 0) | 1 | | | | |
| | 22 | (1, 0) | 1 | | | | |
| | 23 | (0, 0) | 1 | | | | |

Figure 4A:
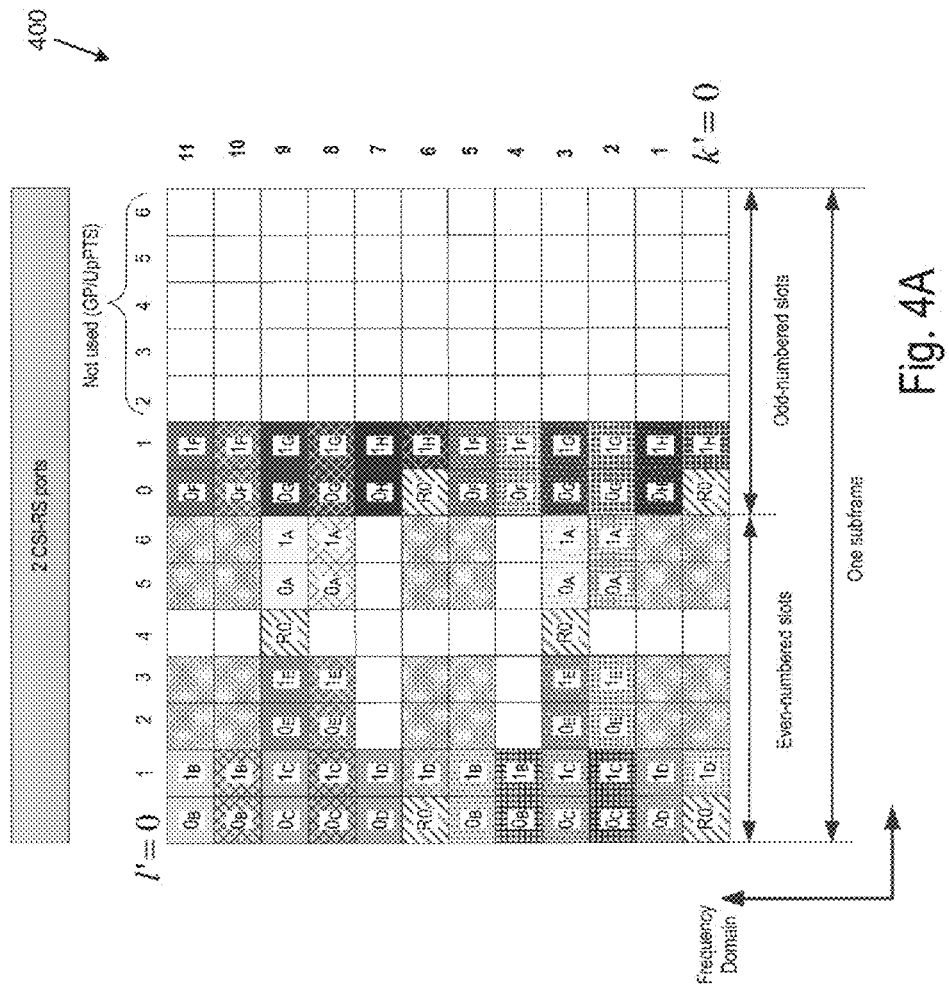
FIGS. 4A, 4B, and 4C are block diagrams of CSI-RS patterns for one (or two), four, and eight antenna ports represented in a PRB of a special subframe having special subframe configuration numbers one, two, six, or seven with a normal CP length, according to one embodiment.
Figure 4B:
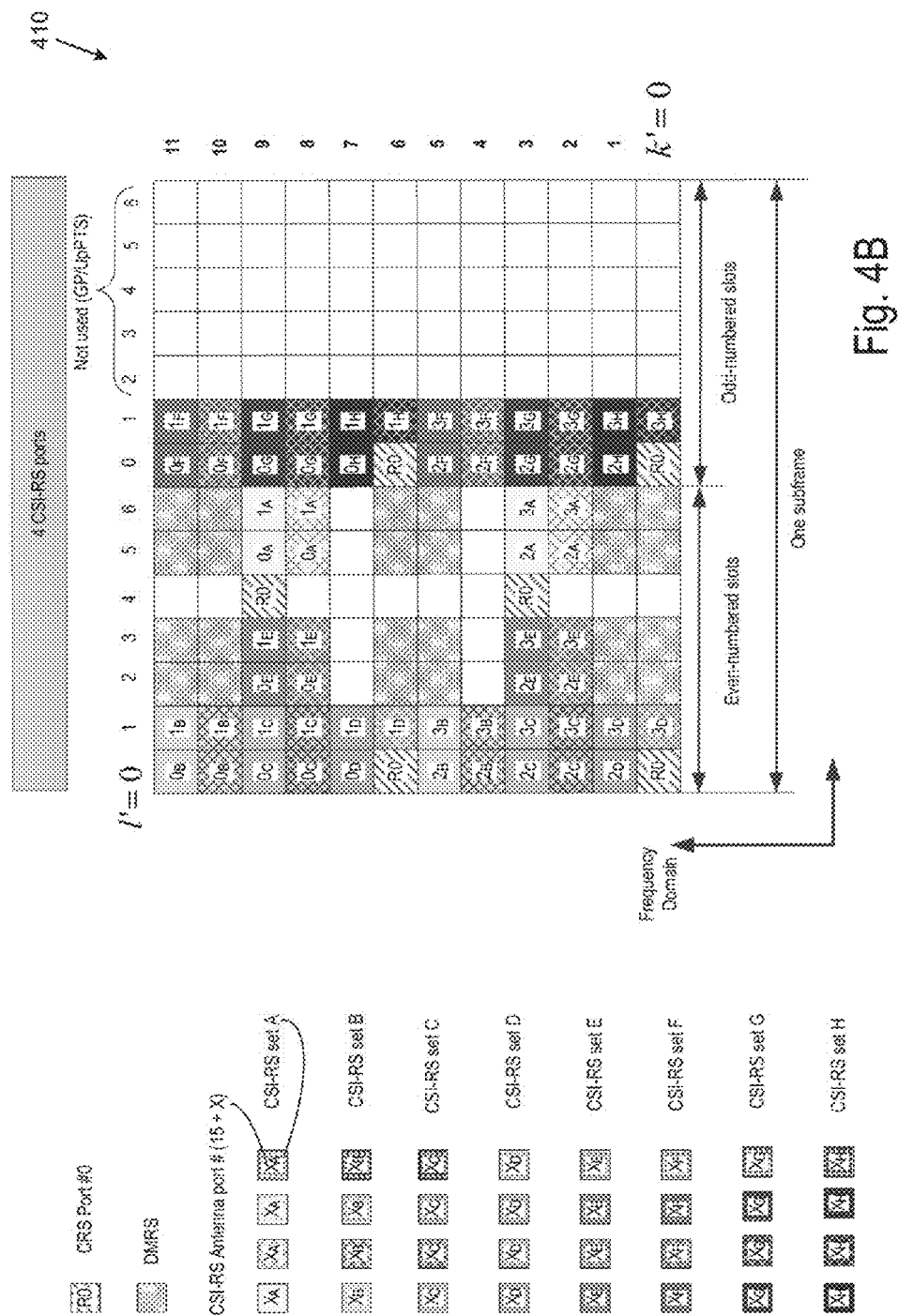
Figure 4C:
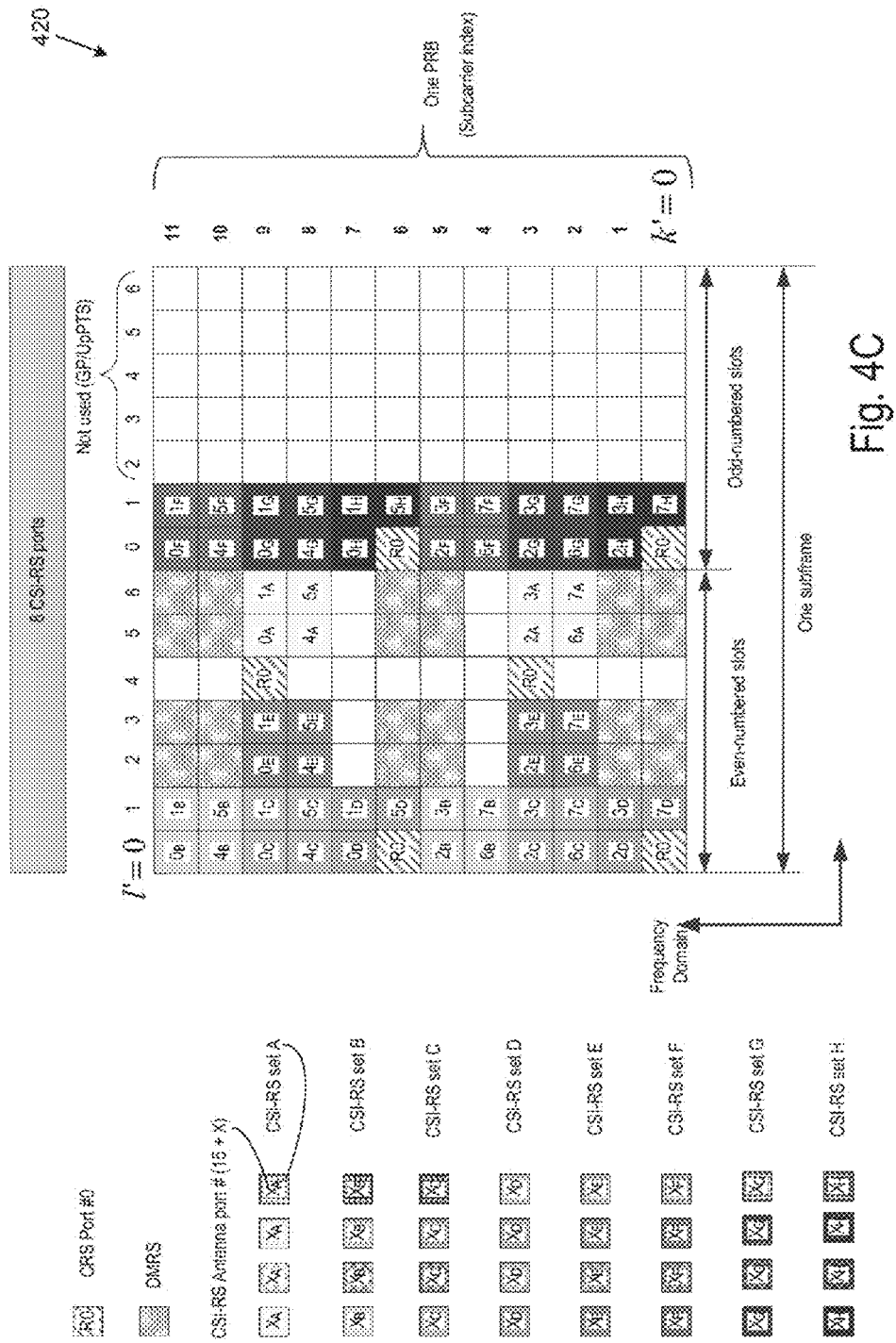

For special subframe configurations one, two, six, and seven, CSI-RS patterns defined in this subsection are grouped into two groups that depend on whether collision with CRS AP0 is to be conditionally or fully avoided. The characteristic of CSI-RS patterns in group one of Table 9 provides for full collision avoidance with CRS AP0. In contrast, some of the CSI-RS patterns in group two may collide with CRS AP0, as described previously. CSI-RS patterns for special subframe configurations one, two, six, and seven may include only group one of Table 9 to avoid the collision, or may include patterns derived from both of groups to provide sufficient orthogonal intra-cell CSI-RS patterns. An eNB using conditional avoidance may include a scheduler to address any collision issues by scheduling RSs at different, non-conflicting times. FIGS. 4A-C show resource elements 400, 410, and 420 for, respectively, one (or two), four, and eight antenna port configurations, according to an embodiment based on groups one and two of Table 9.

$$k = k' + 12m + \begin{cases} -0 & \text{for } p \in \{15, 16\}, \text{normal cyclic prefix} \\ -3 & \text{for } p \in \{17, 18\}, \text{normal cyclic prefix} \\ -0 & \text{for } p \in \{19, 20\}, \text{normal cyclic prefix} \\ -3 & \text{for } p \in \{21, 22\}, \text{normal cyclic prefix} \end{cases} \quad (4)$$

$$l = l' + \begin{cases} l'' & \text{for } p \in \{15, 16\}, \text{normal cyclic prefix} \\ l'' & \text{for } p \in \{17, 18\}, \text{normal cyclic prefix} \\ l'' + 3 & \text{for } p \in \{19, 20\}, \text{normal cyclic prefix} \\ l'' + 3 & \text{for } p \in \{21, 22\}, \text{normal cyclic prefix} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

TABLE 10

Mapping from CSI-RS configuration to (k', l') for normal CP
(Special subframe configuration 1, 2, 6, and 7).

| CSI reference signal configuration | Number of CSI-RS configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Group 3  0 | (11, 1) | 0 | (11, 1) | 0 | (11, 1) | 0 |
| 1 | (9, 1) | 0 | (9, 1) | 0 | (9, 1) | 0 |
| 2 | (7, 1) | 0 | (7, 1) | 0 | (7, 1) | 0 |
| 3 | (10, 1) | 0 | (10, 1) | 0 | | |
| 4 | (8, 1) | 0 | (8, 1) | 0 | | |
| 5 | (6, 1) | 0 | (6, 1) | 0 | | |
| 6 | (5, 1) | 0 | | | | |
| 7 | (4, 1) | 0 | | | | |
| 8 | (3, 1) | 0 | | | | |
| 9 | (2, 1) | 0 | | | | |
| 10 | (1, 1) | 0 | | | | |
| 11 | (0, 1) | 0 | | | | |
| Group 4  0 | (7, 2) | 0 | (7, 2) | 0 | (7, 2) | 0 |
| 1 | (7, 5) | 0 | (7, 5) | 0 | | |
| 2 | (4, 2) | 0 | | | | |
| 3 | (4, 5) | 0 | | | | |

Figure 5:
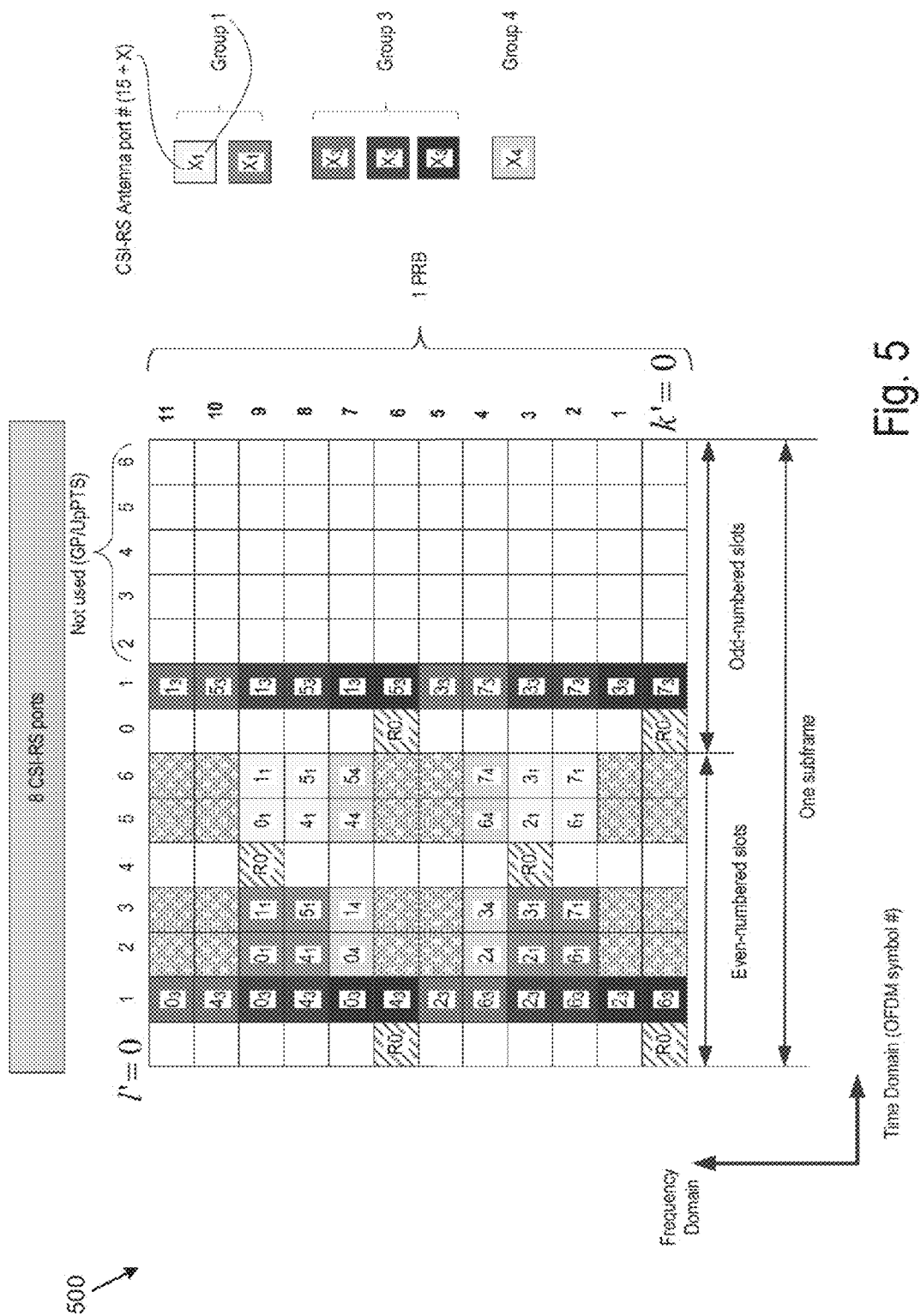
FIG. 5 is a block diagram of CSI-RS patterns for an eight-antenna port configuration, organized into groups one, three, and four, and represented in a PRB of a special subframe having special subframe configuration numbers one, two, six, or seven with a CP length, according to another embodiment.

FIG. 5 shows an eight CSI-RS port pattern design employing resource elements 500 of groups one, three, and four.

Figure 6:
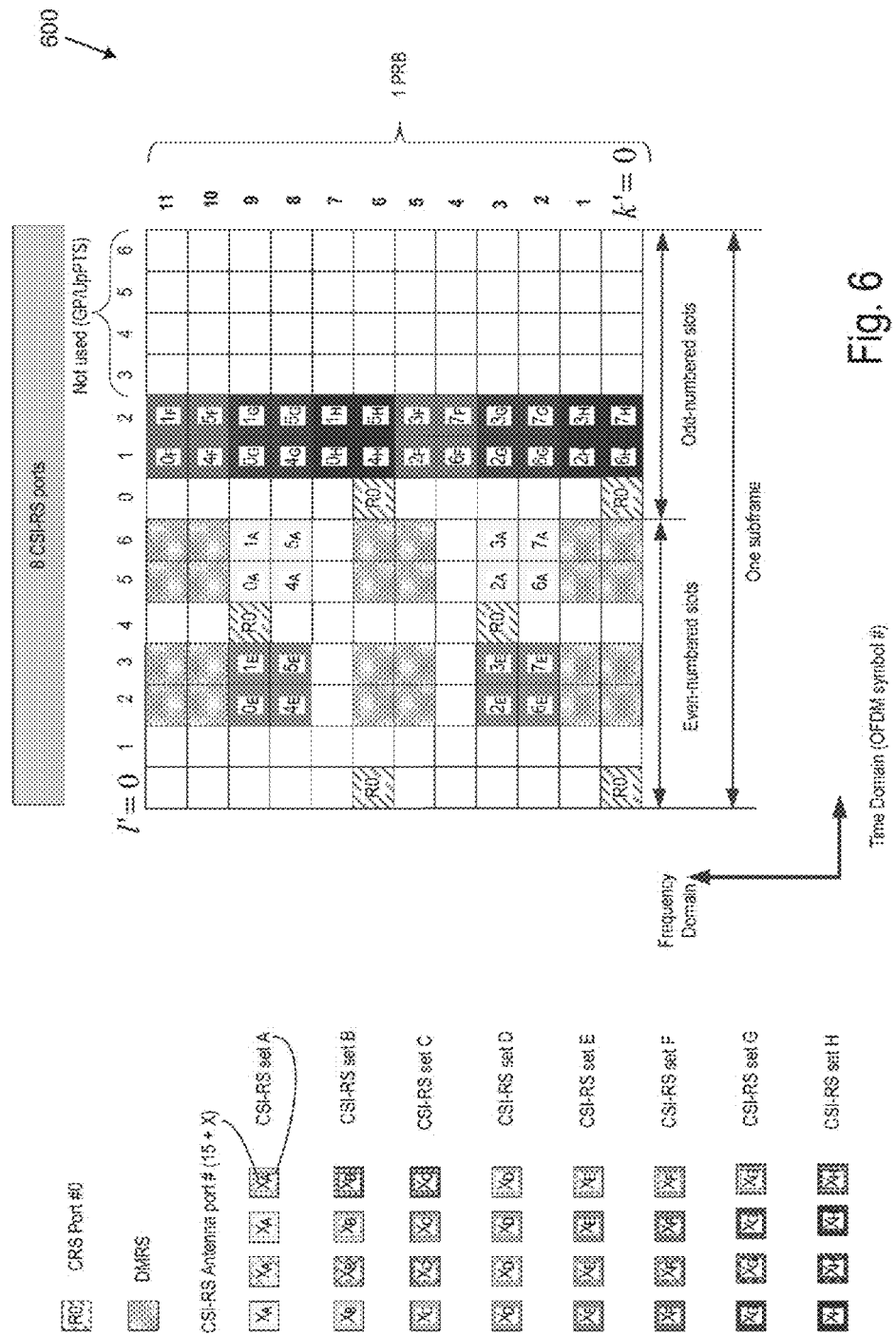
FIG. 6 is a block diagram of CSI-RS patterns for an eight-antenna port configuration represented in a PRB of a special subframe having special subframe configuration numbers two or seven with a normal CP length.

In the aforementioned embodiments, common CSI-RS patterns are designed for special subframe configurations one, two, six, and seven. In another embodiment, one more special CSI-RS pattern are provided for special subframe configurations two and seven. FIG. 6 shows one such embodiment that includes resource elements 600, summarized in Table 11, and including parameters (k,l) calculated according to equation 4.

TABLE 11

Mapping from CSI-RS configuration to (k', l') for normal CP
(Special subframe configuration 2 and 7).

| CSI reference signal configuration | Number of CSI-RS configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 0 | (9, 2) | 0 | (9, 2) | 0 | (9, 2) | 0 |
| 1 | (9, 5) | 0 | (9, 5) | 0 | (9, 5) | 0 |
| 2 | (11, 1) | 1 | (11, 1) | 1 | (11, 1) | 1 |
| 3 | (9, 1) | 1 | (9, 1) | 1 | (9, 1) | 1 |
| 4 | (7, 1) | 1 | (7, 1) | 1 | (7, 1) | 1 |
| 5 | (8, 2) | 0 | (8, 2) | 0 | | |
| 6 | (8, 5) | 0 | (8, 5) | 0 | | |
| 7 | (10, 1) | 1 | (10, 1) | 1 | | |
| 8 | (8, 1) | 1 | (8, 1) | 1 | | |
| 9 | (6, 1) | 1 | (6, 1) | 1 | | |
| 10 | (3, 2) | 0 | | | | |
| 11 | (2, 2) | 0 | | | | |
| 12 | (3, 5) | 0 | | | | |
| 13 | (2, 5) | 0 | | | | |
| 14 | (5, 1) | 1 | | | | |
| 15 | (4, 1) | 1 | | | | |
| 16 | (3, 1) | 1 | | | | |
| 17 | (2, 1) | 1 | | | | |

TABLE 11-continued

Mapping from CSI-RS configuration to (k', l') for normal CP
(Special subframe configuration 2 and 7).

| CSI reference signal configuration | Number of CSI-RS configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 18 | (1, 1) | 1 | | | | |
| 19 | (0, 1) | 1 | | | | |

The Tables 9, 10, and 11 are not intended to be an exhaustive list of possible resource elements. Other tables may constructed by a random combination of items listed in Tables 9, 10 and 11. Such combinations do not depart from the spirit and scope of the disclosure, and therefore fall into its scope. For example, though this disclosure has not specifically mapped the CSI-RS patterns on the first two OFDM symbols of the special subframe in FIG. 6, another embodiment accomplishes this result by including items 0, 1, 2 of group two in Table 9 with Table 11.

B.2.1.3: Special Subframe Configuration Nine

Figure 7A:
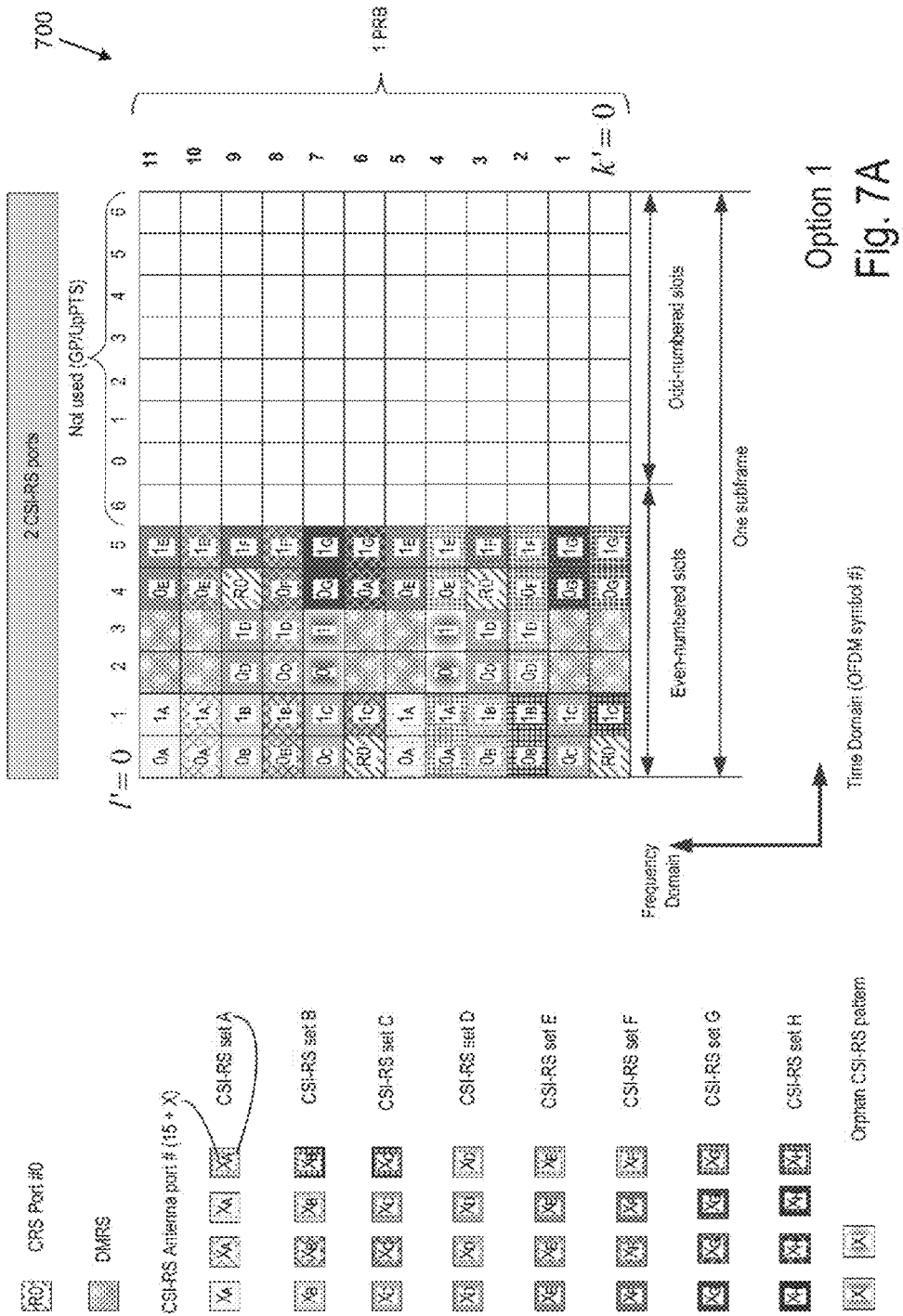
Figure 8C:
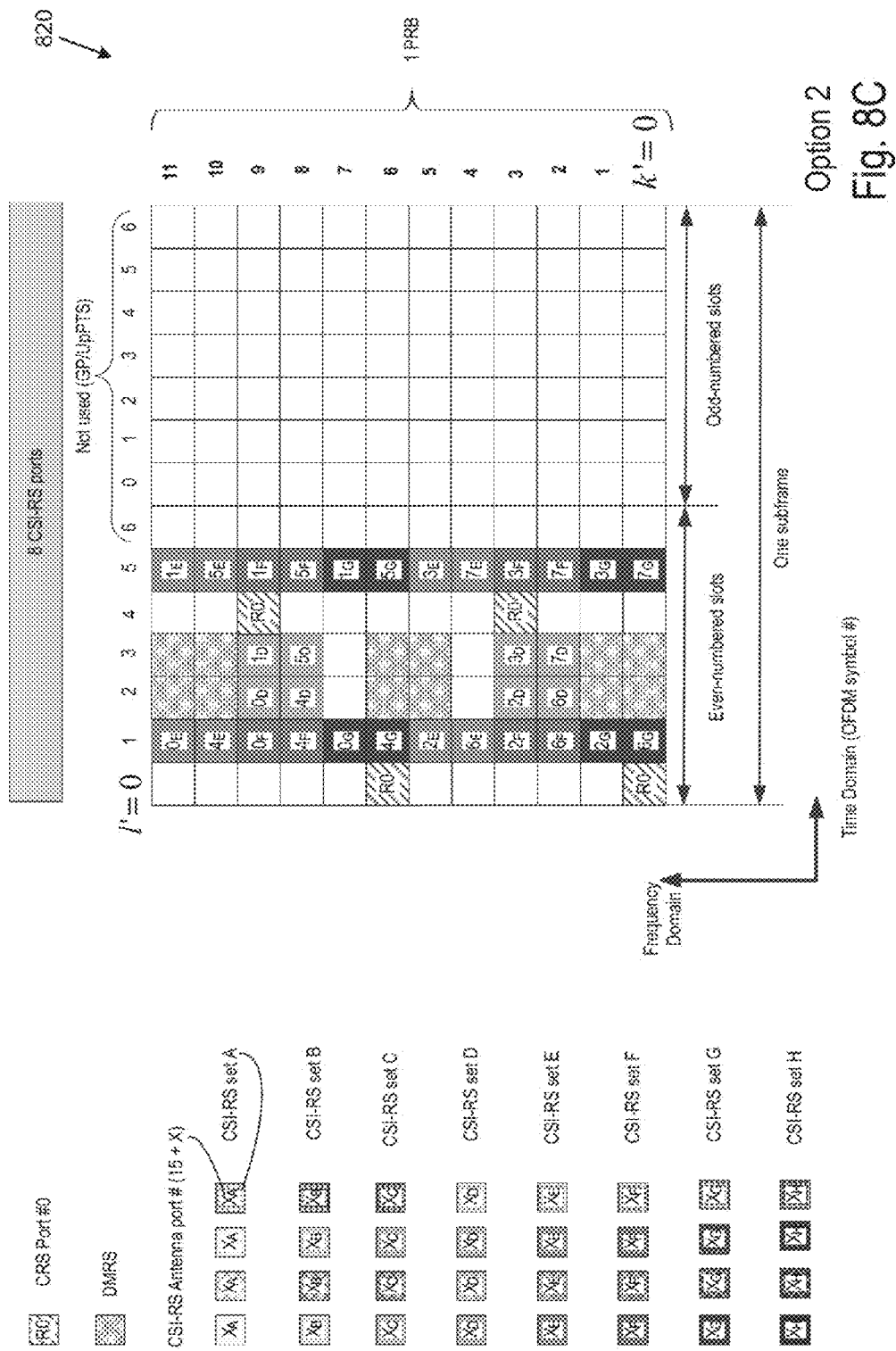

This section describes two options for CSI-RS transmission on a special subframe configuration nine, depending on whether full collision avoidance with CRS AP0 is desired. Thus, some CSI-RS patterns in option one may collide with a CRS, while option two is intended to provide SI-RS patterns that cannot collide with CRS AP0. FIGS. 7A-C show resource elements 700, 710, and 720 for CSI-RS patterns of option one. FIGS. 8A-C show resource elements 800, 810, and 820 for CSI-RS patterns of option two. The quantity (k',l') and a condition on $n_s$ for option one and option two are provided by Table 12A and Table 12B, respectively. CSI-RS patterns of option one are derived using equation (3), whereas CSI-RS patterns of option two have resource elements (k,l) calculated using equation (3) with l″=0,4 . Additionally, the orphan CSI-RS patterns are those patterns that are not available for an eight-port configuration.

TABLE 12A

Mapping from CSI-RS configuration to (k', l') for normal CP with Option 1 (Special subframe configuration 9).

| CSI reference signal configuration | Number of CSI-RS configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 0 | (11, 0) | 0 | (11, 0) | 0 | (11, 0) | 0 |
| 1 | (9, 0) | 0 | (9, 0) | 0 | (9, 0) | 0 |
| 2 | (7, 0) | 0 | (7, 0) | 0 | (7, 0) | 0 |
| 3 | (9, 2) | 0 | (9, 2) | 0 | (9, 2) | 0 |
| 4 | (11, 4) | 0 | (11, 4) | 0 | (11, 4) | 0 |
| 5 | (9, 4) | 0 | (9, 4) | 0 | (9, 4) | 0 |
| 6 | (7, 4) | 0 | (7, 4) | 0 | (7, 4) | 0 |
| 7 | (10, 0) | 0 | (10, 0) | 0 | | |
| 8 | (8, 0) | 0 | (8, 0) | 0 | | |
| 9 | (6, 0) | 0 | (6, 0) | 0 | | |
| 10 | (8, 2) | 0 | (8, 2) | 0 | | |
| 11 | (10, 4) | 0 | (10, 4) | 0 | | |
| 12 | (8, 4) | 0 | (8, 4) | 0 | | |
| 13 | (6, 4) | 0 | (6, 4) | 0 | | |
| 14 | (5, 0) | 0 | | | | |
| 15 | (4, 0) | 0 | | | | |
| 16 | (3, 0) | 0 | | | | |
| 17 | (2, 0) | 0 | | | | |
| 18 | (1, 0) | 0 | | | | |
| 19 | (0, 0) | 0 | | | | |
| 20 | (3, 2) | 0 | | | | |
| 21 | (2, 2) | 0 | | | | |
| 22 | (5, 4) | 0 | | | | |
| 23 | (4, 4) | 0 | | | | |
| 24 | (3, 4) | 0 | | | | |
| 25 | (2, 4) | 0 | | | | |
| 26 | (1, 4) | 0 | | | | |
| 27 | (0, 4) | 0 | | | | |

TABLE 12B

Mapping from CSI-RS configuration to (k', l') for normal CP with Option 2 (Special subframe configuration 9).

| CSI reference signal configuration | Number of CSI-RS configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 0 | (11, 1) | 0 | (11, 1) | 0 | (11, 1) | 0 |
| 1 | (9, 1) | 0 | (9, 1) | 0 | (9, 1) | 0 |
| 2 | (7, 1) | 0 | (7, 1) | 0 | (7, 1) | 0 |
| 3 | (9, 2) | 0 | (9, 2) | 0 | (9, 2) | 0 |
| 4 | (10, 1) | 0 | (10, 1) | 0 | | |
| 5 | (8, 1) | 0 | (8, 1) | 0 | | |
| 6 | (6, 1) | 0 | (6, 1) | 0 | | |
| 7 | (8, 2) | 0 | (8, 2) | 0 | | |
| 8 | (5, 1) | 0 | | | | |
| 9 | (4, 1) | 0 | | | | |
| 10 | (3, 1) | 0 | | | | |
| 11 | (2, 1) | 0 | | | | |
| 12 | (1, 1) | 0 | | | | |
| 13 | (0, 1) | 0 | | | | |
| 14 | (3, 2) | 0 | | | | |
| 15 | (2, 2) | 0 | | | | |

Notably, some embodiments may include patterns that are a subset of CSI-RS patterns derived from Tables 12A and 12B, or may include combinations of these tables.

B.2.1.4: Special Subframe Configurations Zero and Five

Figure 9A:
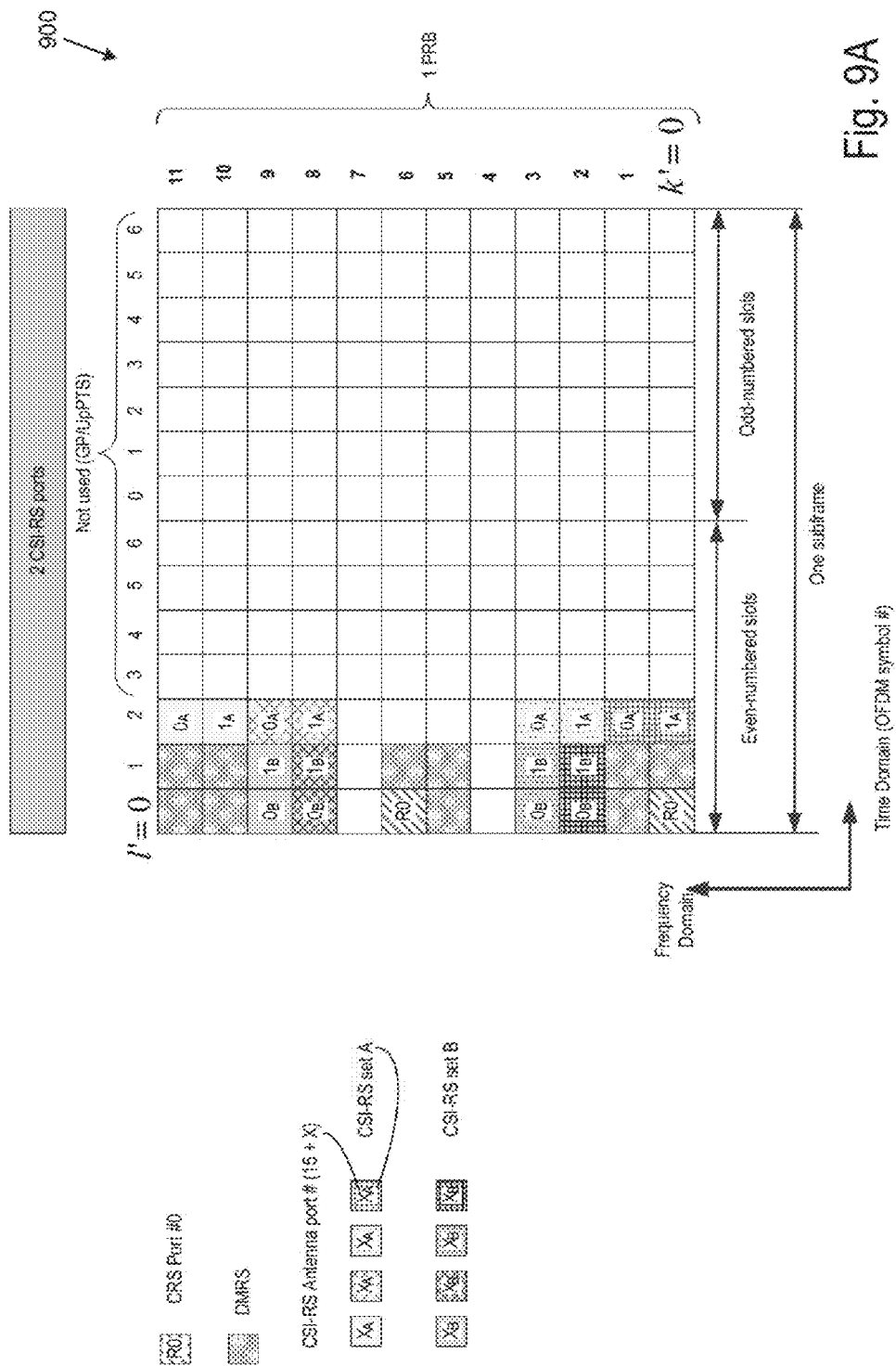
Figure 9B:
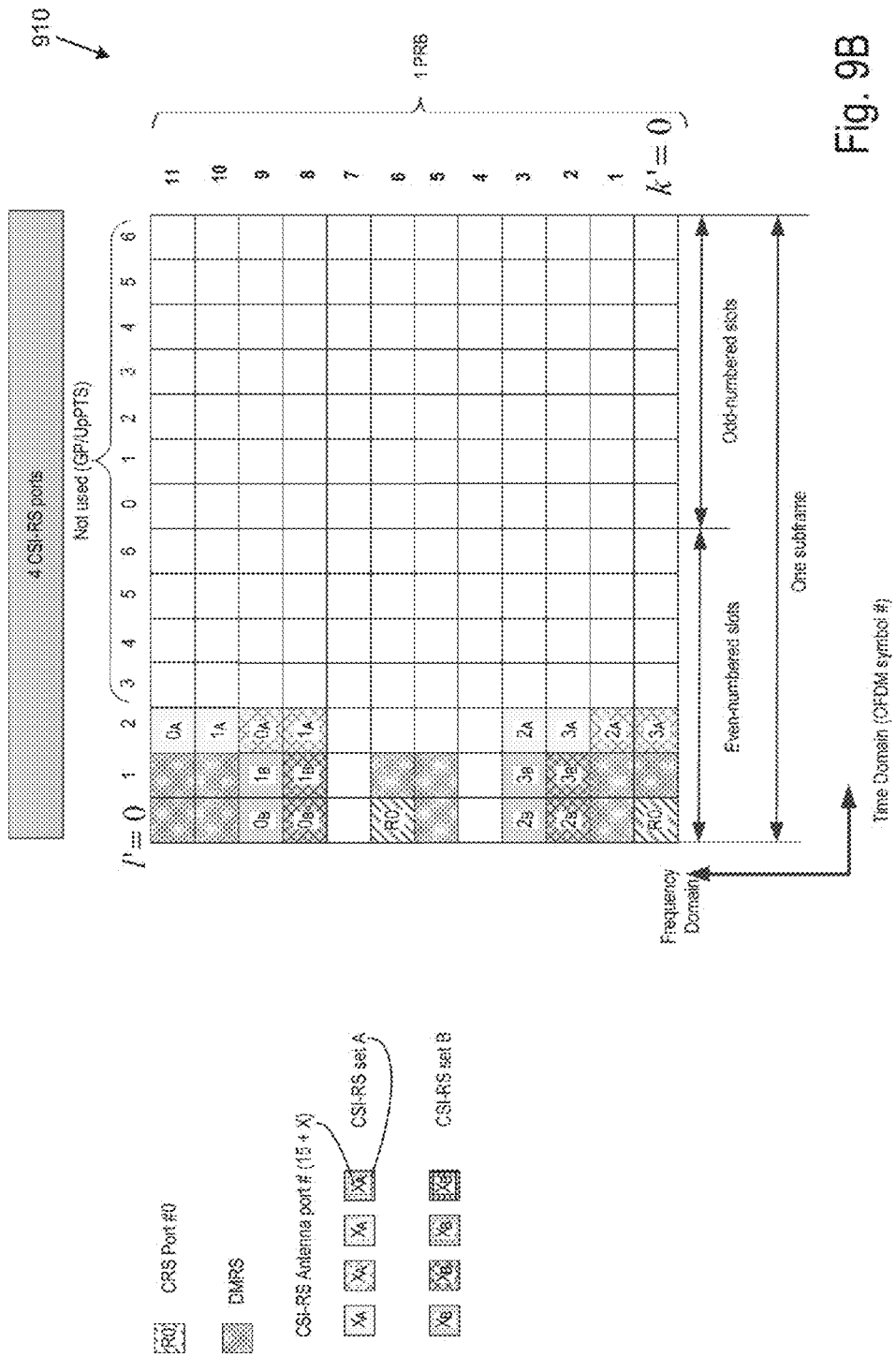

It is possible in some embodiments that CSI-RS transmission may not be allowed if the special subframe configuration is zero or five in a normal CP because there are too few downlink OFDM symbols in the DwPTS duration. Nevertheless, Table 13 and FIGS. 9A-C provided resource elements 900, 910, and 920, that are available for these subframe configurations. The quantity (k',l') and a condition on for special subframe configuration zero or five are given in Table 13, which assumes the DMRS pattern shown in FIGS. 9A-C.

TABLE 13

Mapping from CSI-RS configuration to (k', l') for normal CP (Special subframe configuration 0 or 5).

| | CSI reference signal configuration | Number of CSI-RS configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Set 1 | 0 | (9, 0) | 0 | (9, 0) | 0 | (9, 0) | 0 |
| | 1 | (8, 0) | 0 | (8, 0) | 0 | | |
| | 2 | (3, 0) | 0 | | | | |
| | 3 | (2, 0) | 0 | | | | |
| Set 2 | 4 | (11, 2) | 0 | (11, 2) | 0 | (11, 2) | 0 |
| | 5 | (9, 2) | 0 | (9, 2) | 0 | | |
| | 6 | (3, 2) | 0 | | | | |
| | 7 | (1, 2) | 0 | | | | |

For set two in Table 13, the parameters (k,l) used for CSI-RS REs mapping are calculated as:

$$k = k' + 12m + \begin{cases} -k'' & \text{for } p \in \{15, 16\}, \text{ normal cyclic prefix} \\ -k'' - 8 & \text{for } p \in \{17, 18\}, \text{ normal cyclic prefix} \\ -k'' - 2 & \text{for } p \in \{19, 20\}, \text{ normal cyclic prefix} \\ -k'' - 10 & \text{for } p \in \{21, 22\}, \text{ normal cyclic prefix} \end{cases} \quad (5)$$

$$l = 2$$
$$k'' = 0, 1$$
$$m = 0, 1, \ldots, N_{RB}^{DL} - 1$$
$$m' = m + \left\lfloor \frac{N_{RB}^{max,DL} - N_{RB}^{DL}}{2} \right\rfloor$$

B.2.2: Extended CP

Resource elements (k,l) used for transmission of CSI-RS on any of the antenna ports in the set s, where S={15}, S={15,16}, S={17,18}, S={19,20} or S={21,22}. In special subframes configured for CSI-RS transmission, the reference signal sequence shall be mapped to complex-valued modulation symbols $a_{k,l}^{(p)}$ used as reference symbols on antenna port p where $$k = k' + 12m + \begin{cases} -0 & \text{for } p \in \{15, 16\}, \text{ normal cyclic prefix} \\ -3 & \text{for } p \in \{17, 18\}, \text{ normal cyclic prefix} \\ -6 & \text{for } p \in \{19, 20\}, \text{ normal cyclic prefix} \\ -9 & \text{for } p \in \{21, 22\}, \text{ normal cyclic prefix} \end{cases} \quad (6)$$

$$l = l' + l''$$
$$l'' = 0, 1$$
$$m = 0, 1, \ldots, N_{RB}^{DL} - 1$$
$$m' = m + \left\lfloor \frac{N_{RB}^{max,DL} - N_{RB}^{DL}}{2} \right\rfloor$$

If no additional description appears in following paragraphs, the equation (6) is also to be used for CSI-RS resource elements (k,l) within this subsections of this section B.2.2, according to the values (k',l') expressed in corresponding tables and indicated by an eNB to a UE through higher-layer signalling.

B.2.2.1: Special Subframe Configuration One, Two, Three, Five, and Six

This subsection includes embodiments based on two options for collision avoidance.

Figure 10A:
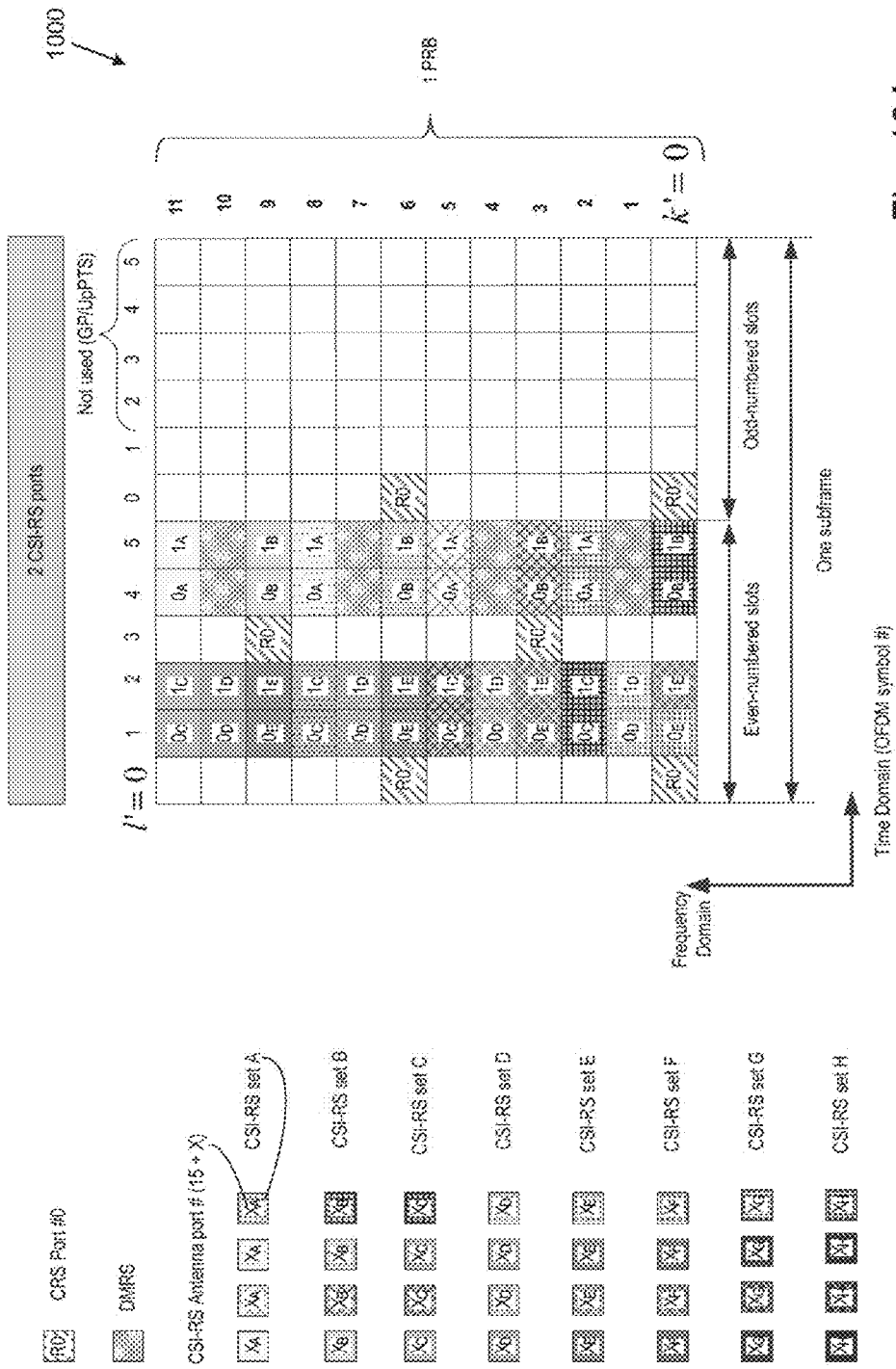
FIGS. 10A, 10B, and 10C are block diagrams of CSI-RS patterns for one (or two), four, and eight antenna ports represented in a PRB of a special subframe having special subframe configuration numbers one, two, three, five, or six with an extended CP length, according to a first embodiment (group one of option one).
Figure 10B:
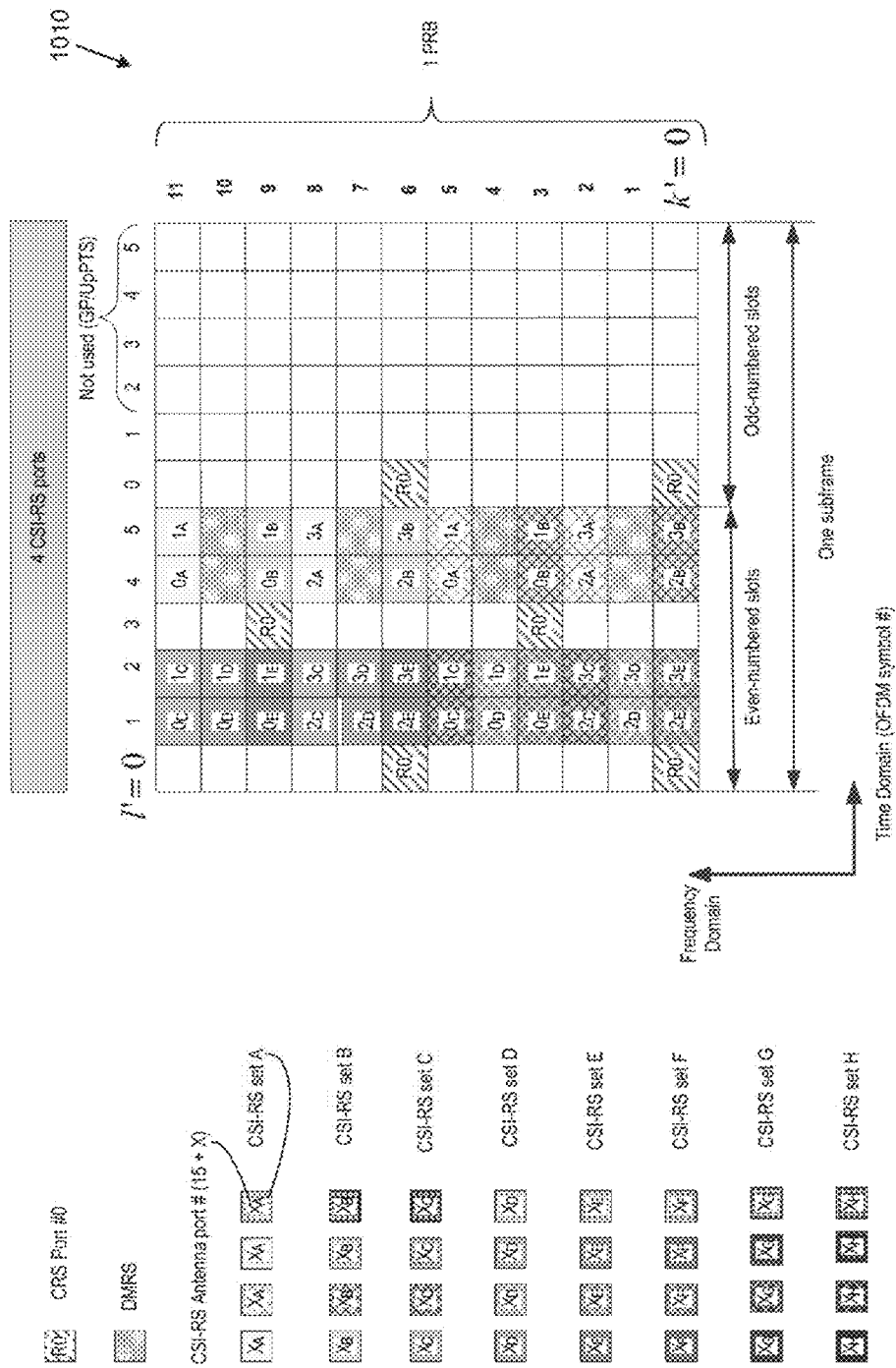
Figure 10C:
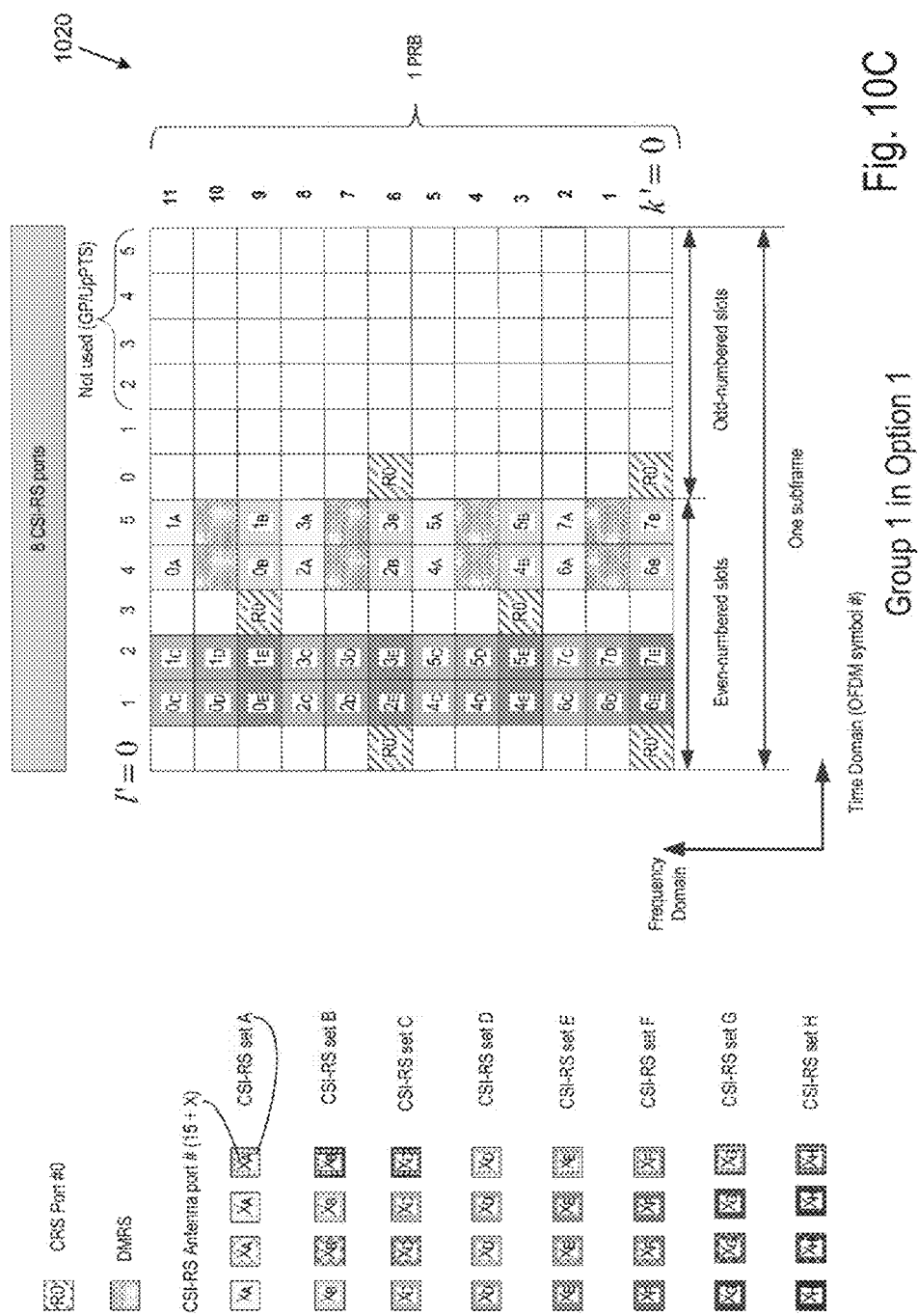
Figure 10D:
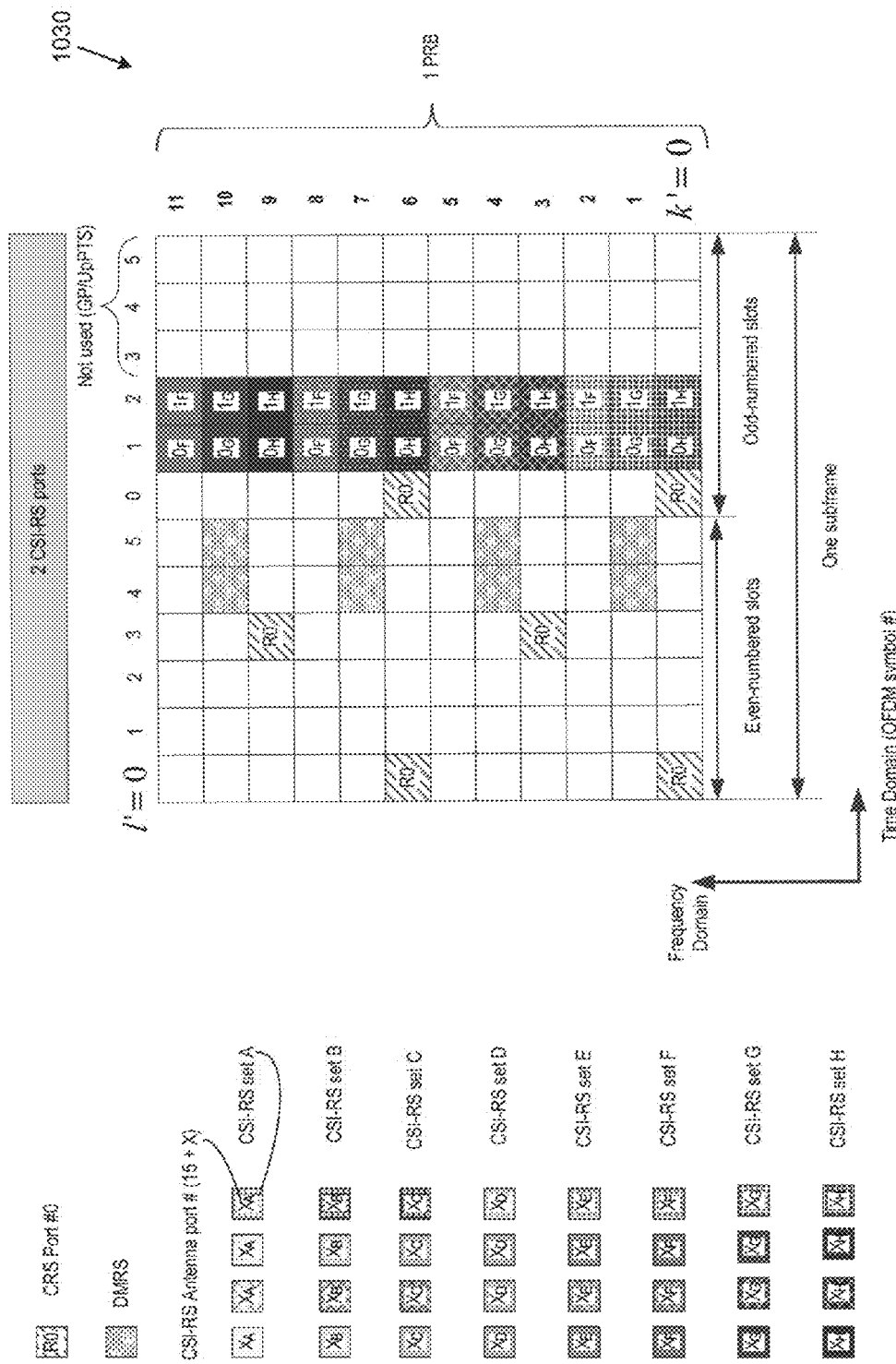
Figure 10F:
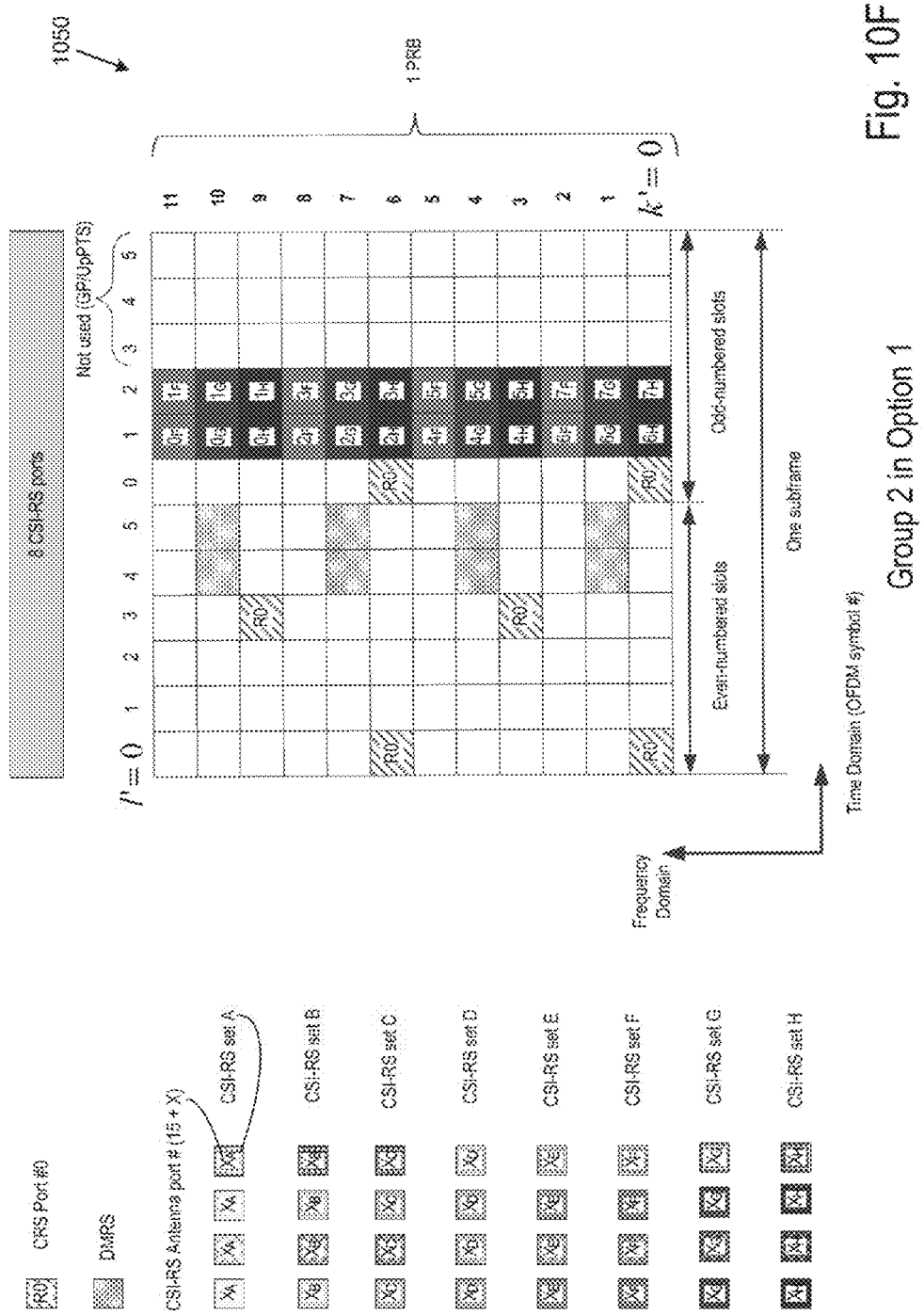

With option one, CSI-RS patterns fully avoid collision with CRS AP0. The quantity (k',l') and a condition on $n_s$ are provided in Table 14. Two groups of CSI-RS patterns are defined in Table 14, with each group supporting a different number of subframe configurations. The CSI-RS configurations in group one are applicable for any special subframe configuration, to the extent those configurations have at least eight OFDM symbols available in the DwPTS. For example, special subframe configurations one, two, three, five, and six satisfy this criteria. The CSI-RS configurations in group two are applicable to the special subframe configurations two, three, and six because these CSI-RS configurations use at least nine OFDM symbols in DwPTS. Therefore, for subframe configurations two, three, and six, either groups one or two may be selected, thereby providing up to 32 orthogonal CSI-RS patterns in these special subframes. Configurations one and five have fewer CSI-RS patterns available to fully avoid a CRS AP0 collision. FIGS. 10A-C show resource elements 1000, 1010, and 1020 for group one, and FIGS. 10D-F show resource elements 1030, 1040, and 1050 for group two.

TABLE 14

Mapping from CSI reference signal configuration to (k', l') for Extended CP with Option 1 (Special subframe configuration 1, 2, 3, 5, 6).

| | | Number of CSI-RS configured | | | | | |
|---|---|---|---|---|---|---|---|
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| Group 1 | 0 | (11, 1) | 0 | (11, 1) | 0 | (11, 1) | 0 |
| | 1 | (10, 1) | 0 | (10, 1) | 0 | (10, 1) | 0 |
| | 2 | (9, 1) | 0 | (9, 1) | 0 | (9, 1) | 0 |
| | 3 | (11, 4) | 0 | (11, 4) | 0 | (11, 4) | 0 |
| | 4 | (9, 4) | 0 | (9, 4) | 0 | (9, 4) | 0 |
| | 5 | (5, 1) | 0 | (5, 1) | 0 | | |
| | 6 | (4, 1) | 0 | (4, 1) | 0 | | |
| | 7 | (3, 1) | 0 | (3, 1) | 0 | | |
| | 8 | (5, 4) | 0 | (5, 4) | 0 | | |
| | 9 | (3, 4) | 0 | (3, 4) | 0 | | |
| | 10 | (8, 1) | 0 | | | | |
| | 11 | (7, 1) | 0 | | | | |
| | 12 | (6, 1) | 0 | | | | |
| | 13 | (2, 1) | 0 | | | | |
| | 14 | (1, 1) | 0 | | | | |
| | 15 | (0, 1) | 0 | | | | |
| | 16 | (8, 4) | 0 | | | | |
| | 17 | (6, 4) | 0 | | | | |
| | 18 | (2, 4) | 0 | | | | |
| | 19 | (0, 4) | 0 | | | | |
| Group 2 | 0 | (11, 1) | 1 | (11, 1) | 1 | (11, 1) | 1 |
| | 1 | (10, 1) | 1 | (10, 1) | 1 | (10, 1) | 1 |
| | 2 | (9, 1) | 1 | (9, 1) | 1 | (9, 1) | 1 |
| | 3 | (5, 1) | 1 | (5, 1) | 1 | | |
| | 4 | (4, 1) | 1 | (4, 1) | 1 | | |
| | 5 | (3, 1) | 1 | (3, 1) | 1 | | |

TABLE 14-continued

Mapping from CSI reference signal configuration to (k', l') for Extended CP
with Option 1 (Special subframe configuration 1, 2, 3, 5, 6).

| CSI reference signal configuration | Number of CSI-RS configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 6 | (8, 1) | 1 | | | | |
| 7 | (7, 1) | 1 | | | | |
| 8 | (6, 1) | 1 | | | | |
| 9 | (2, 1) | 1 | | | | |
| 10 | (1, 1) | 1 | | | | |
| 11 | (0, 1) | 1 | | | | |

Figure 11A:
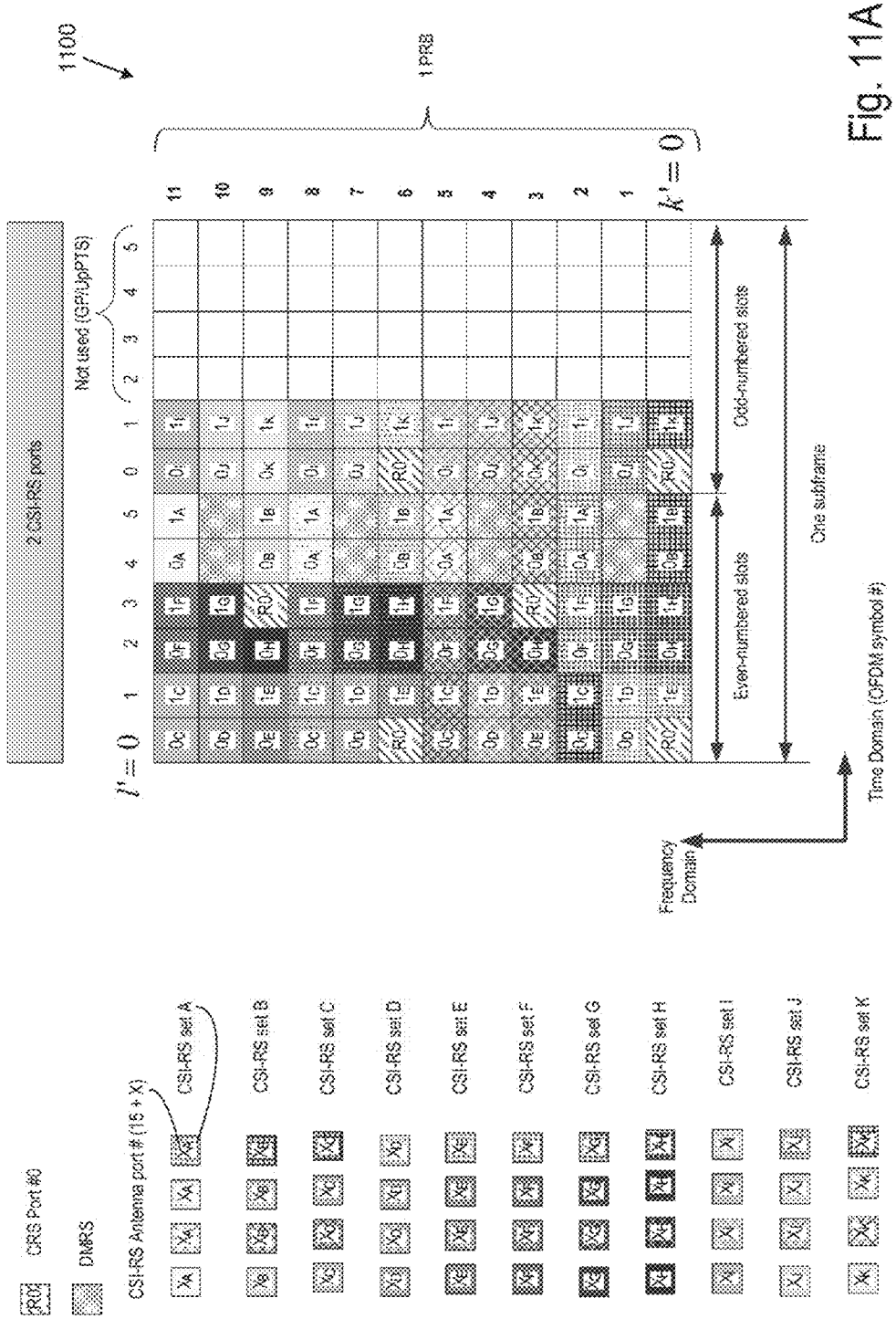
FIGS. 11A, 11B, and 11C are block diagrams of CSI-RS patterns for one (or two), four, and eight antenna ports represented in a PRB of a special subframe having special subframe configuration numbers one, two, three, five, or six with an extended CP length, according to a third embodiment (option two).
Figure 11B:
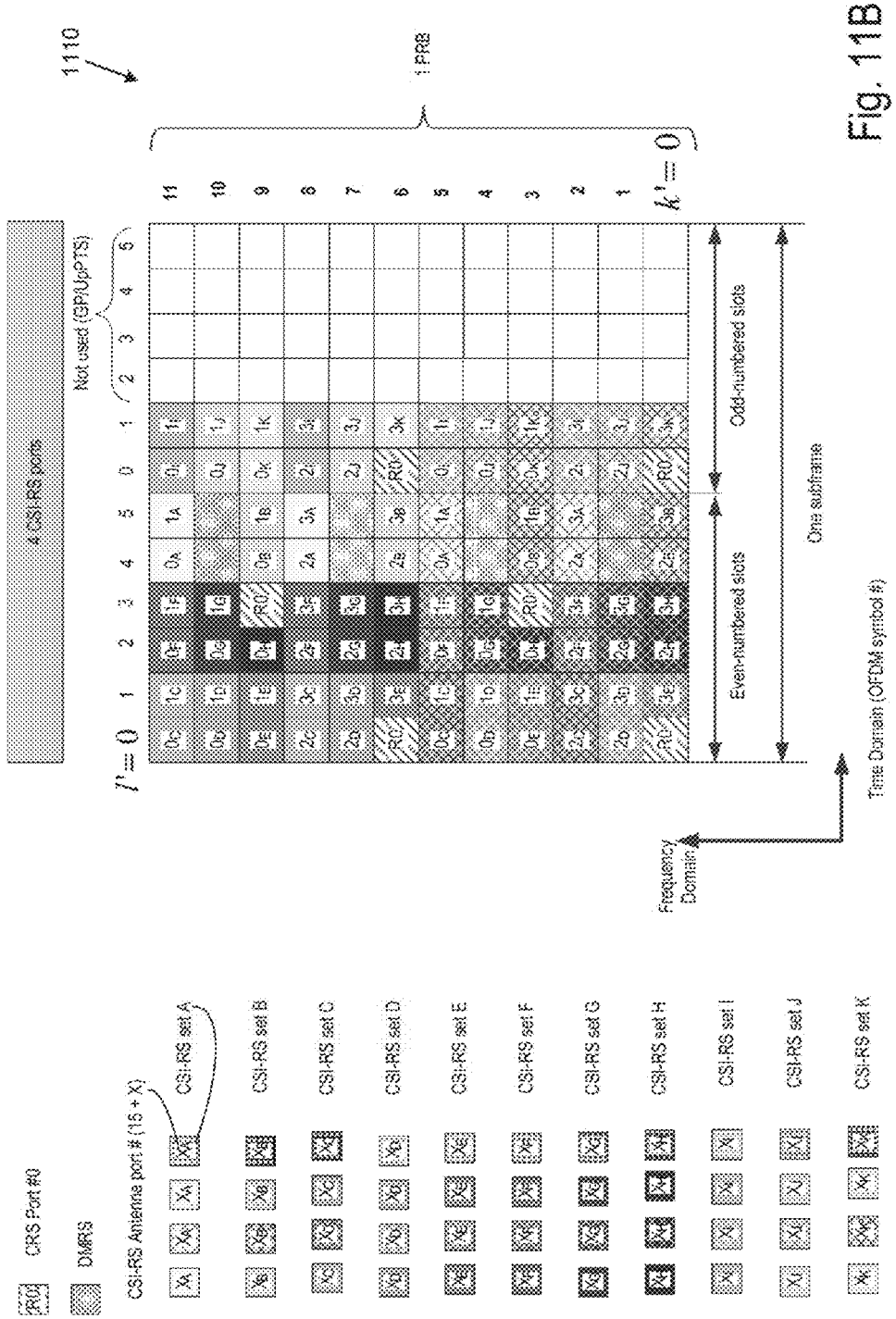
Figure 11C:
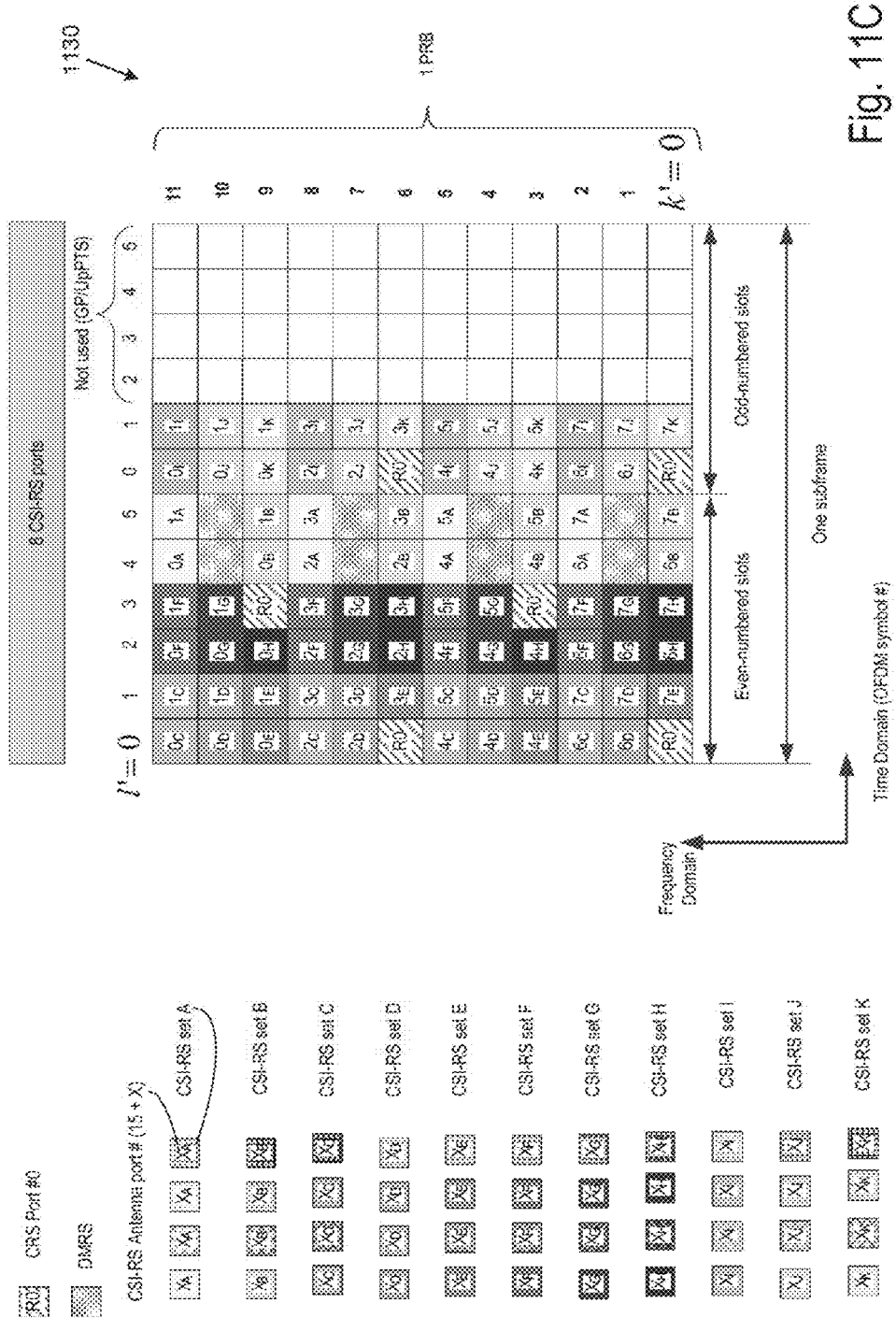

Option two is similar to the previous discussion, although option two increases the number of CSI-RS patterns by relaxing CRS AP0 collision avoidance. As discussed previously, in some embodiments it is possible to rely on the eNB scheduler to provide for CRS AP0 collision avoidance based on its own cell-ID, for example. Therefore, additional CSI-RS patterns are provided in Table 15, FIGS. 11A-C show corresponding resource elements 1100, 1110, and 1120.

TABLE 15

Mapping from CSI reference signal configuration to (k', l')
for Extended CP with Option 2 (Special subframe configuration
1, 2, 3, 5, 6).

| CSI reference signal configuration | Number of CSI-RS configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 0 | (11, 0) | 0 | (11, 0) | 0 | (11, 0) | 0 |
| 1 | (10, 0) | 0 | (10, 0) | 0 | (10, 0) | 0 |
| 2 | (9, 0) | 0 | (9, 0) | 0 | (9, 0) | 0 |
| 3 | (11, 2) | 0 | (11, 2) | 0 | (11, 2) | 0 |
| 4 | (10, 2) | 0 | (10, 2) | 0 | (10, 2) | 0 |
| 5 | (9, 2) | 0 | (9, 2) | 0 | (9, 2) | 0 |
| 6 | (11, 4) | 0 | (11, 4) | 0 | (11, 4) | 0 |
| 7 | (9, 4) | 0 | (9, 4) | 0 | (9, 4) | 0 |
| 8 | (11, 0) | 1 | (11, 0) | 1 | (11, 0) | 1 |
| 9 | (10, 0) | 1 | (10, 0) | 1 | (10, 0) | 1 |
| 10 | (9, 0) | 1 | (9, 0) | 1 | (9, 0) | 1 |
| 11 | (5, 0) | 0 | (5, 0) | 0 | | |
| 12 | (4, 0) | 0 | (4, 0) | 0 | | |
| 13 | (3, 0) | 0 | (3, 0) | 0 | | |
| 14 | (5, 2) | 0 | (5, 2) | 0 | | |
| 15 | (4, 2) | 0 | (4, 2) | 0 | | |
| 16 | (3, 2) | 0 | (3, 2) | 0 | | |
| 17 | (5, 4) | 0 | (5, 4) | 0 | | |
| 18 | (3, 4) | 0 | (3, 4) | 0 | | |
| 19 | (5, 0) | 1 | (5, 0) | 1 | | |
| 20 | (4, 0) | 1 | (4, 0) | 1 | | |
| 21 | (3, 0) | 1 | (3, 0) | 1 | | |
| 22 | (8, 0) | 0 | | | | |
| 23 | (7, 0) | 0 | | | | |
| 24 | (6, 0) | 0 | | | | |
| 25 | (2, 0) | 0 | | | | |
| 26 | (1, 0) | 0 | | | | |
| 27 | (0, 0) | 0 | | | | |
| 28 | (8, 2) | 0 | | | | |
| 29 | (7, 2) | 0 | | | | |
| 30 | (6, 2) | 0 | | | | |
| 31 | (2, 2) | 0 | | | | |
| 32 | (1, 2) | 0 | | | | |
| 33 | (0, 2) | 0 | | | | |
| 34 | (8, 4) | 0 | | | | |
| 35 | (6, 4) | 0 | | | | |
| 36 | (2, 4) | 0 | | | | |
| 37 | (0, 4) | 0 | | | | |
| 38 | (8, 0) | 1 | | | | |
| 39 | (7, 0) | 1 | | | | |
| 40 | (6, 0) | 1 | | | | |
| 41 | (2, 0) | 1 | | | | |
| 42 | (1, 0) | 1 | | | | |
| 43 | (0, 0) | 1 | | | | |

B.2.2.2: Special Subframe Configuration Seven

Figure 12A:
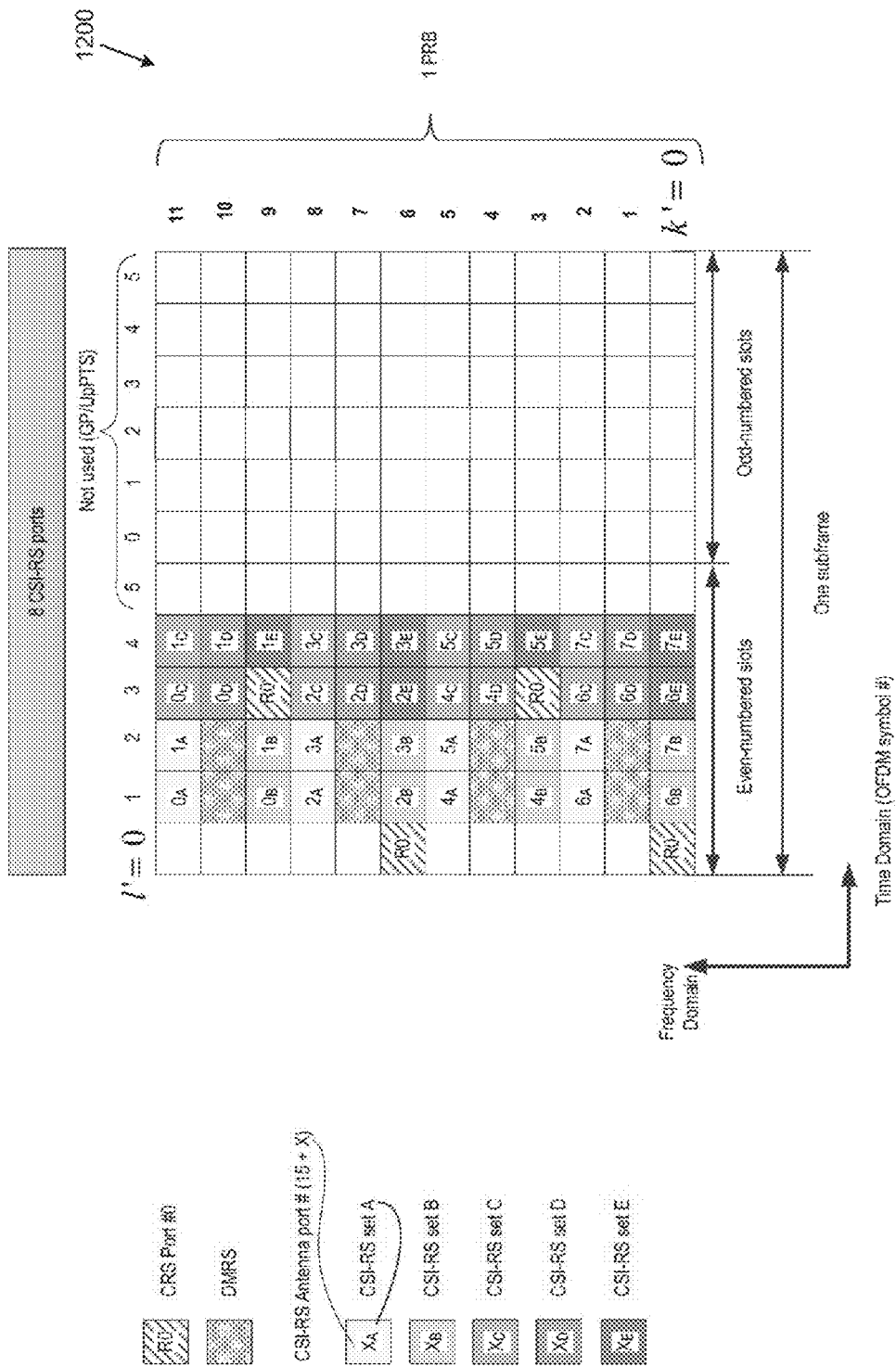
Figure 12C:
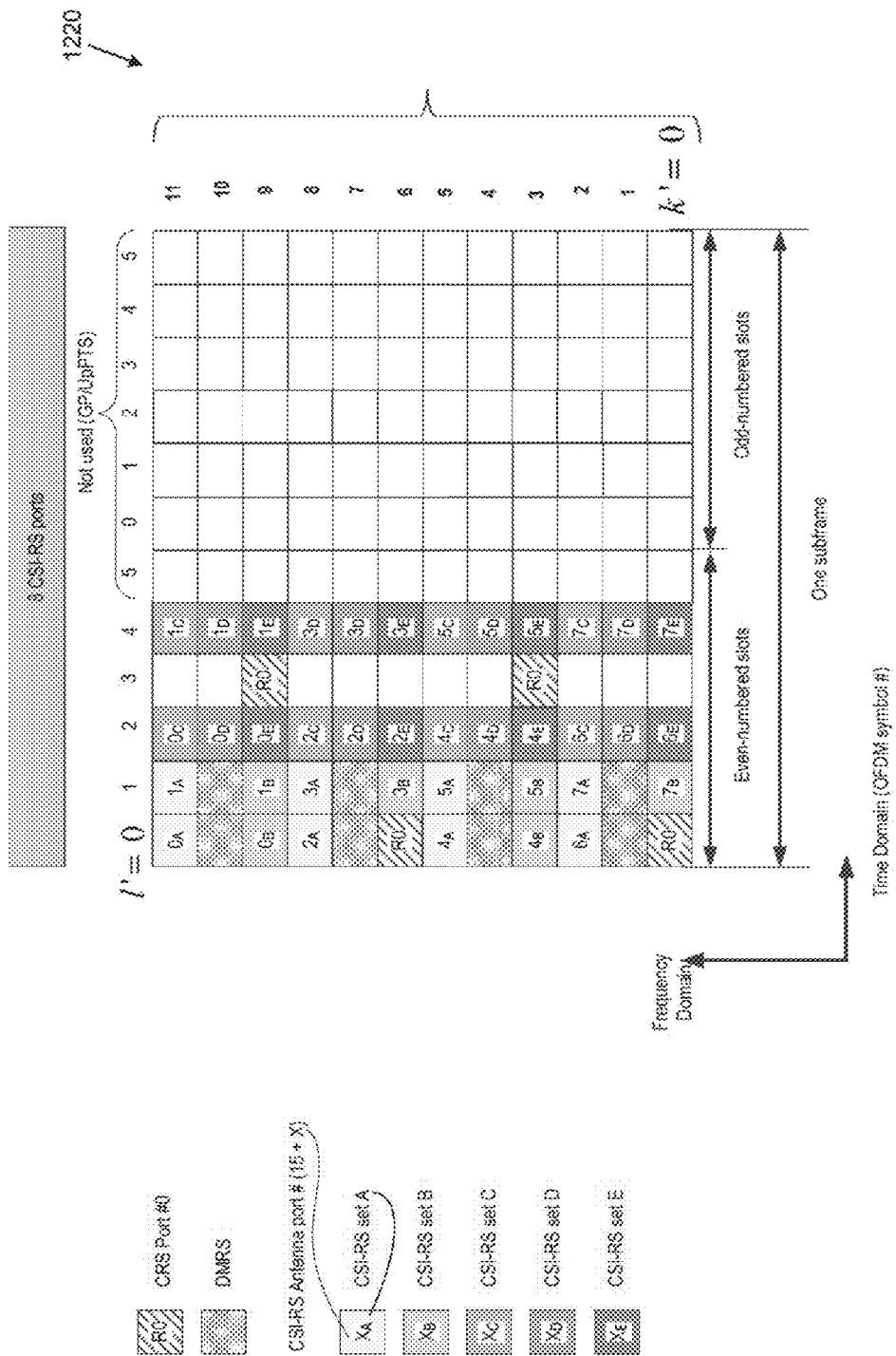

For special subframe configuration seven, three embodiments are provided, depending on DMRS location and CRS collision avoidance strategy. Option one is based on the assumption that DMRS is transmitted on OFDM symbols not including CRS AP0 as shown in FIG. 12A, which includes resource elements 1200. The remaining options two and three assume DMRS REs are located on the first two OFDM symbols of DwPTS as shown by resource elements 1210 of FIG. 12B and resource elements 1220 of FIG. 12C. FIGS. 12A-C are for an eight CSI-RS antenna port configuration cases.

For options one and two, equation (6) is to be directly used for CSI-RS REs position calculation. For option three, the resource elements used for transmission of CSI-RS are calculated as follows:

$$k = k' + 12m + \begin{cases} -0 & \text{for } p \in \{15, 16\}, \text{normal cyclic prefix} \\ -3 & \text{for } p \in \{17, 18\}, \text{normal cyclic prefix} \\ -6 & \text{for } p \in \{19, 20\}, \text{normal cyclic prefix} \\ -9 & \text{for } p \in \{21, 22\}, \text{normal cyclic prefix} \end{cases} \quad (7)$$

$$l = l' + \begin{cases} l'' & l' = 0 \\ 2l'' & l' = 2 \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

The quantity (k',l') and condition on $n_s$ are given by Table 16 for option one, and by Table 17 for options two and three.

TABLE 16

Mapping from CSI-RS configuration to (k', l') for Extended CP with Option 1 (Special subframe configuration 7).

| CSI reference signal configuration | Number of CSI-RS configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 0 | (11, 1) | 0 | (11, 1) | 0 | (11, 1) | 0 |
| 1 | (9, 1) | 0 | (9, 1) | 0 | (9, 1) | 0 |
| 2 | (11, 3) | 0 | (11, 3) | 0 | (11, 3) | 0 |
| 3 | (10, 3) | 0 | (10, 3) | 0 | (10, 3) | 0 |
| 4 | (9, 3) | 0 | (9, 3) | 0 | (9, 3) | 0 |
| 5 | (5, 1) | 0 | (5, 1) | 0 | | |
| 6 | (3, 1) | 0 | (3, 1) | 0 | | |
| 7 | (5, 3) | 0 | (5, 3) | 0 | | |
| 8 | (4, 3) | 0 | (4, 3) | 0 | | |
| 9 | (3, 3) | 0 | (3, 3) | 0 | | |
| 10 | (8, 1) | 0 | | | | |
| 11 | (6, 1) | 0 | | | | |
| 12 | (2, 1) | 0 | | | | |
| 13 | (0, 1) | 0 | | | | |
| 14 | (8, 3) | 0 | | | | |
| 15 | (7, 3) | 0 | | | | |
| 16 | (6, 3) | 0 | | | | |
| 17 | (2, 3) | 0 | | | | |
| 18 | (1, 3) | 0 | | | | |
| 19 | (0, 3) | 0 | | | | |

TABLE 17

Mapping from CSI-RS configuration to (k', l') for Extended CP with Option 2 and 3 (Special subframe configuration 7).

| CSI reference signal configuration | Number of CSI-RS configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| 0 | (11, 0) | 0 | (11, 0) | 0 | (11, 0) | 0 |
| 1 | (9, 0) | 0 | (9, 0) | 0 | (9, 0) | 0 |
| 2 | (11, 2) | 0 | (11, 2) | 0 | (11, 2) | 0 |
| 3 | (10, 2) | 0 | (10, 2) | 0 | (10, 2) | 0 |
| 4 | (9, 2) | 0 | (9, 2) | 0 | (9, 2) | 0 |
| 5 | (5, 0) | 0 | (5, 0) | 0 | | |
| 6 | (3, 0) | 0 | (3, 0) | 0 | | |
| 7 | (5, 2) | 0 | (5, 2) | 0 | | |
| 8 | (4, 2) | 0 | (4, 2) | 0 | | |
| 9 | (3, 2) | 0 | (3, 2) | 0 | | |
| 10 | (8, 0) | 0 | | | | |
| 11 | (6, 0) | 0 | | | | |
| 12 | (2, 0) | 0 | | | | |
| 13 | (0, 0) | 0 | | | | |
| 14 | (8, 2) | 0 | | | | |
| 15 | (7, 2) | 0 | | | | |
| 16 | (6, 2) | 0 | | | | |
| 17 | (2, 2) | 0 | | | | |
| 18 | (1, 2) | 0 | | | | |
| 19 | (0, 2) | 0 | | | | |

B.2.2.3: Special Subframe Configuration Zero and Four

Figure 13B:
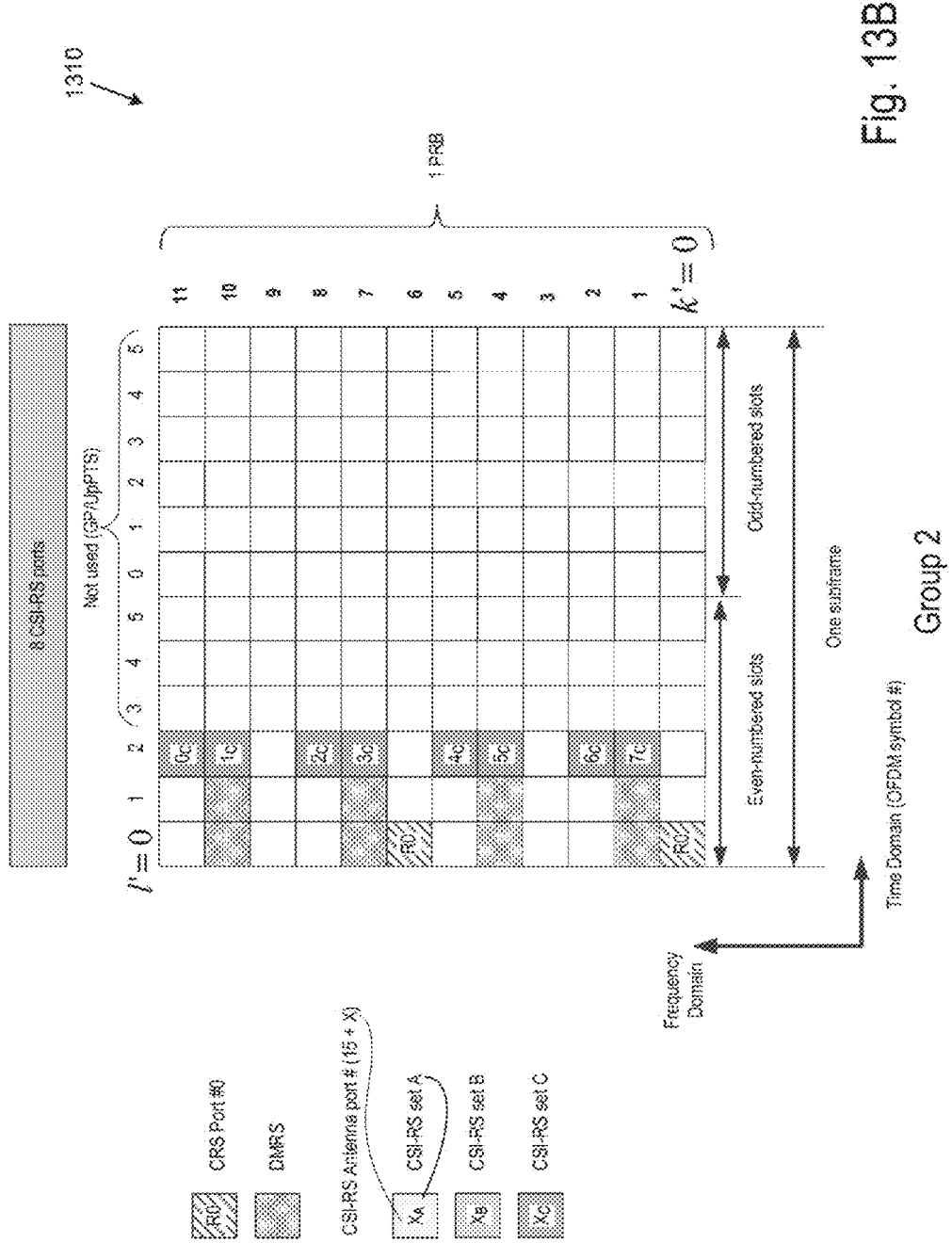

It is possible that CSI-RSs would not be transmitted on a special subframe if the special configuration zero or four is used with extended CP. Nevertheless, some embodiments include CSI-RS patterns for these subframe configurations, as shown by resource elements 1300 of FIG. 13A and resource elements 1310 of FIG. 13B, that are derived from quantity (k',l') and conditions on $n_s$ provided in Table 18. For CSI-RS patterns defined in group one of Table 18, equation (6) is directly used for calculating the CSI-RS REs position (k,l). Note that, for CSI-RS patterns of group two in Table 18, the resource elements (k,l) used for transmission of CSI-RS is calculated as follows:

$$k = k' + 12m - k'' + \begin{cases} -0 & \text{for } p \in \{15, 16\}, \text{ normal cyclic prefix} \\ -3 & \text{for } p \in \{17, 18\}, \text{ normal cyclic prefix} \\ -6 & \text{for } p \in \{19, 20\}, \text{ normal cyclic prefix} \\ -9 & \text{for } p \in \{21, 22\}, \text{ normal cyclic prefix} \end{cases} \quad (8)$$

$$l = l'$$

$$k'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

TABLE 18

Mapping from CSI-RS configuration to (k', l') for Extended CP (Special subframe configuration 0 and 4).

| CSI reference signal configuration | | Number of CSI-RS configured | | | | | |
|---|---|---|---|---|---|---|---|
| | | 1 or 2 | | 4 | | 8 | |
| | | (k', l') | $n_s$ mod 2 | (k', l') | $n_s$ mod 2 | (k', l') | $n_s$ mod 2 |
| Group 1 | | (11, 0) | 0 | (11, 0) | 0 | (11, 0) | 0 |
| | | (9, 0) | 0 | (9, 0) | 0 | (9, 0) | 0 |
| | | (5, 0) | 0 | (5, 0) | 0 | | |
| | | (3, 0) | 0 | (3, 0) | 0 | | |
| | | (8, 0) | 0 | | | | |
| | | (6, 0) | 0 | | | | |
| | | (2, 0) | 0 | | | | |
| | | (0, 0) | 0 | | | | |
| Group 2 | | (11, 2) | 0 | (11, 2) | 0 | (11, 2) | 0 |
| | | (5, 2) | 0 | (5, 2) | 0 | | |
| | | (8, 2) | 0 | | | | |
| | | (2, 2) | 0 | | | | |

C. Zero Power (ZP) CSI-RS and Interference Measurement Resource (CSI-IM) Transmissions in the Special Subframes In Rel-10 ZP CSI-RSs is used to improve signal to noise ratio between neighboring cells' CSI-RSs by avoiding PDSCH transmission on the resource elements occupied by CSI-RSs of the neighboring cells. In Rel-11 ZP CSI-RSs are also used to enable CSI measurements on CSI-RSs transmitted by the neighboring cells. In Rel-10/11 ZP CSI-RSs can be transmitted only on the same subframes as CSI-RSs. Those, in those LTE versions, transmission in the special subframe(s) in case frame structure type 2 is not allowed. In frequency domain, the structure of ZP CSI-RSs follows structure of CSI-RSs (for four CSI-RS antenna ports).

Accordingly, as described previously, ZP CSI-RSs in some embodiments are also allowed to be transmitted in the special subframe(s), irrespective of subframe configurations, or alternatively, for a subset of special subframe configurations. As described in subsections B.1 and B.2, the following two general embodiments are also considered for ZP CSI-RSs: first, puncturing (i.e., truncating) exiting ZP CSI-RS patterns according to the available OFDM symbols in DwPTS; second, developing new Rel-12 ZP CSI-RS patterns.

In either embodiment, it is assumed that the new CSI-RSs and new ZP CSI-RSs share the same set of possible configurations and patterns. It is also assumed ZP CSI-RSs may occupy the REs that can be allocated only for one or more CSI-RSs with four antenna ports. Furthermore, the same design principles can be used for new interference measurement resources (CSI-IM) in the special subframes, where in accordance to Rel-11 constraints, new CSI-IMs may be a subset of the aforementioned ZP CSI-RSs.

Figure 14:
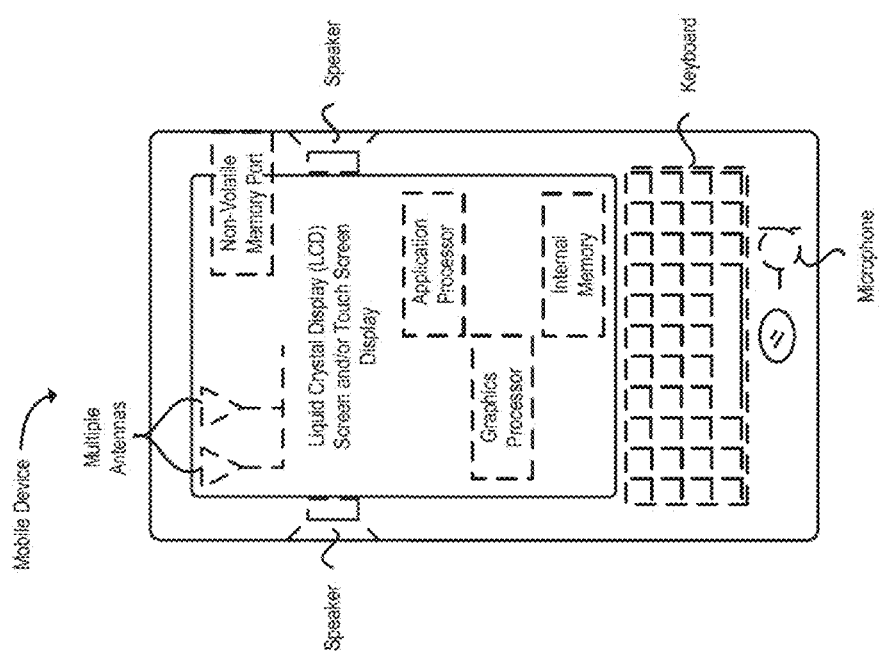
FIG. 14 is a block diagram of a UE, according to one embodiment.

D. Example UE Embodiment:

FIG. 14 provides an example illustration of a mobile device, commonly deployed as a UE, and referred to as a mobile station (MS), a mobile wireless device, a mobile communication device, a tablet, a handset, or another type of mobile wireless device.

The mobile device includes a modem configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 14 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

E. Other Example Embodiments

According to some embodiments, a user equipment (UE) for time division duplex (TDD) communication through a wireless communication channel with an evolved Node B (eNB), the TDD communication having a radio frame including an uplink subframe and a special subframe preceding the uplink subframe, comprises: a receiver configured to receive from the eNB, a channel state information reference signal (CSI-RS) subframe configuration value, a CSI-RS configuration value, and a CSI-RS; and circuitry configured to: determine, based on the CSI-RS subframe configuration value, a subframe index corresponding to a temporal position of a special subframe including the CSI-RS in the radio frame; determine, based on the CSI-RS configuration value, a CSI-RS pattern of one or more orthogonal frequency division modulation (OFDM) resource elements carrying the CSI-RS, the pattern being from among a group of CSI-RS patterns that include OFDM resource elements in OFDM symbols corresponding to a physical downlink control channel (PDCCH) region of a long term evolution (LTE) wireless communication channel; control the receiver to receive from the eNB the special subframe carrying the CSI-RS during the temporal position and at the one or more OFDM resource elements of the CSI-RS pattern; and measure the wireless communication channel based on the CSI-RS.

In another embodiment of the UE, the circuitry is further configured to: determine a CSI-RS subframe offset defining an initial subframe index corresponding to a first temporal position of the special subframe including the CSI-RS in the radio frame; and determine a CSI-RS subframe periodicity defining a number of subframes between the initial subframe index and a subsequent subframe index corresponding to a second temporal position of a second special subframe including the CSI-RS, so as to periodically receive the CSI-RS in special subframes.

In yet another embodiment of the UE, the CSI-RS subframe configuration value has a value according to an expression $1+(x*5)$, where x satisfies the relationship $0 \leq x \leq 30$.

In still another embodiment of the UE, the special subframe includes a downlink pilot time slot (DwPTS) having a predetermined duration, and in which the receiver is further configured to receive a special subframe configuration value corresponding to the predetermined duration, and in which the group of CSI-RS patterns are defined based on a number of OFDM symbols available in the predetermined duration.

In still a further embodiment of the UE, the group of CSI-RS patterns include patterns for special subframe configuration values corresponding to special subframe configurations having DwPTSs of less than four OFDM symbols.

In another embodiment of the UE, the group of CSI-RS patterns comprise a predetermined group of CSI-RS patterns selected to avoid collision between CSI-RSs and a cell-specific reference signal (CRS) for antenna port zero.

In some other embodiments of the UE, the group of CSI-RS patterns are predefined according to an equation and a mapping of CSI-RS configuration values to an OFDM sub-carrier position k' and an OFDM symbol position l', in which the equation yields, for a given number of 1 and 2, 4, or 8 antenna ports and a given OFDM sub-carrier position k' and symbol position l', a set of CSI-RS resource elements corresponding to 1 and 2, 4, or 8 antenna ports.

In yet other embodiments of the UE, the equation and the mapping include multiple equations and mappings, in which each of different ones of the equations and mappings correspond to a number of OFDM symbols available in a subframe configuration value.

According to some embodiments, a method of receiving a channel state information reference signal (CSI-RS), comprises: receiving from an evolved Node B (eNB) information indicating that the CSI-RS is carried in a special subframe preceding an uplink subframe; receiving from the eNB CSI-RS configuration information indicating a position of the CSI-RS in a pattern of resource elements of an OFDM transmission made in the special subframe, in which the pattern comprises CSI-RS subcarriers k and symbols l; determining, based on the CSI-RS configuration information, the pattern according to an equation and a predetermined table, the predetermined table having pairs of subcarrier position k' and symbol position l' corresponding to a resource element, the pairs including resource elements in at least one of an initial pair of OFDM symbols of a resource block, and the equation identifying the CSI-RS subcarriers k and symbols l based on an antenna port value, an index of resource blocks in the special subframe, and a selected pair of subcarrier position k and a symbol position l'; and receiving the CSI-RS at the subcarriers k and symbols l.

In some embodiments of the method, the CSI-RS configuration information comprises an index for the pairs of subcarrier position k' and symbol position of the predetermined table, and in which the determining comprises: selecting, based on the index, a pair of subcarrier position and symbol position l' from the predetermined table; and mapping the pair of subcarrier position k' and symbol position to the CSI-RS subcarriers k and symbols l of the pattern based on the equation represented by one or more of equations (3) or (4), where p is the antenna port value, m is the index of resource blocks in the special subframe, and $N_{RB}^{DL}$ is a downlink bandwidth configuration expressed in terms of multiples of a predetermined resource block size having a predetermined number of subcarriers, and l' corresponds to an OFDM symbol index equal to 0, 2, or 5, the OFDM symbol index being within a slot of the special subframe.

In another embodiment of the method, the CSI-RS configuration information comprises an index for the pairs of subcarrier position k' and symbol position l' of the predetermined table, and in which the determining comprises: selecting, based on the index, a pair of subcarrier position k and symbol position l' from the predetermined table; and mapping the pair of subcarrier position k' and symbol position l' to the CSI-RS subcarriers k and symbols l of the pattern based on the equation represented by one or more of equations (5), (6), (7), or (8), where p is the antenna port value, m is the index of resource blocks in the special subframe, and $N_{RB}^{DL}$ is a downlink bandwidth configuration expressed in terms of multiples of a predetermined resource block size having a predetermined number of subcarriers.

In yet further embodiments of the method, the predetermined table includes resource elements allocated to cell-specific reference signals (CRS) for antenna port zero (AP0).

In still other embodiment of the method, the predetermined table excludes resource elements allocated to demodulation reference signals (DMRS).

In further embodiments of the method, the predetermined table includes resource elements located at symbols 0, 2, and 5, and excludes resource elements allocated to cell-specific reference signals (CRS) for antenna port zero (AP0) or to demodulation reference signals (DMRS).

In another embodiment of the method, the CSI-RS configuration information comprises an index for the pairs of subcarrier position k' and symbol position l' of the predetermined table, and the index corresponds to a pair of subcarrier position k' and symbol position that is suitable for use with any one of 1, 2, 4, and 8 antenna port configurations.

In still other embodiments of the method, the CSI-RS configuration information comprises an index for the pairs of subcarrier position k' and symbol position of the predetermined table, and in which the determining comprises: selecting, based on the index, a pair of subcarrier position k' and symbol position l' from the predetermined table; and mapping the pair of subcarrier position k' and symbol position l' to the CSI-RS subcarriers k and symbols l of the pattern according to at least one of the following equations 2-8, where p is the antenna port value, m is the index of resource blocks in the special subframe, and $N_{RB}^{DL}$ is a downlink bandwidth configuration expressed in terms of multiples of a predetermined resource block size having a predetermined number of subcarriers.

According to some embodiments, an evolved Node B (eNB) for wirelessly transmitting to a user equipment (UE) a channel state information reference signal (CSI-RS) in a special subframe, the eNB comprising: a transmitter; and circuitry configured to: determine a special subframe for carrying the CSI-RS; determine a CSI-RS configuration from among a predetermined group of CSI-RS configurations, in which the CSI-RS configuration identifies a pattern of resource elements in one or more resource blocks, and in which different ones of CSI-RS configurations of the predetermined group of CSI-RS configurations correspond to patterns of resource elements located in at least one of a first three orthogonal frequency division modulation (OFDM) symbols of the special subframe; and the transmitter being configured to transmit an indication of the determined CSI-RS configuration to the UE, and to transmit the special subframe carrying the CSI-RS.

In another embodiment of the eNB, the circuitry is further configured to select the pattern from a plurality of sets of CSI-RSs that mapped in a resource block of the special subframe and that avoid collision with other reference signals allocated in the resource block.

In a further embodiment of the eNB, different ones of the plurality of sets of CSI-RSs correspond to four resource elements, in which the four resource elements include an intersection of two consecutive symbols and two consecutive subcarriers in the resource block.

In some embodiments of the eNB, the CSI-RS comprises a zero power CSI-RS.

In further embodiments of the eNB, the circuitry is further configured to transmit an interference measurement resource (CSI-IM) transmission in the special subframe.

According to some embodiments, a user equipment (UE) for time division duplex (TDD) communication through a wireless communication channel with an evolved Node B (eNB), the TDD communication having a radio frame including an uplink subframe and a special subframe preceding the uplink subframe, the UE comprising: a first mean for receiving from the eNB, a channel state information reference signal (CSI-RS) subframe configuration value, a CSI-RS configuration value, and a CSI-RS; a second means for determining, based on the CSI-RS subframe configuration value, a subframe index corresponding to a temporal position of a special subframe including the CSI-RS in the radio frame; a third means for determining, based on the CSI-RS configuration value, a CSI-RS pattern of one or more orthogonal frequency division modulation (OFDM) resource elements carrying the CSI-RS, the pattern being from among a group of CSI-RS patterns that include OFDM resource elements in OFDM symbols corresponding to a physical downlink control channel (PDCCH) region of a long term evolution (LTE) wireless communication channel; a fourth means for controlling the UE to receive from the eNB the special subframe carrying the CSI-RS during the temporal position and at the one or more OFDM resource elements of the CSI-RS pattern; and a fifth means for measuring the wireless communication channel based on the CSI-RS.

In some embodiment of the UE, the group of CSI-RS patterns comprise a predetermined group of CSI-RS patterns selected to avoid collision between CSI-RSs and a cell-specific reference signal (CRS) for antenna port zero.

In other embodiments of the UE, the group of CSI-RS patterns are predefined according to an equation and a mapping of CSI-RS configuration values to an OFDM sub-carrier position k' and an OFDM symbol position in which the equation yields, for a given number of 1 and 2, 4, or 8 antenna ports and a given OFDM sub-carrier position k and symbol position l', a set of CSI-RS resource elements corresponding to 1 and 2, 4, or 8 antenna ports.

In yet other embodiments of the UE, the equation and the mapping include multiple equations and mappings, in which each of different ones of the equations and mappings correspond to a number of OFDM symbols available in a subframe configuration value.

In some embodiments, a UE includes a transceiver including transmitter and receiver components; multiple antennas, in which a first antenna of the multiple antennas is coupled to the transmitter, and in which a second antenna of the multiple antennas is coupled to the receiver; a display touchscreen; and a keyboard.

According to some embodiments, a computer-readable medium including instructions that, when executed by a processor, cause a user equipment (UE) to: receive from an evolved Node B (eNB) information indicating that the CSI-RS is carried in a special subframe preceding an uplink subframe; receive from the eNB CSI-RS configuration information indicating a position of the CSI-RS in a pattern of resource elements of an OFDM transmission made in the special subframe, in which the pattern comprises CSI-RS subcarriers k and symbols l; determine, based on the CSI-RS configuration information, the pattern according to an equation and a predetermined table, the predetermined table having pairs of subcarrier position k' and symbol position corresponding to a resource element, the pairs including resource elements in at least one of an initial pair of OFDM symbols of a resource block, and the equation identifying the CSI-RS subcarriers k and symbols l based on an antenna port value, an index of resource blocks in the special subframe, and a selected pair of subcarrier position k' and a symbol position l'; and receive the CSI-RS at the subcarriers k and symbols l.

In another embodiment of the computer-readable medium, the equation is represented by an expression of equation 3 and the predetermined table is represented by Tables 7, 8, 9, 11, or 12A, where p is the antenna port value, m is the index of resource blocks in the special subframe, and $N_{RB}^{DL}$ is a downlink bandwidth configuration expressed in terms of multiples of a predetermined resource block size having a predetermined number of subcarriers.

In some other embodiments of the computer-readable medium, the equation is represented by an expression of equation 3 with l"=0,7 and the predetermined table is represented by Group 3 of Table 10, where p is the antenna port value, m is the index of resource blocks in the special subframe, and $N_{RB}^{DL}$ is a downlink bandwidth configuration expressed in terms of multiples of a predetermined resource block size having a predetermined number of subcarriers.

In still other embodiments of the computer-readable medium, the equation is represented by an expression of equation 4 and the predetermined table is represented by Group 4 of Table 10, where p is the antenna port value, m is the index of resource blocks in the special subframe, and $N_{RB}^{DL}$ is a downlink bandwidth configuration expressed in terms of multiples of a predetermined resource block size having a predetermined number of subcarriers.

In yet other embodiments of the computer-readable medium, the equation is represented by an expression of equation 3 with l"=0,4 and the predetermined table is represented by Table 12B, where p is the antenna port value, m is the index of resource blocks in the special subframe, and $N_{RB}^{DL}$ is a downlink bandwidth configuration expressed in terms of multiples of a predetermined resource block size having a predetermined number of subcarriers.

In still further embodiments of the computer-readable medium, the equation is represented by an expression of equation 5 and the predetermined table is represented by Table 13, where p is the antenna port value, m is the index of resource blocks in the special subframe, and $R_{RB}^{DL}$ is a downlink bandwidth configuration expressed in terms of multiples of a predetermined resource block size having a predetermined number of subcarriers.

In some other embodiments of the computer-readable medium, the equation is represented by an expression of equation 6 and the predetermined table is represented by Tables 14, 15, 16, or 17, where p is the antenna port value, m is the index of resource blocks in the special subframe, and $N_{RB}^{DL}$ is a downlink bandwidth configuration expressed in terms of multiples of a predetermined resource block size having a predetermined number of subcarriers.

In another embodiment of the computer-readable medium, the equation is represented by an expression of equation 7 and the predetermined table is represented by Table 17, where p is the antenna port value, m is the index of resource blocks in the special subframe, and $N_{RB}^{DL}$ is a downlink bandwidth configuration expressed in terms of multiples of a predetermined resource block size having a predetermined number of subcarriers.

In some other embodiments of the computer-readable medium, the equation is represented by an expression of equation 6 and the predetermined table is represented by Group 1 of Table 18, where p is the antenna port value, m is the index of resource blocks in the special subframe, and $N_{RB}^{DL}$ is a downlink bandwidth configuration expressed in terms of multiples of a predetermined resource block size having a predetermined number of subcarriers.

In still other embodiments of the computer-readable medium, the equation is represented by an expression of equation 8 and the predetermined table is represented by Group 2 of Table 18, where p is the antenna port value, m is the index of resource blocks in the special subframe, and $N_{RB}^{DL}$ is a downlink bandwidth configuration expressed in terms of multiples of a predetermined resource block size having a predetermined number of subcarriers.

The techniques introduced above can be implemented by programmable circuitry programmed or configured by software and/or firmware, or they can be implemented entirely by special-purpose hardwired circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, one or more processors may be configured with instructions stored on a computer-readable storage device.

It will be understood by skilled persons that many changes may be made to the details of the above-described embodiments without departing from the underlying principles of the disclosure. The scope of the present disclosure should, therefore, be determined only by the following claims.

The invention claimed is:

1. A user equipment (UE) for time division duplex (TDD) communication through a wireless communication channel with an evolved Node B (eNB), the TDD communication having a radio frame including an uplink subframe and a special subframe preceding the uplink subframe, the UE comprising:
   a receiver configured to receive from the eNB, a channel state information reference signal (CSI-RS) subframe configuration value, a CSI-RS configuration value, and a CSI-RS; and
   circuitry configured to:
      determine, based on the CSI-RS subframe configuration value, a subframe index corresponding to a temporal position of a special subframe including the CSI-RS in the radio frame;
      determine, based on the CSI-RS configuration value, a CSI-RS pattern of one or more orthogonal frequency division modulation (OFDM) resource elements carrying the CSI-RS, the pattern being from among a group of CSI-RS patterns that include OFDM resource elements in OFDM symbols corresponding to a physical downlink control channel (PDCCH) region of a long term evolution (LTE) wireless communication channel;
      control the receiver to receive from the eNB the special subframe carrying the CSI-RS during the temporal position and at the one or more OFDM resource elements of the CSI-RS pattern; and
      measure the wireless communication channel based on the CSI-RS, in which the CSI-RS subframe configuration value has a value according to an expression 1+(x*5), where x satisfies the relationship 0≤x≤30.

2. The UE of claim 1, in which the circuitry is further configured to:
   determine a CSI-RS subframe offset defining an initial subframe index corresponding to a first temporal position of the special subframe including the CSI-RS in the radio frame; and
   determine a CSI-RS subframe periodicity defining a number of subframes between the initial subframe index and a subsequent subframe index corresponding to a second temporal position of a second special subframe including the CSI-RS, so as to periodically receive the CSI-RS in special subframes.

3. The UE of claim 1, in which the special subframe includes a downlink pilot time slot (DwPTS) having a predetermined duration, and in which the receiver is further configured to receive a special subframe configuration value corresponding to the predetermined duration, and in which the group of CSI-RS patterns are defined based on a number of OFDM symbols available in the predetermined duration.

4. The UE of claim 3, in which the group of CSI-RS patterns include patterns for special subframe configuration values corresponding to special subframe configurations having DwPTSs of less than four OFDM symbols.

5. The UE of claim 1, in which the group of CSI-RS patterns comprise a predetermined group of CSI-RS patterns selected to avoid collision between CSI-RSs and a cell-specific reference signal (CRS) for antenna port zero.

6. The UE of claim 1, in which the group of CSI-RS patterns are predefined according to an equation and a mapping of CSI-RS configuration values to an OFDM sub-carrier position k' and an OFDM symbol position l', in which the equation yields, for a given number of 1 and 2, 4, or 8 antenna ports and a given OFDM sub-carrier position k' and symbol position l', a set of CSI-RS resource elements corresponding to 1 and 2, 4, or 8 antenna ports.

7. The UE of claim 6, in which the equation and the mapping include multiple equations and mappings, in which each of different ones of the equations and mappings correspond to a number of OFDM symbols available in a subframe configuration value.

8. A method of receiving a channel state information reference signal (CSI-RS), the method comprising:
   receiving from an evolved Node B (eNB) information indicating that the CSI-RS is carried in a special subframe preceding an uplink subframe;
   receiving from the eNB CSI-RS configuration information indicating a position of the CSI-RS in a pattern of resource elements of an OFDM transmission made in the special subframe, in which the pattern comprises CSI-RS subcarriers k and symbols l;
   determining, based on the CSI-RS configuration information, the pattern according to an equation and a predetermined table, the predetermined table having pairs of subcarrier position k' and symbol position l' corresponding to a resource element, the pairs including resource elements in at least one of an initial pair of OFDM symbols of a resource block, and the equation identifying the CSI-RS subcarriers k and symbols l based on an antenna port value, an index of resource blocks in the special subframe, and a selected pair of subcarrier position k' and a symbol position l'; and
   receiving the CSI-RS at the subcarriers k and symbols l, in which the CSI-RS configuration information comprises an index for the pairs of subcarrier position k' and symbol position l' of the predetermined table, and in which the determining comprises:
   selecting, based on the index, a pair of subcarrier position k' and symbol position l' from the predetermined table; and
   mapping the pair of subcarrier position k' and symbol position l' to the CSI-RS subcarriers k and symbols l of the pattern based on the equation that includes the following expression:

$$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \end{cases}$$

$$l = l' + l''$$
$$l'' = 0, 1$$
$$m = 0, 1, \ldots, N_{RB}^{DL} - 1$$

where p is the antenna port value, m is the index of resource blocks in the special subframe, and $N_{RB}^{DL}$ is a downlink bandwidth configuration expressed in terms of multiples of a predetermined resource block size having a predetermined number of subcarriers, and l' corresponds to an OFDM symbol index equal to 0, 2, or 5, the OFDM symbol index being within a slot of the special subframe.

9. A method of receiving a channel state information reference signal (CSI-RS), the method comprising:
receiving from an evolved Node B (eNB) information indicating that the CSI-RS is carried in a special subframe preceding an uplink subframe,
receiving from the eNB CSI-RS configuration information indicating a position of the CSI-RS in a pattern of resource elements of an OFDM transmission made in the special subframe, in which the pattern comprises CSI-RS subcarriers k and symbols l;
determining, based on the CSI-RS configuration information, the pattern according to an equation and a predetermined table, the predetermined table having pairs of subcarrier position k' and symbol position l' corresponding to a resource element, the pairs including resource elements in at least one of an initial pair of OFDM symbols of a resource block, and the equation identifying the CSI-RS subcarriers k and symbols l based on an antenna port value, an index of resource blocks in the special subframe, and a selected pair of subcarrier position k' and a symbol position l'; and
receiving the CSI-RS at the subcarriers k and symbols l, in which the CSI-RS configuration information comprises an index for the pairs of subcarrier position k' and symbol position l' of the predetermined table, and in which the determining comprises:
selecting, based on the index, a pair of subcarrier position k' and symbol position l' from the predetermined table; and
mapping the pair of subcarrier position k' and symbol position l' to the CSI-RS subcarriers k and symbols l of the pattern on the equation that includes the following expression:

$$k = k' + 12m + \begin{cases} -0 & \text{for } p \in \{15, 16\}, \text{ normal cyclic prefix} \\ -3 & \text{for } p \in \{17, 18\}, \text{ normal cyclic prefix} \\ -0 & \text{for } p \in \{19, 20\}, \text{ normal cyclic prefix} \\ -3 & \text{for } p \in \{21, 22\}, \text{ normal cyclic prefix} \end{cases}$$

$$l = l' + \begin{cases} l'' & \text{for } p \in \{15, 16\}, \text{ normal cyclic prefix} \\ l'' & \text{for } p \in \{17, 18\}, \text{ normal cyclic prefix} \\ l'' + 3 & \text{for } p \in \{19, 20\}, \text{ normal cyclic prefix} \\ l'' + 3 & \text{for } p \in \{21, 22\}, \text{ normal cyclic prefix} \end{cases}$$

$$l'' = 0, 1$$
$$m = 0, 1, \ldots, N_{RB}^{DL} - 1$$

where p is the antenna port value, m is the index of resource blocks in the special subframe, and $N_{RB}^{DL}$ is a downlink bandwidth configuration expressed in terms of multiples of a predetermined resource block size having a predetermined number of subcarriers, and l' corresponds to an OFDM symbol index equal to 0, 2, or 5, the OFDM symbol index being within a slot of the special subframe.

10. A method of receiving a channel state information reference signal (CSI-RS), the method comprising:
receiving from an evolved Node B (eNB) information indicating that the CSI-RS is carried in a special subframe preceding an uplink subframe;
receiving from the eNB CSI-RS configuration information indicating a position of the CSI-RS in a pattern of resource elements of an OFDM transmission made in the special subframe, in which the pattern comprises CSI-RS subcarriers k and symbols l;
determining, based on the CSI-RS configuration information, the pattern according to an equation and a predetermined table, the predetermined table having pairs of subcarrier position k' and symbol position l' corresponding to a resource element, the pairs including resource elements in at least one of an initial pair of OFDM symbols of a resource block, and the equation identifying the CSI-RS subcarriers k and symbols l based on an antenna port value, an index of resource blocks in the special subframe, and a selected pair of subcarrier position k' and a symbol position l'; and
receiving the CSI-RS at the subcarriers k and symbols l, in which the CSI-RS configuration information comprises an index for the pairs of subcarrier position k' and symbol position l' of the predetermined table, and in which the determining comprises:
selecting, based on the index, a pair of subcarrier position k' and symbol position l' from the predetermined table; and
mapping the pair of subcarrier position k' and symbol position l' to the CSI-RS subcarriers k and symbols l of the pattern based on the equation that includes the following expression:

$$k = k' + 12m + \begin{cases} -k'' & \text{for } p \in \{15, 16\}, \text{ normal cyclic prefix} \\ -k'' - 8 & \text{for } p \in \{17, 18\}, \text{ normal cyclic prefix} \\ -k'' - 2 & \text{for } p \in \{19, 20\}, \text{ normal cyclic prefix} \\ -k'' - 10 & \text{for } p \in \{21, 22\}, \text{ normal cyclic prefix} \end{cases}$$

$$l = 2$$
$$k'' = 0, 1$$
$$m = 0, 1, \ldots, N_{RB}^{DL} - 1$$

where p is the antenna port value, m is the index of resource blocks in the special subframe, and $N_{RB}^{DL}$ is a downlink bandwidth configuration expressed in terms of multiples of a predetermined resource block size having a predetermined number of subcarriers.

11. A method of receiving a channel state information reference signal (CSI-RS), the method comprising:

receiving from an evolved Node B (eNB) information indicating that the CSI-RS is carried in a special subframe preceding an uplink subframe;

receiving from the eNB CSI-RS configuration information indicating a position of the CSI-RS in a pattern of resource elements of an OFDM transmission made in the special subframe, in which the pattern comprises CSI-RS subcarriers k and symbols l;

determining, based on the CSI-RS configuration information, the pattern according to an equation and a predetermined table, the predetermined table having pairs of subcarrier position k' and symbol position l' corresponding to a resource element, the pairs including resource elements in at least one of an initial pair of OFDM symbols of a resource block, and the equation identifying the CSI-RS subcarriers k and symbols l based on an antenna port value, an index of resource blocks in the special subframe, and a selected pair of subcarrier position k' and a symbol position l'; and receiving the CSI-RS at the subcarriers k and symbols l, in which the CSI-RS configuration information comprises an index for the pairs of subcarrier position k' and symbol position l' of the predetermined table, and in which the determining comprises:

selecting, based on the index, a pair of subcarrier position k' and symbol position l' from the predetermined table; and mapping the pair of subcarrier position k' and symbol position l' to the CSI-RS subcarriers k and symbols l of the pattern based on the equation that includes the following expression:

$$k = k' + 12m + \begin{cases} -0 & \text{for } p \in \{15, 16\}, \text{ normal cyclic prefix} \\ -3 & \text{for } p \in \{17, 18\}, \text{ normal cyclic prefix} \\ -6 & \text{for } p \in \{19, 20\}, \text{ normal cyclic prefix} \\ -9 & \text{for } p \in \{21, 22\}, \text{ normal cyclic prefix} \end{cases}$$

$$l = l' + l''$$

$$l'' = 0, 1$$

$$m = 0, 1, \ldots, N_{RB}^{DL} - 1$$

where p is the antenna port value, m is the index of resource blocks in the special subframe, and $N_{RB}^{DL}$ is a downlink bandwidth configuration expressed in terms of multiples of a predetermined resource block size having a predetermined number of subcarriers.

12. A method of receiving a channel state information reference signal (CSI-RS), the method comprising:

receiving from an evolved Node B (eNB) information indicating that the CSI-RS is carried in a special subframe preceding an uplink subframe;

receiving from the eNB CSI-RS configuration information indicating a position of the CSI-RS in a pattern of resource elements of an OFDM transmission made in the special subframe, in which the pattern comprises CSI-RS subcarriers k and symbols l;

determining, based on the CSI-RS configuration information, the pattern according to an equation and a predetermined table, the predetermined table having pairs of subcarrier position k' and symbol position l' corresponding to a resource element, the pairs including resource elements in at least one of an initial pair of OFDM symbols of a resource block, and the equation identifying the CSI-RS subcarriers k and symbols l based on an antenna port value, an index of resource blocks in the special subframe, and a selected pair of subcarrier position k' and a symbol position l'; and receiving the CSI-RS at the subcarriers k and symbols l, in which the CSI-RS configuration information comprises an index for the pairs of subcarrier position k' and symbol position l' of the predetermined table, and in which the determining comprises:

selecting, based on the index, a pair of subcarrier position k' and symbol position l' from the predetermined table; and mapping the pair of subcarrier position k' and symbol position l' to the CSI-RS subcarriers k and symbols l of the pattern based on the equation that includes the following expression:

$$k = k' + 12m + \begin{cases} -0 & \text{for } p \in \{15, 16\}, \text{ normal cyclic prefix} \\ -3 & \text{for } p \in \{17, 18\}, \text{ normal cyclic prefix} \\ -6 & \text{for } p \in \{19, 20\}, \text{ normal cyclic prefix} \\ -9 & \text{for } p \in \{21, 22\}, \text{ normal cyclic prefix} \end{cases}$$

$$l = l' + \begin{cases} l'' & l' = 0 \\ 2l'' & l' = 2 \end{cases}$$

$$l'' = 0, 1$$

$$m = 0, 1, \ldots, N_{RB}^{DL} - 1$$

where p is the antenna port value, m is the index of resource blocks in the special subframe, and $N_{RB}^{DL}$ is a downlink bandwidth configuration expressed in terms of multiples of a predetermined resource block size having a predetermined number of subcarriers.

13. A method of receiving a channel state information reference signal (CSI-RS), the method comprising:

receiving from an evolved Node B (eNB) information indicating that the CSI-RS is carried in a special subframe preceding an uplink subframe, receiving from the eNB CSI-RS configuration information indicating a position of the CSI-RS in a pattern of resource elements of an OFDM transmission made in the special subframe, in which the pattern comprises CSI-RS subcarriers k and symbols l, determining, based on the CSI-RS configuration information, the pattern according to an equation and a predetermined table, the predetermined table having pairs of subcarrier position k' and symbol position l' corresponding to a resource element, the pairs including resource elements in at least one of an initial pair of OFDM symbols of a resource block, and the equation identifying the CSI-RS subcarriers k and symbols l based on an antenna port value, an index of resource blocks in the special subframe, and a selected pair of subcarrier position k' and a symbol position l', and receiving the CSI-RS at the subcarriers k and symbols l, in which the CSI-RS configuration information comprises an index for the pairs of subcarrier position k' and symbol position l' of the predetermined table, and in which the determining comprises:

selecting, based on the index, a pair of subcarrier position k' and symbol position l' from the predetermined table; and mapping the pair of subcarrier position k' and symbol position l' to the CSI-RS subcarriers k and symbols l of the pattern based on the equation that includes the following expression:

$$k = k' + 12m - k'' + \begin{cases} -0 & \text{for } p \in \{15, 16\}, \text{ normal cyclic prefix} \\ -3 & \text{for } p \in \{17, 18\}, \text{ normal cyclic prefix} \\ -6 & \text{for } p \in \{19, 20\}, \text{ normal cyclic prefix} \\ -9 & \text{for } p \in \{21, 22\}, \text{ normal cyclic prefix} \end{cases}$$

$$l = l'$$

$$k'' = 0, 1$$

$$m = 0, 1, \ldots, N_{RB}^{DL} - 1$$

where p is the antenna port value, m is the index of resource blocks in the special subframe, and $N_{RB}^{DL}$ is a downlink bandwidth configuration expressed in terms of multiples of a predetermined resource block size having a predetermined number of subcarriers.

14. The method of claim 8, in which the predetermined table includes resource elements allocated to cell-specific reference signals (CRS) for antenna port zero (AP0).

15. The method of claim 8, in which the predetermined table excludes resource elements allocated to demodulation reference signals (DMRS).

16. The method of claim 8, in which the predetermined table includes resource elements located at symbols 0, 2, and 5, and excludes resource elements allocated to cell-specific reference signals (CRS) for antenna port zero (AP0) or to demodulation reference signals (DMRS).

17. The method of claim 8, in which the CSI-RS configuration information comprises an index for the pairs of subcarrier position k' and symbol position l' of the predetermined table, and the index corresponds to a pair of subcarrier position k' and symbol position l' that is suitable for use with any one of 1, 2, 4, and 8 antenna port configurations.

18. The method of claim 9, in which the CSI-RS configuration information comprises an index for the pairs of subcarrier position k' and symbol position l' of the predetermined table, and the index corresponds to a pair of subcarrier position k' and symbol position l' that is suitable for use with any one of 1, 2, 4, and 8 antenna port configurations.

19. The method of claim 10, in which the CSI-RS configuration information comprises an index for the pairs of subcarrier position k' and symbol position l' of the predetermined table, and the index corresponds to a pair of subcarrier position k' and symbol position l' that is suitable for use with any one of 1, 2, 4, and 8 antenna port configurations.

20. The method of claim 11, in which the predetermined table includes resource elements located at symbols 0, 2, and 5, and excludes resource elements allocated to cell-specific reference signals (CRS) for antenna port zero (AP0) or to demodulation reference signals (DMRS).

* * * * *